(12) United States Patent
Yuan et al.

(10) Patent No.: US 12,488,729 B2
(45) Date of Patent: Dec. 2, 2025

(54) DRIVING CIRCUIT, DISPLAY SUBSTRATE AND DISPLAY DEVICE

(71) Applicants: Hefei BOE Joint Technology Co., Ltd., Anhui (CN); BOE TECHNOLOGY GROUP CO., LTD., Beijing (CN)

(72) Inventors: Can Yuan, Beijing (CN); Yongqian Li, Beijing (CN); Miao Liu, Beijing (CN); Dandan Zhou, Beijing (CN); Cheng Xu, Beijing (CN)

(73) Assignees: HEFEI BOE JOINT TECHNOLOGY CO., LTD., Anhui (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/291,452

(22) PCT Filed: Mar. 31, 2023

(86) PCT No.: PCT/CN2023/085462
§ 371 (c)(1),
(2) Date: Jan. 23, 2024

(87) PCT Pub. No.: WO2024/197809
PCT Pub. Date: Oct. 3, 2024

(65) Prior Publication Data
US 2025/0124841 A1    Apr. 17, 2025

(51) Int. Cl.
*G09G 3/20* (2006.01)

(52) U.S. Cl.
CPC ... *G09G 3/2092* (2013.01); *G09G 2300/0426* (2013.01); *G09G 2310/0267* (2013.01); *G09G 2310/0286* (2013.01)

(58) Field of Classification Search
CPC ........... G11C 19/28; G09G 2310/0286; G09G 3/2092; G09G 2300/0426; G09G 2310/0267
See application file for complete search history.

(56) References Cited

U.S. PATENT DOCUMENTS

| 5,808,595 A | 9/1998 | Kubota et al. |
| 2010/0150302 A1 | 6/2010 | Tsai et al. |

(Continued)

FOREIGN PATENT DOCUMENTS

| CN | 106157916 A | 11/2016 |
| CN | 109147637 A | 1/2019 |

(Continued)

*Primary Examiner* — Xuemei Zheng
(74) *Attorney, Agent, or Firm* — Muncy, Geissler, Olds & Lowe, P.C.

(57) ABSTRACT

A driving circuit includes a pull-up node control circuit, a pull-down node control circuit and an output circuit; the pull-up node control circuit controls a potential of the pull-up node under the control of an input signal and a reset signal; the output circuit controls the output terminal to output a signal under the control of the potential of the pull-up node and the potential of the pull-down node; a channel length of at least one transistor among at least some transistors included in the output circuit, at least some transistors whose gate electrodes are electrically connected to the input terminal included in the pull-up node control circuit, and at least some transistors whose gate electrodes are electrically connected to the reset terminal included in the pull-up node control circuit is greater than a channel length of another transistor included in the driving circuit.

18 Claims, 25 Drawing Sheets

(56) References Cited

U.S. PATENT DOCUMENTS

| | | |
|---|---|---|
| 2013/0099238 A1 | 4/2013 | Chen et al. |
| 2013/0306968 A1 | 11/2013 | Chang et al. |
| 2018/0336835 A1 | 11/2018 | Liu |
| 2018/0366067 A1 | 12/2018 | Jang |
| 2020/0394951 A1 | 12/2020 | Li et al. |
| 2021/0201832 A1 | 7/2021 | Lim et al. |
| 2022/0301510 A1 | 9/2022 | Ma et al. |
| 2022/0327975 A1 | 10/2022 | Yan et al. |
| 2022/0352296 A1 | 11/2022 | Yi et al. |
| 2024/0212773 A1* | 6/2024 | Liu .................. G11C 19/28 |
| 2024/0257774 A1* | 8/2024 | Nishimura ........... G09G 3/3266 |
| 2025/0006805 A1* | 1/2025 | Liu .................. G11C 19/28 |

FOREIGN PATENT DOCUMENTS

| | | | | |
|---|---|---|---|---|
| CN | 109559704 A | * | 4/2019 | |
| CN | 110534052 A | | 12/2019 | |
| CN | 111179803 A | | 5/2020 | |
| CN | 210865579 U | | 6/2020 | |
| CN | 111681700 A | | 9/2020 | |
| CN | 113053447 A | * | 6/2021 | ............ G09G 3/20 |
| CN | 113129838 A | | 7/2021 | |
| CN | 114902320 A | | 8/2022 | |
| CN | 114974120 A | | 8/2022 | |
| CN | 217133979 U | | 8/2022 | |
| CN | 115050303 A | | 9/2022 | |
| CN | 218273955 U | | 1/2023 | |
| CN | 115798380 A | | 3/2023 | |
| CN | 116762121 A | * | 9/2023 | ............ G09G 3/32 |
| WO | WO2022252142 A1 | | 12/2022 | |

* cited by examiner

NING CIRCUIT, DISPLAY SUBSTRATE AND DISPLAY DEVICE

DRIVING CIRCUIT, DISPLAY SUBSTRATE AND DISPLAY DEVICE

CROSS REFERENCE TO RELATED APPLICATIONS

This application is the U.S. national phase of PCT Application No. PCT/CN2023/085462 filed on Mar. 31, 2023, which is incorporated herein by reference in its entirety.

TECHNICAL FIELD

The present disclosure relates to the field of display technology, in particular to a driving circuit, a display substrate and a display device.

BACKGROUND

In a related driving circuit, the channel length cannot be set according to the size of the current generated by the transistor in the driving circuit, so that the stability of the transistor is poor and the stability of the driving circuit is adversely affected.

SUMMARY

In one aspect, the present disclosure provides in some embodiments a driving circuit, comprising a pull-up node control circuit, a pull-down node control circuit and an output circuit; wherein the pull-up node control circuit is electrically connected to an input terminal, a reset terminal and a pull-up node, and is configured to control a potential of the pull-up node under the control of an input signal provided by the input terminal and a reset signal provided by the reset terminal; the pull-down node control circuit is electrically connected to a pull-down node and is configured to control a potential of the pull-down node; the output circuit is electrically connected to the pull-up node, the pull-down node and an output terminal respectively, and is configured to control the output terminal to output a signal under the control of the potential of the pull-up node and the potential of the pull-down node; a channel length of at least one transistor among at least some transistors included in the output circuit, at least some transistors whose gate electrodes are electrically connected to the input terminal included in the pull-up node control circuit, and at least some transistors whose gate electrodes are electrically connected to the reset terminal included in the pull-up node control circuit is greater than a channel length of another transistor included in the driving circuit; the other transistor is a transistor other than the at least one transistor included in the driving circuit.

Optionally, the output circuit includes a driving output circuit and a cascading output circuit; the driving output circuit is electrically connected to the pull-up node, the pull-down node and a driving output terminal respectively, and is configured to control the driving output terminal to output a driving signal under the control of the potential of the pull-up node and the potential of the pull-down node; the cascading output circuit is electrically connected to the pull-up node, the pull-down node and a cascading output terminal respectively, and is configured to control the cascading output terminal to output a carry signal under the control of the potential of the pull-up node and the potential of the pull-down node; the at least some transistors included in the output circuit includes: at least some transistors included in the driving output circuit; and/or, at least some transistors whose gate electrodes are electrically connected to the pull-up node included in the cascading output circuit.

Optionally, the output circuit is a driving output circuit; the driving output circuit is electrically connected to the pull-up node, the pull-down node and a driving output terminal respectively, and is configured to control the driving output terminal to output a driving signal under the control of the potential of the pull-up node and the potential of the pull-down node.

Optionally, an active pattern of the at least one transistor included in the driving output circuit include at least two active pattern portions arranged at intervals; a spacing between adjacent two active pattern portions in at least one transistor included in the driving output circuit is a first spacing.

Optionally, an active pattern of at least one transistor whose gate electrode is electrically connected to the input terminal included in the pull-up node control circuit include at least two active pattern portions arranged at intervals; an active pattern of at least one transistor whose gate electrode is electrically connected to the reset terminal included in the pull-up node control circuit include at least two active pattern portions arranged at intervals; a spacing between adjacent two active pattern portions in at least one transistor whose gate electrode is electrically connected to the input terminal is a second spacing; a spacing between the adjacent two active pattern portions in at least one transistor whose gate electrode is electrically connected to the reset terminal is a third spacing; the first spacing is greater than the second spacing, and the first spacing is greater than the third spacing.

Optionally, the output circuit includes a driving output circuit and a cascading output circuit; an active pattern of at least one transistor whose gate electrode is electrically connected to the pull-up node included in the cascading output circuit includes at least two active pattern portions arranged at intervals; a spacing between the two adjacent active pattern portions in at least one transistor whose gate electrode is electrically connected to the pull-up node is a fourth spacing; the first spacing is greater than the fourth spacing.

Optionally, a channel length of at least one transistor included in the driving output circuit is greater than or equal to a channel length of a transistor whose gate electrode is electrically connected to the input terminal included in the pull-up node control circuit; a channel length of at least one transistor included in the driving output circuit is greater than or equal to a channel length of a transistor whose gate electrode is electrically connected to the reset terminal included in the pull-up node control circuit; the channel length of at least one transistor included in the driving output circuit is greater than or equal to the channel length of the transistor whose gate electrode is electrically connected to the pull-up node included in the cascading output circuit.

Optionally, the pull-up node control circuit is also electrically connected to a frame reset terminal, is configured to control the potential of the pull-up node under the control of a frame reset signal provided by the frame reset terminal; the pull-down node control circuit is also electrically connected to the pull-up node and is configured to control the potential of the pull-down node under the control of the potential of the pull-up node; the channel length of the transistor whose gate electrode is electrically connected to the frame reset terminal included in the pull-up node control circuit is less than the channel length of at least one transistor whose gate electrode is electrically connected to the reset terminal included in the pull-up node control circuit, and the channel length of the transistor whose gate electrode is electrically connected to the frame reset terminal included in the pull-up node control circuit is less than the channel length of at least one transistor whose gate electrode is electrically connected to the pull-up node included in the cascading output circuit; the channel length of the transistor whose gate electrode is electrically connected to the pull-up node included in the pull-down node control circuit is less than the channel length of at least one transistor whose gate electrode is electrically connected to the reset terminal included in the pull-up node control circuit, and the channel length of the transistor whose gate electrode is electrically connected to the pull-up node included in the pull-down node control circuit is less than the channel length of at least one transistor whose gate electrode is electrically connected to the pull-up node included in the cascading output circuit.

Optionally, the pull-up node control circuit is also electrically connected to the frame reset terminal, is configured to control the potential of the pull-up node under the control of the frame reset signal provided by the frame reset terminal; the pull-down node control circuit is also electrically connected to the pull-up node and is configured to control the potential of the pull-down node under the control of the potential of the pull-up node; the active pattern of at least one transistor whose gate electrode is electrically connected to the frame reset terminal included in the pull-up node control circuit include at least two active pattern portions arranged at intervals, and a spacing between the adjacent active pattern portions of at least one transistor whose gate electrode is electrically connected to the frame reset terminal is a fifth spacing; the active pattern of at least one transistor whose gate electrode is electrically connected to the pull-up node included in the pull-down node control circuit include at least two active pattern portions arranged at intervals, and a spacing between the adjacent active pattern portions of at least one transistor whose gate electrode is electrically connected to the pull-up node included in the pull-down node control circuit is a sixth spacing; the second spacing is greater than the fifth spacing, the second spacing is greater than the sixth spacing, and/or the third spacing is greater than the fifth spacing, and the third spacing is greater than the sixth spacing.

Optionally, the pull-up node control circuit is also electrically connected to the frame reset terminal, is configured to control the potential of the pull-up node under the control of the frame reset signal provided by the frame reset terminal; the pull-down node control circuit is also electrically connected to the pull-up node and is configured to control the potential of the pull-down node under the control of the potential of the pull-up node; the active pattern of at least one transistor whose gate electrode is electrically connected to the frame reset terminal included in the pull-up node control circuit include at least two active pattern portions arranged at intervals, and the spacing between the adjacent active pattern portions of at least one transistor whose gate electrode is electrically connected to the frame reset terminal is the fifth spacing; the active pattern of at least one transistor whose gate electrode is electrically connected to the pull-up node included in the pull-down node control circuit include at least two active pattern portions arranged at intervals, and the spacing between the adjacent active pattern portions of at least one transistor whose gate electrode is electrically connected to the pull-up node included in the pull-down node control circuit is the sixth spacing; the fourth spacing is greater than the fifth spacing, and the fourth spacing is greater than the sixth spacing.

Optionally, a width-to-length ratio of at least one transistor included in the driving output circuit is greater than a width-to-length ratio of the transistor whose gate electrode is electrically connected to the input terminal included in the pull-up node control circuit; the width-to-length ratio of at least one transistor included in the driving output circuit is greater than the width-to-length ratio of the transistor whose gate electrode is electrically connected to the reset terminal included in the pull-up node control circuit; the width-to-length ratio of at least one transistor included in the driving output circuit is greater than the width-to-length ratio of the transistor whose gate electrode is electrically connected to the pull-up node included in the cascading output circuit.

Optionally, the pull-up node control circuit is also electrically connected to the frame reset terminal, is configured to control the potential of the pull-up node under the control of the frame reset signal provided by the frame reset terminal; the pull-down node control circuit is also electrically connected to the pull-up node, is configured to control the potential of the pull-down node under the control of the potential of the pull-up node; the width-to-length ratio of at least one transistor whose gate electrode is electrically connected to the input terminal included in the pull-up node control circuit is greater than the width-to-length ratio of the transistor whose gate electrode is electrically connected to the frame reset terminal included in the pull-up node control circuit; the width-to-length ratio of at least one transistor whose gate electrode is electrically connected to the reset terminal included in the pull-up node control circuit is greater than the width-to-length ratio of the transistor whose gate electrode is electrically connected to the pull-up node included in the pull-down node control circuit; the width-to-length ratio of at least one transistor whose gate electrode is electrically connected to the pull-up node included in the cascading output circuit is greater than the width-to-length ratio of the transistor whose gate electrode is electrically connected to the frame reset terminal included in the pull-up node control circuit; the width-to-length ratio of the at least one transistor whose gate electrode is electrically connected to the pull-up node included in the cascading output circuit is greater than the width-to-length ratio of the transistor whose gate electrode is electrically connected to the pull-up node included in the pull-down node control circuit.

Optionally, the pull-up node control circuit includes an Nth stage of pull-up node control circuit and an (N+1)th stage of pull-up node control circuit, and the pull-down node control circuit includes a first pull-down node control circuit and a second pull-down node control circuit; N is a positive integer; the Nth stage of pull-up node control circuit is electrically connected to the input terminal, the reset terminal, a first scanning voltage line, a second scanning voltage line and an Nth stage of pull-up node respectively, is configured to control to connect the Nth stage of pull-up node and the first scanning voltage line under the control of the input signal, and control to connect the Nth stage of pull-up node and the second scanning voltage line under the control of the reset signal; the (N+1)th stage of pull-up node control circuit is electrically connected to the input terminal, the reset terminal, the first scanning voltage line, the second scanning voltage line and an (N+1)th stage of pull-up node respectively, is configured to control to connect the (N+1)th stage of pull-up node and the first scanning voltage line under the control of the input signal, and control to connect the (N+1)th stage of pull-up node and the second scanning voltage line under the control of the reset signal; the first pull-down node control circuit is respectively electrically connected to a first control voltage line, the Nth stage of pull-up node, the first pull-down node, a first pull-down control node and a first voltage line, is configured to control a potential of the first pull-down control node under the control of a first control voltage provided by the first control voltage line and a potential of the Nth stage of pull-up node, a control to connect the first pull-down node and the first control voltage line under the control of a potential of the first pull-down control node, and control to connect the first pull-down node and the first voltage line under the control of the potential of the Nth stage of pull-up node; the second pull-down node control circuit is electrically connected to a second control voltage line, the (N+1)th stage of pull-up node, a second pull-down node, a second pull-down control node and the first voltage line respectively, and is configured to control a potential of the second pull-down control node under the control of a second control voltage provided by the second control voltage line and a potential of the (N+1)th stage of pull-up node, and control to connect the second pull-down node and the second control voltage line under the control of a potential of the second pull-down control node, and control to connect the second pull-down node and the first voltage line under the control of the potential of the (N+1)th stage of pull-up node.

Optionally, the pull-up node control circuit further includes an Nth stage of pull-up control circuit and an (N+1)th stage of pull-up control circuit; the Nth stage of pull-up control circuit is respectively electrically connected to the Nth stage of pull-up node, the first pull-down node, the second pull-down node, an enabling terminal, the input terminal, a third control node, the first node, a first clock signal line, and the first voltage line, is configured to control to connect the third control node and the input terminal under the control of an enabling signal provided by the enabling terminal, control to connect the first node and the first clock signal line under the control of a potential of the third control node, control to connect the first node and the Nth stage of pull-up node under the control of a first clock signal provided by the first clock signal line, control to connect the Nth stage of pull-up node and the first voltage line under the control of the potential of the first pull-down node, and control to connect the Nth stage of pull-up node and the first voltage line under the control of the potential of the second pull-down node; the (N+1)th stage of pull-up control circuit is electrically connected to the (N+1)th stage of pull-up node, the first clock signal line, the first node, the first pull-down node, the second pull-down node and the first voltage line respectively, is configured to control to connect the (N+1)th stage of pull-up node and first node under the control of the first clock signal, control to connect the (N+1)th stage of pull-up node and first voltage line under the control of the potential of the first pull-down node, and control to connect the (N+1)th stage of pull-up node and the first voltage line under the control of the potential of the second pull-down node.

Optionally, the output circuit includes a driving output circuit and a cascading output circuit; a channel length of the transistor whose gate electrode is electrically connected to the enabling terminal included in the Nth stage of pull-up control circuit, a channel length of the transistor whose gate electrode is electrically connected to the third pull-up node included in the Nth stage of pull-up control circuit, a channel length of the transistor whose gate electrode is electrically connected to the first clock signal line included in the Nth stage of pull-up control circuit, a channel length of the transistor whose gate electrode is electrically connected to the first pull-down node included in the Nth stage of pull-up control circuit, and a channel length of the transistor whose gate electrode is electrically connected to the second pull-down node included in the Nth stage of pull-up control circuit is smaller than a channel length of at least one transistor whose gate electrode is electrically connected to the pull-up node included in the cascaded output circuit; a channel length of the transistor whose gate electrode is electrically connected to the first clock signal line included in the (N+1)th stage of pull-up control circuit, a channel length of the transistor whose gate electrode is electrically connected to the first pull-down node included in the (N+1)th stage of pull-up control circuit, and a channel length of the transistor whose gate electrode is electrically connected to the second pull-down node included in the (N+1)th stage of pull-up control circuit is smaller than the channel length of at least one transistor whose gate electrode is electrically connected to the pull-up node included in the cascading output circuit.

Optionally, the active pattern of at least one transistor whose gate electrode is electrically connected to the enabling terminal included in the Nth stage of pull-up control circuit includes at least two active pattern portions arranged at intervals, and a spacing between adjacent active pattern portions of at least one transistor whose gate electrode is electrically connected to the enabling terminal is a seventh spacing; and/or the active pattern of at least one transistor whose gate electrode is electrically connected to the third control node included in the Nth stage of pull-up control circuit includes at least two active pattern portions arranged at intervals, and a spacing between adjacent active pattern portions of at least one transistor whose gate electrode is electrically connected to the third control node is an eighth spacing; and/or the active pattern of the transistor whose gate electrode is electrically connected to the first clock signal line include in the Nth stage of pull-up control circuit includes at least two active pattern portions arranged at intervals, and a spacing between adjacent active pattern portions of the transistor whose gate electrode is electrically connected to the first clock signal line included in the Nth stage of pull-up control circuit is a ninth spacing; and/or the active pattern of the transistor whose gate electrode is electrically connected to the first pull-down node included in the Nth stage of pull-up control circuit includes at least two active pattern portions arranged at intervals, and a spacing between adjacent active pattern portions of the transistor whose gate electrode is electrically connected to the first pull-down node included in the Nth stage of pull-up control circuit is a tenth spacing; and/or, the active pattern of the transistor whose gate electrode is electrically connected to the second pull-down node included in the Nth stage of pull-up control circuit includes at least two active pattern portions arranged at intervals, and a spacing between the adjacent active pattern portions of the transistor whose gate electrode is electrically connected to the second pull-down node included in the Nth stage of pull-up control circuit is an eleventh spacing; and/or, the active pattern of the transistor whose gate electrode is electrically connected to the first clock signal line included in the (N+1)th stage of pull-up control circuit includes at least two active pattern portions arranged at intervals, and a spacing between adjacent active pattern portions of the transistor whose gate electrode is electrically connected to the first clock signal terminal included in the (N+1)th stage of pull-up control circuit is a twelfth spacing; and/or, the active pattern of the transistor whose gate electrode is electrically connected to the first pull-down node included in the (N+1)th stage of pull-up control circuit includes at least two active pattern portions arranged at intervals, and a spacing between adjacent active pattern portions of the transistor whose gate electrode is electrically connected to the first pull-down node included in the (N+1)th stage of pull-up control circuit is a thirteenth spacing; and/or, the active pattern of the transistor whose gate electrode is electrically connected to the second pull-down node included in the (N+1)th stage of pull-up control circuit includes at least two active pattern portions arranged at intervals, and a spacing between adjacent active pattern portions of the transistor whose gate electrode is electrically connected to the second pull-down node included in the (N+1)th stage of pull-up control circuit is a fourteenth spacing; and/or the second spacing is greater than the seventh spacing, the second spacing is greater than the eighth spacing, the second spacing is greater than the ninth spacing, the second spacing is greater than the tenth spacing, the second spacing is greater than the eleventh spacing, the second spacing is greater than the twelfth spacing, the second spacing is greater than the thirteenth spacing, and the second spacing is greater than the fourteenth spacing; and/or the third spacing is greater than the seventh spacing, the third spacing is greater than the eighth spacing, the third spacing is greater than the ninth spacing, the third spacing is greater than the tenth spacing, the third spacing is greater than the eleventh spacing, the third spacing is greater than the twelfth spacing, the third spacing is greater than the thirteenth spacing, and the third spacing is greater than the fourteenth spacing; and/or the active pattern of at least one transistor whose gate electrode is electrically connected to the input terminal included in the pull-up node control circuit include at least two active pattern portions arranged at intervals; the active pattern of at least one transistor whose gate electrode is electrically connected to the reset terminal included in the pull-up node control circuit includes at least two active pattern portions arranged at intervals; the second spacing is the spacing between the adjacent two active pattern portions of at least one transistor whose gate electrode is electrically connected to the input terminal; the third spacing is the spacing between the adjacent two active pattern portions of at least one transistor whose gate electrode is electrically connected to the reset terminal.

Optionally, the driving circuit further includes a second node control circuit; wherein the second node control circuit is electrically connected to the second node, the input terminal, the reset terminal, the first scanning voltage line and the second scanning voltage line respectively, is configured to control to connect the second node and the first scanning voltage line under the control of the input signal provided by the input terminal, and control to connect the second node and the second scanning voltage line under the control of the reset signal; the first pull-down node control circuit is also electrically connected to the second node, and is configured to control to connect the first pull-down node and the first voltage line under the control of the potential of the second node; the second pull-down node control circuit is also electrically connected to the second node, and is configured to control to connect the second pull-down node and the first voltage line under the control of the potential of the second node.

Optionally, the output circuit includes a driving output circuit and a cascading output circuit; a channel length of the transistor whose gate electrode is electrically connected to the second node included in the first pull-down node control circuit is smaller than a channel length of at least one transistor whose gate electrode is electrically connected to the pull-up node included in the cascading output circuit; a channel length of the transistor whose gate electrode is electrically connected to the second node included in the second pull-down node control circuit is smaller than the channel length of at least one transistor whose gate electrode is electrically connected to the pull-up node included in the cascading output circuit.

Optionally, the active pattern of the transistor whose gate electrode is electrically connected to the second node included in the first pull-down node control circuit include at least two active pattern portions arranged at intervals, and a spacing between the adjacent active pattern portions of the transistor whose gate electrode is electrically connected to the second node included in the first pull-down node control circuit is a fifteenth spacing; or, the active pattern of the transistor whose gate electrode is electrically connected to the second node included in the second pull-down node control circuit include at least two active pattern portions arranged at intervals, and a spacing between the adjacent active pattern portion of the transistor whose gate electrode is electrically connected to the second node included in the second pull-down node control circuit is a sixteenth spacing; the second spacing is greater than the fifteenth spacing, the second spacing is greater than the sixteenth spacing, the third spacing is greater than the fifteenth spacing, and the third spacing is greater than the sixteenth spacing; the active pattern of at least one transistor whose gate electrode is electrically connected to the input terminal included in the pull-up node control circuit include at least two active pattern portions arranged at intervals; the active pattern of at least one transistor whose gate electrode is electrically connected to the reset terminal included in the pull-up node control circuit includes at least two active pattern portions arranged at intervals; the second spacing is the spacing between the adjacent two active pattern portions of at least one transistor whose gate electrode is electrically connected to the input terminal; the third spacing is the spacing between the adjacent two active pattern portions of at least one transistor whose gate electrode is electrically connected to the reset terminal.

Optionally, the driving output portion includes an Nth stage of first driving output terminal, an Nth stage of second driving output terminal, an (N+1)th stage of first driving output terminal and an (N+1)th stage of second driving output terminal; the pull-up node includes an Nth stage of pull-up node and an (N+1)th stage of pull-up node; the pull-down node includes a first pull-down node and a second pull-down node; and N is a positive integer; the driving output circuit includes a first transistor, a second transistor, a third transistor, a fourth transistor, a fifth transistor, a sixth transistor, a seventh transistor, an eighth transistor, a ninth transistor, a tenth transistor, an eleventh transistor and a twelfth transistor; a gate electrode of the first transistor is electrically connected to the Nth stage of pull-up node, a first electrode of the first transistor is electrically connected to a first output clock signal line, and a second electrode of the first transistor is electrically connected to the Nth stage of first driving output terminal; a gate electrode of the second transistor is electrically connected to the first pull-down node, a first electrode of the second transistor is electrically connected to the Nth stage of first driving output terminal, and a second electrode of the second transistor is electrically connected to the second voltage line; a gate electrode of the third transistor is electrically connected to the second pull-down node, a first electrode of the third transistor is electrically connected to the Nth stage of first driving output terminal, and a second electrode of the third transistor is electrically connected to the second voltage line; a gate electrode of the fourth transistor is electrically connected to the Nth stage of pull-up node, a first electrode of the fourth transistor is electrically connected to a second output clock signal line, and a second electrode of the fourth transistor is electrically connected to the Nth stage of second driving output terminal; a gate electrode of the fifth transistor is electrically connected to the first pull-down node, a first electrode of the fifth transistor is electrically connected to the Nth stage of second driving output terminal, and a second electrode of the fifth transistor is electrically connected to the second voltage line; a gate electrode of the sixth transistor is electrically connected to the second pull-down node, a first electrode of the sixth transistor is electrically connected to the Nth stage of second driving output terminal, and a second electrode of the sixth transistor is electrically connected to the second voltage line; a gate electrode of the seventh transistor is electrically connected to the (N+1)th stage of pull-up node, a first electrode of the seventh transistor is electrically connected to a third output clock signal line, and a second electrode of the seventh transistor is electrically connected to the (N+1)th stage of first driving output terminal; a gate electrode of the eighth transistor is electrically connected to the first pull-down node, a first electrode of the eighth transistor is electrically connected to the (N+1)th stage of first driving output terminal, and a second electrode of the eighth transistor is electrically connected to the second voltage line; a gate electrode of the ninth transistor is electrically connected to the second pull-down node, a first electrode of the ninth transistor is electrically connected to the (N+1)th stage of first driving output terminal, and a second electrode of the ninth transistor is electrically connected to the second voltage line; a gate electrode of the tenth transistor is electrically connected to the (N+1)th stage of pull-up node, a first electrode of the tenth transistor is electrically connected to a fourth output clock signal line, and a second electrode of the tenth transistor is electrically connected to the (N+1)th stage of second driving output terminal; a gate electrode of the eleventh transistor is electrically connected to the first pull-down node, a first electrode of the eleventh transistor is electrically connected to the (N+1)th stage of second driving output terminal, and a second electrode of the eleventh transistor is electrically connected to the second voltage line; a gate electrode of the twelfth transistor is electrically connected to the first pull-down node, a first electrode of the twelfth transistor is electrically connected to the (N+1)th stage of second driving output terminal, and a second electrode of the twelfth transistor is electrically connected to the second voltage line; the cascaded output circuit includes a thirteenth transistor, a fourteenth transistor, a fifteenth transistor, a sixteenth transistor, a seventeenth transistor and an eighteenth transistor; a gate electrode of the thirteenth transistor is electrically connected to the Nth stage of pull-up node, a first electrode of the thirteenth transistor is electrically connected to a fifth output clock signal line, and a second electrode of the thirteenth transistor is electrically connected to an Nth cascading output terminal; a gate electrode of the fourteenth transistor is electrically connected to the first pull-down node, a first electrode of the fourteenth transistor is electrically connected to the Nth cascading output terminal, and a second electrode of the fourteenth transistor is electrically connected to the first voltage line; a gate electrode of the fifteenth transistor is electrically connected to the second pull-down node, a first electrode of the fifteenth transistor is electrically connected to the Nth cascading output terminal, and a second electrode of the fifteenth transistor is electrically connected to the first voltage line; a gate electrode of the sixteenth transistor is electrically connected to the (N+1)th stage of pull-up node, a first electrode of the sixteenth transistor is electrically connected to a sixth output clock signal line, and a second electrode of the sixteenth transistor is electrically connected to an (N+1)th cascading output terminal; a gate electrode of the seventeenth transistor is electrically connected to the first pull-down node, a first electrode of the seventeenth transistor is electrically connected to the (N+1)th cascading output terminal, and a second electrode of the seventeenth transistor is electrically connected to the first voltage line; a gate electrode of the eighteenth transistor is electrically connected to the second pull-down node, and a first electrode of the eighteenth transistor is connected to the (N+1)th stage cascading output terminal and a second electrode of the eighth transistor is electrically connected to the first voltage line.

Optionally, the pull-up node includes an Nth stage of pull-up node and an (N+1)th stage of pull-up node; the pull-up node control circuit includes a nineteenth transistor, a twentieth transistor, a twenty-first transistor, a twenty-second transistor, a twenty-third transistor, a twenty-fourth transistor, a twenty-fifth transistor and a twenty-sixth transistor; N is a positive integer; a gate electrode of the nineteenth transistor is electrically connected to the input terminal, a first electrode of the nineteenth transistor is electrically connected to the first scanning voltage line, and a second electrode of the nineteenth transistor is electrically connected to a first electrode of the twentieth transistor; a gate electrode of the twentieth transistor is electrically connected to the input terminal, and a second electrode of the twentieth transistor is electrically connected to the Nth stage of pull-up node; a gate electrode of the twenty-first transistor is electrically connected to the reset terminal, a first electrode of the twenty-first transistor is electrically connected to the Nth stage of pull-up node, and a second electrode of the twenty-first transistor is electrically connected to a first electrode of the twenty-second transistor; a gate electrode of the twenty-second transistor is electrically connected to the reset terminal, and a second electrode of the twenty-second transistor is electrically connected to the second scanning voltage line; a gate electrode of the twenty-third transistor is electrically connected to the input terminal, a first electrode of the twenty-third transistor is electrically connected to the first scanning voltage line, and a second electrode of the twenty-third transistor is electrically connected to a first electrode of the twenty-fourth transistor; a gate electrode of the twenty-fourth transistor is electrically connected to the input terminal, and a second electrode of the twenty-fourth transistor is electrically connected to the (N+1)th stage of pull-up node; a gate electrode of the twenty-fifth transistor is electrically connected to the reset terminal, a first electrode of the twenty-fifth transistor is electrically connected to the (N+1)th stage of pull-up node, and a second electrode of the twenty-fifth transistor is electrically connected to a first electrode of the twenty-sixth transistor; a gate electrode of the twenty-sixth transistor is electrically connected to the reset terminal, and a second electrode of the twenty-sixth transistor is electrically connected to the second scanning voltage line.

Optionally, the pull-up node includes an Nth stage of pull-up node and an (N+1)th stage of pull-up node; the pull-down node includes a first pull-down node and a second pull-down node; the pull-up node control circuit further includes a twenty-seventh transistor, a twenty-eighth transistor, a twenty-ninth transistor and a thirtieth transistor; N is a positive integer; a gate electrode of the twenty-seventh transistor is electrically connected to the frame reset terminal, a first electrode of the twenty-seventh transistor is electrically connected to the Nth stage of pull-up node, and a second electrode of the twenty-seventh transistor is electrically connected to a first electrode of the twenty-eighth transistor; a gate electrode of the twenty-eighth transistor is electrically connected to the frame reset terminal, and a second electrode of the twenty-eighth transistor is electrically connected to the first voltage line; a gate electrode of the twenty-ninth transistor is electrically connected to the frame reset terminal, a first electrode of the twenty-ninth transistor is electrically connected to the (N+1)th stage of pull-up node, and a second electrode of the twenty-ninth transistor is electrically connected to a first electrode of the thirtieth transistor; a gate electrode of the thirtieth transistor is electrically connected to the frame reset terminal, and a second electrode of the thirtieth transistor is electrically connected to the first voltage line; the pull-down node control circuit includes a thirty-first transistor and a thirty-second transistor; a gate electrode of the thirty-first transistor is electrically connected to the Nth stage of pull-up node, a first electrode of the thirty-first transistor is electrically connected to the first pull-down node, and a second electrode of the thirty-first transistor is electrically connected to the first voltage line; a gate electrode of the thirty-second transistor is electrically connected to the (N+1)th stage of pull-up node, a first electrode of the thirty-second transistor is electrically connected to the second pull-down node, and a second electrode of the thirty-second transistor is electrically connected to the first voltage line.

In a second aspect, an embodiment of the present disclosure provides a display substrate, including a base substrate and a driving circuit arranged on the base substrate.

In a third aspect, an embodiment of the present disclosure provides a display device, including a display substrate.

DETAILED DESCRIPTION

The following will clearly and completely describe the technical solutions in the embodiments of the present disclosure with reference to the accompanying drawings. Obviously, the embodiments are only some of the embodiments of the present disclosure, not all of them. Based on the embodiments in the present disclosure, all other embodiments obtained by those ordinary skill in the art without making creative work belong to the protection scope of the present disclosure.

The transistors used in all the embodiments of the present disclosure may be thin film transistors or field effect transistors or other devices with the same characteristics. In the embodiments of the present disclosure, in order to distinguish the two electrodes of the transistor except the control electrode, one electrode is called the first electrode, and the other electrode is called the second electrode.

In actual operation, when the transistor is a thin film transistor or a field effect transistor, the control electrode may be a gate electrode, the first electrode may be a drain electrode, and the second electrode may be a source electrode; or, the control electrode may be a gate electrode, the first electrode may be a source electrode, and the second electrode may be a drain electrode.

Figure 1:
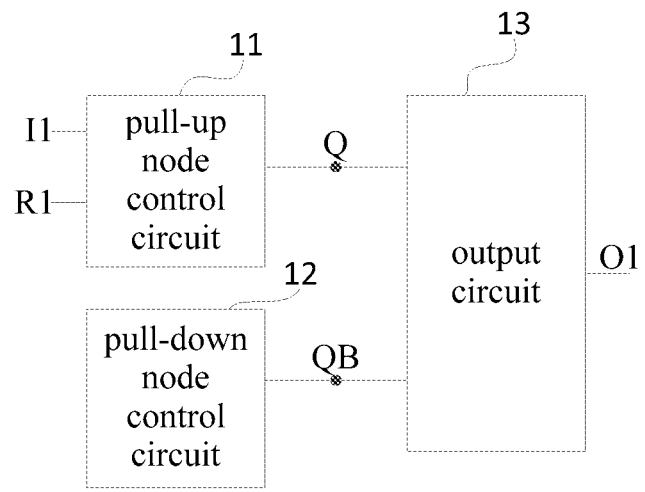
FIG. 1 is a structural diagram of a driving circuit according to at least one embodiment of the present disclosure.

As shown in FIG. 1, the driving circuit in the embodiment of the present disclosure includes a pull-up node control circuit 11, a pull-down node control circuit 12 and an output circuit 13;

the pull-up node control circuit 11 is electrically connected to in input terminal I1, a reset terminal R1 and an pull-up node Q, and is configured to control a potential of the pull-up node Q under the control of an input signal provided by the input terminal I1 and a reset signal provided by the reset terminal R1;

the pull-down node control circuit 12 is electrically connected to a pull-down node QB and is configured to control a potential of the pull-down node QB;

the output circuit 13 is electrically connected to the pull-up node Q, the pull-down node QB and the output terminal O1 respectively, and is configured to control the output terminal O1 to output a signal under the control of the potential of the pull-up node Q and the potential of the pull-down node QB;

the channel length of at least one of the transistors among the at least some transistors included in the output circuit 13, at least some transistors whose gate electrodes are electrically connected to the input terminal included in the pull-up node control circuit 11, and at least some transistors whose gate electrodes are electrically connected to the reset terminal included in the pull-up node control circuit 11 is greater than the channel length of the other transistor included in the driving circuit;

the other transistor is a transistor other than the at least one transistor included in the driving circuit.

In at least one embodiment of the present disclosure, the channel length of at least one of the transistors among the at least some transistors included in the output circuit 13, at least some transistors whose gate electrodes are electrically connected to the input terminal included in the pull-up node control circuit 11, and at least some transistors whose gate electrodes are electrically connected to the reset terminal included in the pull-up node control circuit 11 is set to be greater than the channel length of the other transistor included in the driving circuit, so as to improve the stability of the threshold voltage of the at least one of the transistors and improve the working performance of the driving circuit.

In the specific embodiment, the output terminal can be electrically connected to the gate line, the output circuit 13 is configured to charge and discharge the gate line, the output circuit 13 generates a larger transient current, so that the channel length of at least some transistors included in the output circuit 13 can be set to a larger size, for example, the channel length of at least some transistors included in the output circuit 13 can be set to a first channel length L1.

In the specific embodiment, the pull-up node control circuit is configured to charge and discharge the pull-up node, taking into account the fast response, the transistors whose gate electrodes are electrically connected to the input terminal included in the pull-up node control circuit and the transistors whose gate electrodes are electrically connected to the reset terminal included in the pull-up node control circuit have larger current during the charging and discharging process, so that the channel length of at least some transistors whose gate electrodes are electrically connected to the input terminal included in the pull-up node control circuit can be set to be larger, and the channel length of at least some transistors whose gate electrode are electrically connected to the reset terminal included in the pull-up node control circuit is set to larger, for example, the channel length of at least some transistors whose gate electrodes are electrically connected to the input terminal included in the pull-up node control circuit may be set to a second channel length L2, and the channel length of at least some transistors whose gate electrodes are electrically connected to the reset terminal included in the pull-up node control circuit may be set to a third channel length L3.

In at least one embodiment of the present disclosure, L1 may be greater than or equal to L2, and L1 may be greater than or equal to L3.

Optionally, L1 can be 10 μm, L2 can be 9 μm or 10 μm, and L3 can be 9 μm or 10 μm, but not limited to this.

In at least one embodiment of the present disclosure, the first channel length L1 may be greater than or equal to 9 μm and less than or equal to 16 μm, the second channel length L2 may be greater than or equal to 9 μm and less than or equal to 15 μm, and the third channel length may be greater than or equal to 9 μm and less than or equal to 15 μm, but not limited to this.

In at least one embodiment of the present disclosure, the transistor included in the output circuit can generate a large current, and the transistor whose gate electrode is electrically connected to the input terminal included in the pull-up node control circuit and the transistor whose gate electrode is electrically connected to the reset terminal included in the pull-up node control circuit can generate a second large current.

In at least one embodiment of the present disclosure, according to the different functions of different TFTs in the driving circuit, TFTs are classified according to the currents generated during operation, and the corresponding channel length and channel spacing design are adopted according to the classification results, so as to improve the stability and reliability of the overall circuit, so that the life of the display product is further improved.

Optionally, the output circuit includes a driving output circuit and a cascading output circuit;
the driving output circuit is electrically connected to the pull-up node, the pull-down node and the driving output terminal respectively, and is configured to control the driving output terminal to output the driving signal under the control of the potential of the pull-up node and the potential of the pull-down node;
the cascading output circuit is electrically connected to the pull-up node, the pull-down node and a cascading output terminal respectively, and is configured to controlling the cascading output terminal to output the carry signal under the control of the potential of the pull-up node and the potential of the pull-down node;
at least some transistors included in the output circuit includes:
at least some transistors included in the driving output circuit; and/or,
at least some transistors whose gate electrodes are electrically connected to the pull-up node included in the cascading output circuit.

In the specific embodiment, the output circuit may include a driving output circuit and a cascading output circuit, the driving output circuit controls to output the driving signal, and the cascading output circuit controls to output the carry signal, and the cascading output terminal is used for cascading; for example, the input terminal can be electrically connected to the (N−2)th cascading output terminal, and the reset terminal can be electrically connected to the (N+3)th cascading output terminal, and N is a positive integer; but is not limited to this.

Figure 2:
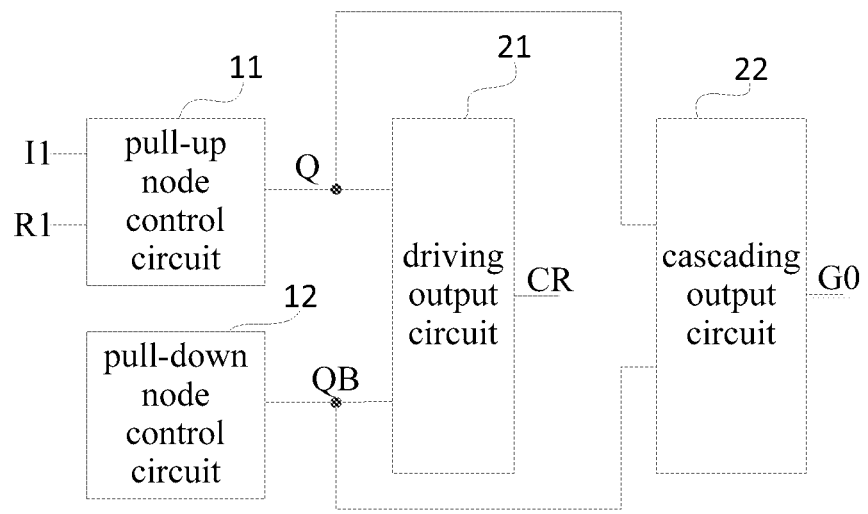
FIG. 2 is a structural diagram of a driving circuit according to at least one embodiment of the present disclosure.

As shown in FIG. 2, on the basis of the embodiment of the driving circuit shown in FIG. 1, the output circuit may include a driving output circuit 21 and a cascading output circuit 22;
the driving output circuit 21 is electrically connected to the pull-up node Q, the pull-down node QB and the driving output terminal G0 respectively, and is configured to control the driving output terminal G0 to output the driving signal under the control of the potential of the pull-up node Q and the potential of the pull-down node QB;
the cascading output circuit 22 is electrically connected to the pull-up node Q, the pull-down node QB and the cascading output terminal CR respectively, and is configured to control the cascading output terminal CR to output the carry signal under the control of the potential of the pull-up node Q and the potential of the pull-down node QB.

Optionally, the output circuit is a driving output circuit;
The driving output circuit is electrically connected to the pull-up node, the pull-down node and the driving output terminal respectively, and is configured to control the driving output terminal to output the driving signal under the control of the potential of the pull-up node and the potential of the pull-down node.

In the specific embodiment, the output circuit may include a driving output circuit, the driving output circuit can control the output driving signal, and the driving signal may be used for cascading.

In at least one embodiment of the present disclosure, the active pattern of at least one transistor included in the driving output circuit include at least two active pattern portions arranged at intervals; a spacing between adjacent two active pattern portions in at least one transistor included in the driving output circuit is a first spacing.

In the specific embodiment, the transistor included in the driving output circuit generates a large current, the width-length ratio of at least some transistors included in the driving output circuit can be set to a larger size, the active pattern included in the driving output circuit are set to include at least two active pattern portions arranged at intervals, the spacing between the adjacent two active pattern portions in at least one transistor included in the driving output circuit can be the first spacing J1, and the J1 can be set to a larger size to improve the heat dissipation effect, so that the heat distribution of the transistor that produces a large current is uniform, which is conducive to improving the stability of the transistor that produces a large current.

In at least one embodiment of the present disclosure, the active pattern of at least one transistor whose gate electrode is electrically connected to the input terminal included in the pull-up node control circuit include at least two active pattern portions arranged at intervals; the active pattern of at least one transistor whose gate electrode is electrically connected to the reset terminal included in the pull-up node control circuit include at least two active pattern portions arranged at intervals;

The spacing between the adjacent two active pattern portions in at least one transistor whose gate electrode is electrically connected to the input terminal is the second spacing;

the spacing between the adjacent two active pattern portions in at least one transistor whose gate electrode is electrically connected to the reset terminal is the third spacing;

the first spacing is greater than the second spacing, and the first spacing is greater than the third spacing.

In the specific embodiment, the transistor whose gate electrode is electrically connected to the input terminal included in the pull-up node control circuit and the transistor whose gate electrode is electrically connected to the reset terminal included in the pull-up node control circuit can generate a second large current, the transistor whose gate electrode is electrically connected to the input terminal included in the pull-up node control circuit is configured to charge the pull-up node, and the transistor whose gate electrode is electrically connected to the reset terminal included in the pull-up node control circuit is configured to discharge the pull-up node, and taking into account the fast response, the width-to-length ratio of the transistor whose gate electrode is electrically connected to the input terminal included in the pull-up node control circuit and the width-to-length ratio of the transistor whose gate electrode is electrically connected to the reset terminal included in the pull-up node control circuit are set to be larger, therefore, the active pattern of at least one transistor whose gate electrode is electrically connected to the input terminal included in the pull-up node control circuit can be set to include at least two active pattern portions arranged at intervals, and the active pattern of at least one transistor whose gate electrode is electrically connected to the reset terminal included in the pull-up node control circuit are set to include at least two active pattern portions arranged at intervals, the spacing between the adjacent two active pattern portions in at least one transistor whose gate electrode is electrically connected to the input terminal and the spacing between the adjacent two active pattern portions in at least one transistor whose gate electrode is electrically connected to the reset terminal are set to be larger, the spacing between the two adjacent active pattern portions in the at least one transistor whose gate electrode is electrically connected to the input terminal can be a second spacing J2, and the spacing between the adjacent two active pattern portions in at least one transistor whose gate electrode is electrically connected to the reset terminal can be the third spacing J3 so as to facilitate heat dissipation; wherein the first spacing J1 can be greater than the second spacing J2, the first spacing is greater than the third spacing J3.

For example, the first spacing J1 can be 20.5 µm, the second spacing J2 and the third spacing J3 can be 10.5 µm, but this is not limited; in the implements, J1, J2 and J3 can be set according to actual conditions.

In at least one embodiment of the present disclosure, the first spacing J1 may be greater than or equal to 15 µm and less than or equal to 30 µm, and the second spacing J2 and the third spacing J3 may be greater than or equal to 8.5 µm and less than or equal to 14 µm, but are not limited to this.

Optionally, the output circuit includes a driving output circuit and a cascading output circuit;

the active pattern of at least one transistor whose gate electrode is electrically connected to the pull-up node included in the cascading output circuit includes at least two active pattern portions arranged at intervals;

the spacing between the two adjacent active pattern portions in at least one transistor whose gate electrode is electrically connected to the pull-up node is the fourth spacing;

The first spacing is greater than the fourth spacing.

In the specific embodiment, when the output circuit includes a cascading output circuit, the transistor whose gate electrode is electrically connected to the pull-up node included in the cascading output circuit charges the transistor whose gate electrode is electrically connected to the cascading output terminal included in a backward cascading circuit, the transistor whose gate electrode is electrically connected to the pull-up node included in the cascading output circuit generates a second large current, and the active pattern of at least one transistor whose gate electrode is electrically connected to the pull-up node included in the cascading output circuit includes at least two active pattern portions arranged at intervals; the spacing between the adjacent two active pattern portions in at least one transistor whose gate electrode is electrically connected to the pull-up node is a fourth spacing J4, and the fourth spacing J4 is smaller than the first spacing J1.

For example, the fourth spacing J4 may be 10.5 µm, but not limited to this; in the specific embodiment, the fourth spacing J4 may also be 9.5 µm or 11.5 µm, and the fourth spacing J4 can be selected according to the actual conditions.

In at least one embodiment of the present disclosure, J4 may be greater than or equal to 8.5 µm and less than or equal to 14 µm, but not limited to this.

In at least one embodiment of the present disclosure, the channel length of at least one transistor whose gate electrode is electrically connected to the pull-up node included in the cascading output circuit may be set to the fourth channel length L4, and the fourth channel length L4 may be less than or equal to the first channel length L1, but not limited to this.

For example, L1 can be 10 µm and L4 can be 10 µm or 9 µm, but not limited to this.

In at least one embodiment of the present disclosure, L4 may be greater than or equal to 9 µm and less than or equal to 15 µm, but not limited to this.

In at least one embodiment of the present disclosure, the channel length of at least one transistor included in the driving output circuit is greater than or equal to the channel length of the transistor whose gate electrode is electrically connected to the input terminal included in the pull-up node control circuit;

the channel length of at least one transistor included in the driving output circuit is greater than or equal to the channel length of the transistor whose gate electrode is electrically connected to the reset terminal included in the pull-up node control circuit;

the channel length of at least one transistor included in the driving output circuit is greater than or equal to the channel length of the transistor whose gate electrode is electrically connected to the pull-up node included in the cascading output circuit.

In the specific embodiment, the transistor included in the driving output circuit generates a large current, the transistor whose gate electrode is electrically connected to the input terminal included in the pull-up node control circuit generates a second large current, the transistor whose gate electrode is electrically connected to the reset terminal included in the pull-up node control circuit generate a second large current, the transistor whose gate electrode is electrically connected to the pull-up node included in the cascading output circuit generates the second large current, so that the channel length of at least one transistor included in the driving output circuit can be set to be greater than or equal to the channel length of the transistor whose gate electrode is electrically connected to input terminal included in the pull-up node control circuit, the channel length of at least one transistor included in the driving output circuit is set to be greater than or equal to the channel length of the transistor whose gate electrode is electrically connected to the reset terminal included in the pull-up node control circuit, and the channel length of at least one transistor included in the driving output circuit is set to be greater than or equal to the channel length of the transistor whose gate electrode is electrically connected to the pull-up node included in the cascading output circuit.

Optionally, the pull-up node control circuit is also electrically connected to s frame reset terminal, is configured to control the potential of the pull-up node under the control of a frame reset signal provided by the frame reset terminal;

the pull-down node control circuit is also electrically connected to the pull-up node and is configured to control the potential of the pull-down node under the control of the potential of the pull-up node;

the channel length of the transistor whose gate electrode is electrically connected to the frame reset terminal included in the pull-up node control circuit is less than the channel length of at least one transistor whose gate electrode is electrically connected to the reset terminal included in the pull-up node control circuit, and the channel length of the transistor whose gate electrode is electrically connected to the frame reset terminal included in the pull-up node control circuit is less than the channel length of at least one transistor whose gate electrode is electrically connected to the pull-up node included in the cascading output circuit;

The channel length of the transistor whose gate electrode is electrically connected to the pull-up node is less than the channel length of at least one transistor whose gate electrode is electrically connected to the reset terminal included in the pull-up node control circuit, and the channel length of the transistor whose gate electrode is electrically connected to the pull-up node is less than the channel length of at least one transistor whose gate electrode is electrically connected to the pull-up node included in the cascading output circuit.

In the specific embodiment, the pull-up node control circuit can also be electrically connected to the frame reset terminal, under the control of the frame reset signal, the potential of the pull-up node is controlled, the frame reset terminal provides an effective voltage signal between the two frames, and the transistor whose gate electrode is electrically connected to the frame reset terminal included in the pull-up node control circuit is turned on.

In at least one embodiment of the present disclosure, the transistor whose gate electrode is electrically connected to the frame reset terminal included in the pull-up node control circuit and the transistor whose gate electrode is electrically connected to the pull-up node included in the pull-down node control circuit have a smaller current when charging and discharging, so that the channel length of the transistor whose gate electrode is electrically connected to the frame reset terminal included in the pull-up node control circuit may be set to be smaller than the channel length of at least one transistor whose gate electrode is electrically connected to the reset terminal included in the pull-up node control circuit, the channel length of the transistor whose gate electrode is electrically connected to the frame reset terminal included in the pull-up node control circuit is set to be smaller than the channel length of at least one transistor whose gate electrode is electrically connected the pull-up node included in the cascading output circuit, and the channel length of the transistor whose gate electrode is electrically connected to the pull-up node included in the pull-down node control circuit is set to be smaller than the channel length of at least one transistor whose gate electrode is electrically connected to the reset terminal included in the pull-up node control circuit, the channel length of the transistor whose gate electrode is electrically connected to the pull-up node included in the pull-down node control circuit is set to be smaller than the channel length of at least one transistor whose gate electrode is electrically connected to the pull-up node included in the cascading output circuit.

Figure 3:
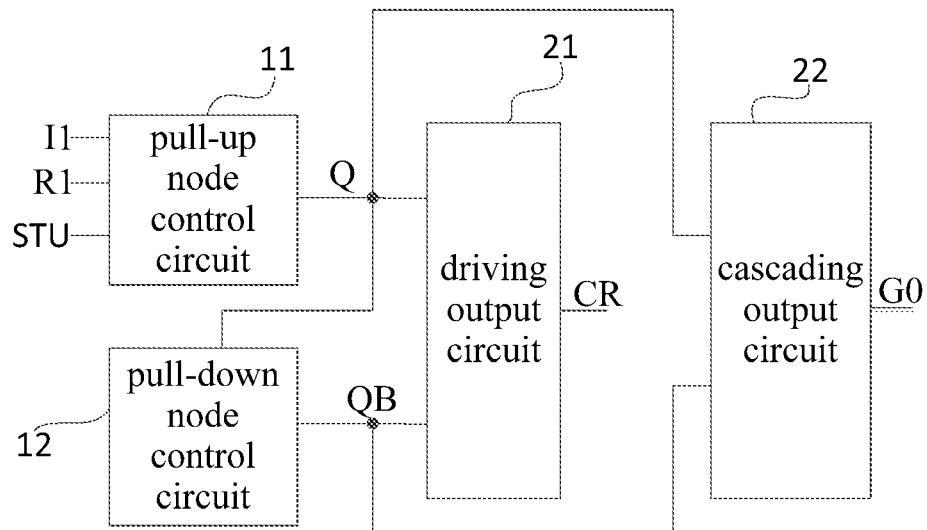
FIG. 3 is a structural diagram of a driving circuit according to at least one embodiment of the present disclosure.

As shown in FIG. 3, on the basis of at least one embodiment of the driving circuit shown in FIG. 2, the pull-up node control circuit 11 is also electrically connected to the frame reset terminal STU and is configured to control the potential of the pull-up node Q under the control of the frame reset signal provided by the frame reset terminal SCU;

The pull-down node control circuit 12 is also electrically connected to the pull-up node Q and is configured to control the potential of the pull-down node QB under the control of the potential of the pull-up node Q.

In at least one embodiment of the present disclosure, the channel length of the transistor whose gate electrode is electrically connected to the frame reset terminal included in the pull-up node control circuit may be set to the fifth channel length L5, and the channel length of the transistor whose gate electrode is electrically connected to the pull-up node included in the pull-down node control circuit is set to the sixth channel length L6;

the fifth channel length L5 is less than the first channel length L1, the sixth channel length L6 is less than the first channel length L1, the fifth channel length L5 is less than the fourth channel length L4, and the sixth channel length L6 is less than the fourth channel length L4.

For example, the fifth channel length L5 and the sixth channel length L6 can be 8 μm, and the first channel length L1 and the fourth channel length L4 can be 10 μm, but not limited to this.

In at least one embodiment of the present disclosure, the fifth channel length L5 and the sixth channel length L6 may be greater than or equal to 6 μm and less than 9 μm, but are not limited thereto.

In at least one embodiment of the present disclosure, the pull-up node control circuit is also electrically connected to the frame reset terminal, is configured to control the potential of the pull-up node under the control of the frame reset signal provided by the frame reset terminal;

the pull-down node control circuit is also electrically connected to the pull-up node and is configured to control the potential of the pull-down node under the control of the potential of the pull-up node;

the active pattern of at least one transistor whose gate electrode is electrically connected to the frame reset terminal included in the pull-up node control circuit include at least two active pattern portions arranged at intervals, and the spacing between the adjacent active pattern portions of at least one transistor whose gate electrode is electrically connected to the frame reset terminal is the fifth spacing;

the active pattern of at least one transistor whose gate electrode is electrically connected to the pull-up node included in the pull-down node control circuit include at least two active pattern portions arranged at intervals, and the spacing between the adjacent active pattern portions of at least one transistor whose gate electrode is electrically connected to the pull-up node included in the pull-down node control circuit is the sixth spacing;

the second spacing is greater than the fifth spacing, the second spacing is greater than the sixth spacing, and/or the third spacing is greater than the fifth spacing, and the third spacing is greater than the sixth spacing.

In the specific embodiment, the active pattern of at least one transistor whose gate electrode is electrically connected to the frame reset terminal included in the pull-up node control circuit can be set to include at least two active pattern portions arranged at intervals, the spacing between the adjacent active pattern portions of at least one transistor whose gate electrode is electrically connected to the frame reset terminal is the fifth spacing J5, and the active pattern of at least one transistor whose gate electrode is electrically connected to the pull-up node included in the pull-down node control circuit are set to include at least two active pattern portions arranged at intervals, the spacing between the adjacent active pattern portions of at least one transistor whose gate electrode is electrically connected to the pull-down node included in the pull-down node control circuit is the sixth spacing J6;

The second spacing J2 is greater than the fifth spacing J5, the second spacing J2 is greater than the sixth spacing J6, and/or, the third spacing J3 is greater than the fifth spacing J5, and the third spacing J3 is greater than the sixth spacing J6.

For example, the second spacing J2 and the third spacing J3 may be 10.5 µm, and the fifth spacing J5 and the sixth spacing J6 may be 8 µm, but are not limited to this.

In at least one embodiment of the present disclosure, the fifth spacing J5 and the sixth spacing J6 may be greater than or equal to 6 µm and less than 8.5 µm, but not limited to this.

Optionally, the pull-up node control circuit is also electrically connected to the frame reset terminal, is configured to control the potential of the pull-up node under the control of the frame reset signal provided by the frame reset terminal;

the pull-down node control circuit is also electrically connected to the pull-up node and is configured to control the potential of the pull-down node under the control of the potential of the pull-up node;

the active pattern of at least one transistor whose gate electrode is electrically connected to the frame reset terminal included in the pull-up node control circuit include at least two active pattern portions arranged at intervals, and the spacing between the adjacent active pattern portions of at least one transistor whose gate electrode is electrically connected to the frame reset terminal is the fifth spacing;

the active pattern of at least one transistor whose gate electrode is electrically connected to the pull-up node included in the pull-down node control circuit include at least two active pattern portions arranged at intervals, and the spacing between the adjacent active pattern portions of at least one transistor whose gate electrode is electrically connected to the pull-up node included in the pull-down node control circuit is the sixth spacing;

the fourth spacing is greater than the fifth spacing, and the fourth spacing is greater than the sixth spacing.

In at least one embodiment of the present disclosure, the fourth spacing may be greater than the fifth spacing, and the fourth spacing may be greater than the sixth spacing.

For example, the fifth spacing and the sixth spacing can be 8 µm, and the fourth spacing can be 10.5 µm, but not limited to this.

In at least one embodiment of the present disclosure, the width-to-length ratio of at least one transistor included in the driving output circuit is greater than the width-to-length ratio of the transistor whose gate electrode is electrically connected to the input terminal included in the pull-up node control circuit;

the width-to-length ratio of at least one transistor included in the driving output circuit is greater than the width-to-length ratio of the transistor whose gate electrode is electrically connected to the reset terminal included in the pull-up node control circuit;

the width-to-length ratio of at least one transistor included in the driving output circuit is greater than the width-to-length ratio of the transistor whose gate electrode is electrically connected to the pull-up node included in the cascading output circuit.

In the specific embodiment, the transistor included in the driving output circuit generates a large current, the transistor whose gate electrode is electrically connected to the input terminal included in the pull-up node control circuit generates a second large current, the transistor whose gate electrode is electrically connected to the reset terminal included in the pull-up node control circuit generates a second large current, the transistor whose gate electrode is electrically connected to the pull-up node included in the cascading output circuit generates a second large current, therefore, the width-to-length ratio of at least one transistor included in the driving output circuit can be set to be greater than the width-to-length ratio of the transistor whose gate electrode is electrically connected to the input terminal included in the pull-up node control circuit, the width-to-length ratio of at least one transistor included in the driving output circuit is set to be greater than the width-to-length ratio of the transistor whose gate electrode is electrically connected to the reset terminal included in the pull-up node control circuit, and the width-to-length ratio of at least one transistor included in the driving output circuit is set to be greater than the width-to-length ratio of the transistor whose gate electrode is electrically connected to the pull-up node included in the cascading output circuit.

In at least one embodiment of the present disclosure, the pull-up node control circuit is also electrically connected to the frame reset terminal, is configured to control the potential of the pull-up node under the control of the frame reset signal provided by the frame reset terminal; the pull-down node control circuit is also electrically connected to the pull-up node, is configured to control the potential of the pull-down node under the control of the potential of the pull-up node;

the width-to-length ratio of at least one transistor whose gate electrode is electrically connected to the input terminal included in the pull-up node control circuit is greater than the width-to-length ratio of the transistor whose gate electrode is electrically connected to the frame reset terminal included in the pull-up node control circuit;

the width-to-length ratio of at least one transistor whose gate electrode is electrically connected to the reset terminal included in the pull-up node control circuit is greater than the width-to-length ratio of the transistor whose gate electrode is electrically connected to the pull-up node included in the pull-down node control circuit;

the width-to-length ratio of at least one transistor whose gate electrode is electrically connected to the pull-up node included in the cascading output circuit is greater than the width-to-length ratio of the transistor whose gate electrode is electrically connected to the frame reset terminal included in the pull-up node control circuit;

The width-to-length ratio of the at least one transistor whose gate electrode is electrically connected to the pull-up node included in the cascading output circuit is greater than the width-to-length ratio of the transistor whose gate electrode is electrically connected to the pull-up node included in the pull-down node control circuit.

In the specific embodiment, the transistor whose gate electrode is electrically connected to the frame reset terminal included in the pull-up node control circuit and the transistor whose gate electrode is electrically connected to the pull-up node included in the pull-down node control circuit have a smaller current during the charging and the discharging process, therefore, the width-length ratio of at least one transistor whose gate electrode is electrically connected to the input terminal included in the pull-up node control circuit can be set to be greater than the width-length ratio of the transistor whose gate electrode is electrically connected to the frame reset terminal included in the pull-up node control circuit, the width-to-length ratio of the at least one transistor whose gate electrode is electrically connected to the reset terminal included in the pull-up node control circuit is set to be greater than the width-to-length ratio of the transistor whose gate electrode is electrically connected to the pull-up node included in the pull-down node control circuit, the width-to-length ratio of the at least one transistor whose gate electrode is electrically connected to the pull-up node included in the cascading output circuit is set to be greater than the width-to-length ratio of the transistor whose gate electrode is electrically connected to the frame reset terminal included in the pull-up node control circuit, the width-to-length ratio of the at least one transistor whose gate electrode is electrically connected to the pull-up node included in the cascading output circuit is set to be greater than the width-length ratio of the transistor whose gate electrode is electrically connected to the pull-up node included in the pull-down node control circuit.

In at least one embodiment of the present disclosure, the pull-up node control circuit may include an Nth stage of pull-up node control circuit and an (N+1)th stage of pull-up node control circuit, and the pull-down node control circuit includes a first pull-down node control circuit and a second pull-down node control circuit; N is a positive integer;

the Nth stage of pull-up node control circuit is electrically connected to the input terminal, the reset terminal, the first scanning voltage line, the second scanning voltage line and the Nth stage of pull-up node respectively, is configured to control to connect the Nth stage of pull-up node and the first scanning voltage line under the control of the input signal, and control to connect the Nth stage of pull-up node and the second scanning voltage line under the control of the reset signal;

the (N+1)th stage of pull-up node control circuit is electrically connected to the input terminal, the reset terminal, the first scanning voltage line, the second scanning voltage line and the (N+1)th stage of pull-up node respectively, is configured to control to connect the (N+1)th stage of pull-up node and the first scanning voltage line under the control of the input signal, and control to connect the (N+1)th stage of pull-up node and the second scanning voltage line under the control of the reset signal;

The first pull-down node control circuit is respectively electrically connected to the first control voltage line, the Nth stage of pull-up node, the first pull-down node, the first pull-down control node and the first voltage line, is configured to control the potential of the first pull-down control node under the control of the first control voltage provided by the first control voltage line and the potential of the Nth stage of pull-up node, control to connect the first pull-down node and the first control voltage line under the control of the potential of the first pull-down control node, and control to connect the first pull-down node and the first voltage line under the control of the potential of the Nth stage of pull-up node;

the second pull-down node control circuit is electrically connected to the second control voltage line, the (N+1)th stage of pull-up node, the second pull-down node, the second pull-down control node and the first voltage line respectively, and is configured to control the potential of the second pull-down control node under the control of the second control voltage provided by the second control voltage line and the potential of the (N+1)th stage of pull-up node, and control to connect the second pull-down node and the second control voltage line under the control of the potential of the second pull-down control node, and control to connect the second pull-down node and the first voltage line under the control of the potential of the (N+1)th stage of pull-up node.

In the specific embodiment, the pull-up node may be an Nth stage of pull-up node and an (N+1)th stage of pull-up node, the pull-down node may include a first pull-down node and a second pull-down node, the pull-up node control circuit may include an Nth stage of pull-up node control circuit and an (N+1)th stage of pull-up node control circuit, the pull-down node control circuit includes a first pull-down node control circuit and a second pull-down node control circuit, and the Nth stage of pull-up node control circuit controls the potential of the Nth stage of pull-up node, the (N+1)th stage of pull-up node control circuit controls the potential of the (N+1)th stage of pull-up node, the first pull-down node control circuit controls the potential of the first pull-down node, and the second pull-down node control circuit controls the potential of the second pull-down node.

Optionally, the first voltage line may be the first low voltage line, but is not limited to this.

Figure 4:
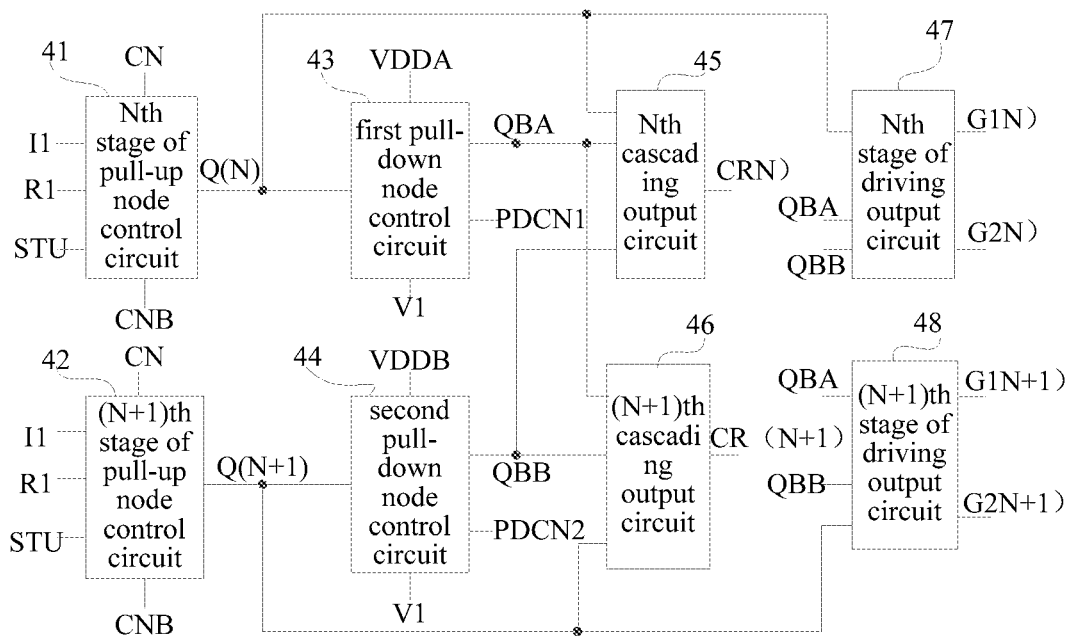
FIG. 4 is a structural diagram of a driving circuit according to at least one embodiment of the present disclosure.

As shown in FIG. 4, on the basis of at least one embodiment of the driving circuit shown in FIG. 3, the pull-up node control circuit may include an Nth stage of pull-up node control circuit 41 and an (N+1)th stage of pull-up node control circuit 42, the pull-down node control circuit includes a first pull-down node control circuit 43 and a second pull-down node control circuit 44; N is a positive integer; the pull-up node includes an Nth stage of pull-up node Q (N) and an (N+1)th stage of pull-up node Q (N+1), the pull-down node includes a first pull-down node QBA and a second pull-down node QBB;

The Nth stage of pull-up node control circuit 41 is respectively electrically connected to the input terminal I1, the reset terminal R1, the frame reset terminal STU, the first scanning voltage line CN, the second scanning voltage line CNB, the first voltage line V1 and the Nth stage of pull-up node Q (N), is configured to control to connect the Nth stage of pull-up node Q (N) and the first scanning voltage line CN under the control of the input signal provided by the input terminal I1, and control to connect the Nth stage of pull-up node Q (N) and the second scanning voltage line CNB under the control of the reset signal provided by the reset terminal R1, and control to connect the Nth stage of pull-up node Q (N) and the first voltage line V1 under the control of the frame reset signal provided by the frame reset terminal STU;

The (N+1)th stage of pull-up node control circuit 42 is respectively electrically connected to the input terminal I1, the reset terminal R1, the frame reset terminal STU, the first scanning voltage line CN, the second scanning voltage line CNB, the first voltage line V1 and (N+1)th stage of pull-up node Q (N+1), is configured to control to connect the (N+1)th stage of pull-up node Q (N+1) and the first scanning voltage line CN under the control of the input signal, and control to connect the (N+1)th stage of pull-up node Q (N+1) and the second scanning voltage line CNB under the control of the reset signal, and control to connect the (N+1)th stage of pull-up node Q (N+1) and the first voltage line V1 under the control of the frame reset signal provided by the frame reset terminal SCU;

The first pull-down node control circuit 43 is respectively electrically connected to the first control voltage line VDDA, the Nth stage of pull-up node Q (N), the first pull-down node QBA, the first pull-down control node PDCN1 and the first voltage line V1, is configured to control the potential of the first pull-down control node PDCN1 under the control of the first control voltage provided by the first control voltage line VDDA and the potential of the Nth stage of pull-up node Q (N), control to connect the first pull-down node QBA and the first control voltage line VDDA under the control of the potential of the first pull-down control node PDCN1, and control to connect the first pull-down node QBA and the first voltage line V1 under the control of the potential of the Nth stage of pull-up node Q (N);

the second pull-down node control circuit 44 is electrically connected to the second control voltage line VDDB, the (N+1)th stage of pull-up node Q (N+1), the second pull-down node QBB, the second pull-down control node PDCN2 and the first voltage line V1 respectively, and is configured to control the potential of the second pull-down control node PDCN2 under the control of the second control voltage provided by the second control voltage line VDDB and the potential of the (N+1)th stage of pull-up node Q (N+1), control to connect the second pull-down node QBB and the second control voltage line VDDB under the control of the potential of the second pull-down control node PDCN2, and control to connect the second pull-down node QBB and the first voltage line V1 under the control of the potential of the (N+1)th stage of pull-up node Q (N+1);

the cascading output circuit includes the Nth cascading output circuit 45 and the (N+1)th cascading output circuit 46; the cascading output terminal includes the Nth cascading output CR (N) and the (N+1)th cascading output terminal CR (N+1);

The driving output circuit includes Nth stage of driving output circuit 47 and (N+1)th stage of driving output circuit 48; the driving output terminal includes Nth stage of first driving output terminal G1 (N), Nth stage of second driving output terminal G2 (N), (N+1)th stage of first driving output terminal G1 (N+1) and (N+1)th stage of second driving output terminal G2 (N+1);

the Nth cascading output circuit 45 is electrically connected to the Nth stage of pull-up node Q (N), the first pull-down node QBA, the second pull-down node QBB and the Nth cascading output terminal CR (N) respectively, and is configured to control the Nth cascading output terminal CR (N) to output Nth carry signal under the control of the potential of the Nth stage of pull-up node Q (N), the potential of the first pull-down node QBA and the potential of the second pull-down node QBB;

the (N+1)th cascading output circuit 46 is electrically connected to the (N+1)th stage of pull-up node Q (N+1), the first pull-down node QBA, the second pull-down node QBB and the (N+1)th cascading output terminal CR (N+1) respectively, and is configured to control the (N+1)th cascading output terminal CR (N+1) to output the (N+1)th carry signal under the control of the potential of the (N+1)th stage of pull-up node Q (N+1), the potential of the first pull-down node QBA and the potential of the second pull-down node QBB;

The Nth stage of driving output circuit 47 is electrically connected to Nth stage of pull-up node Q (N), the first pull-down node QBA, the second pull-down node QBB, the Nth stage of first driving output terminal G1 (N) and the Nth stage of second driving output terminal G2 (N) respectively, and is configured to control the Nth stage of first driving output terminal G1 (N) to output the Nth stage of first driving signal under the control of the potential of the Nth stage of pull-up node Q (N), the potential of the first pull-down node QBA and the potential of the second pull-down node QBB, and control the Nth stage of second driving output terminal G2 (N) to output the Nth stage of second driving signal;

the (N+1)th stage of driving output circuit 48 is electrically connected to the (N+1)th stage of pull-up node Q (N+1), the first pull-down node QBA, the second pull-down node QBB, the (N+1)th stage of first driving output terminal G1 (N+1) and the (N+1)th stage of second driving output terminal G2 (N+1) respectively, and is configured to control the (N+1)th stage first driving output terminal G1 (N+1) to output the (N+1)th stage of first driving signal and control the (N+1)th stage of second driving output terminal G2 (N+1) to output the (N+1)th stage of second driving signal under the control of the potential of the (N+1)th stage of pull-up node Q (N+1), the potential of the first pull-down node QBA and the potential of the second pull-down node QBB.

Optionally, the pull-up node control circuit further includes an Nth stage of pull-up control circuit and an (N+1)th stage of pull-up control circuit;

The Nth stage of pull-up control circuit is respectively electrically connected to the Nth stage of pull-up node, the first pull-down node, the second pull-down node, the enabling terminal, the input terminal, the third control node, the first node, the first clock signal line, the first pull-down node, the second pull-down node and the first voltage line, is configured to control to connect the third control node and the input terminal under the control of an enabling signal provided by the enabling terminal, control to connect the first node and the first clock signal line under the control of the potential of the third control node, control to connect the first node and the Nth stage of pull-up node under the control of the first clock signal provided by the first clock signal line, control to connect the Nth stage of pull-up node and the first voltage line under the control of the potential of the first pull-down node, and control to connect the Nth stage of pull-up node and the first voltage line under the control of the potential of the second pull-down node;

The (N+1)th stage of pull-up control circuit is electrically connected to the (N+1)th stage of pull-up node, the first clock signal line, the first node, the first pull-down node, the second pull-down node and the first voltage line respectively, is configured to control to connect the (N+1)th stage of pull-up node and first node under the control of the first clock signal, control to connect the (N+1)th stage of pull-up node and first voltage line under the control of the potential of the first pull-down node, and control to connect the (N+1)th stage of pull-up node and the first voltage line under the control of the potential of the second pull-down node.

In the specific embodiment, the pull-up node control circuit may also include an Nth stage of pull-up control circuit and an (N+1)th stage of pull-up control circuit; the Nth stage of pull-up control circuit controls the potential of the Nth stage of pull-up node, and the (N+1)th stage of pull-up control circuit controls the potential of the (N+1)th stage of pull-up node.

Figure 5:
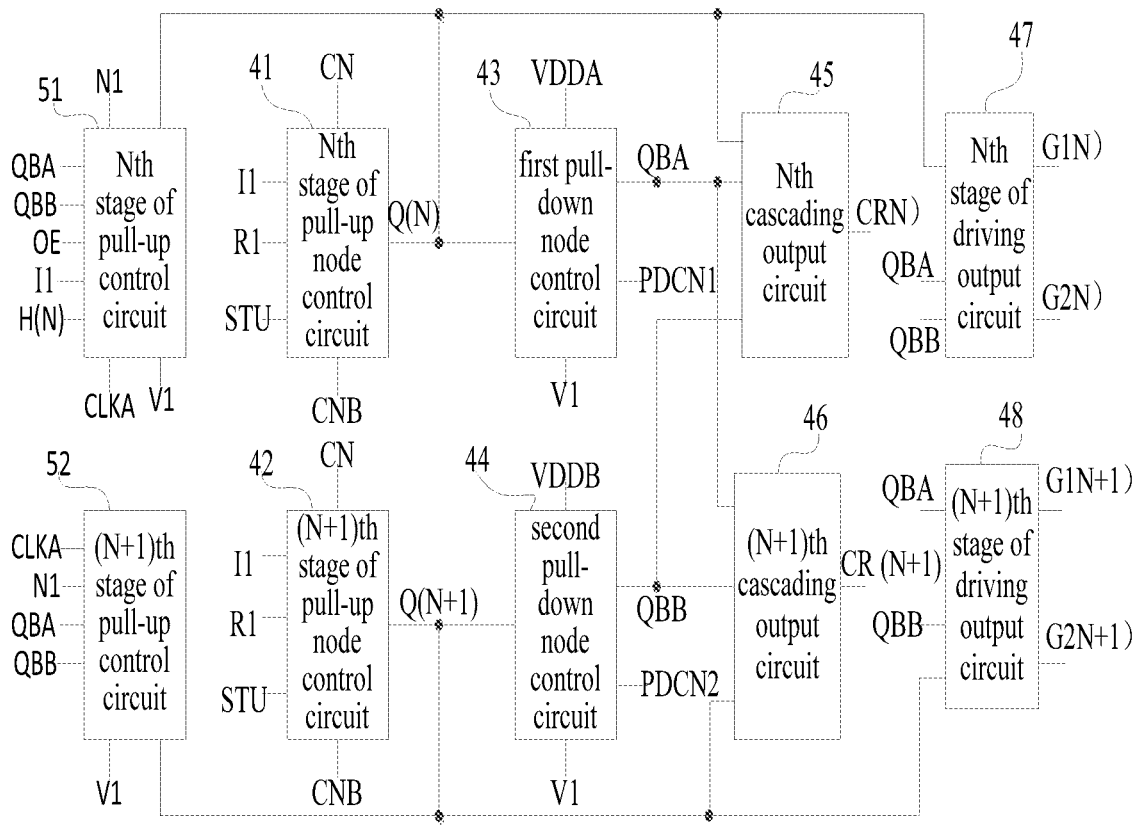
FIG. 5 is a structural diagram of a driving circuit according to at least one embodiment of the present disclosure.

As shown in FIG. 5, on the basis of at least one embodiment of the driving circuit shown in FIG. 4, the pull-up node control circuit further includes an Nth stage of pull-up control circuit 51 and an (N+1)th stage of pull-up control circuit 52;

The Nth stage of pull-up control circuit 51 is respectively electrically connected to the Nth stage of pull-up node Q (N), the first pull-down node QBA, the second pull-down node QBB, the enabling terminal OE, the input terminal I1, the third control node H (N), the first node N1, the first clock signal line CLKA and the first voltage line V1, is configured to control to connect the third control node H (N) and the input terminal I1 under the control of the enabling signal provided by the enabling terminal OE, control to connect the first node N1 and the first clock signal line CLKA under the control of the potential of the third control node H (N), control to connect the first node N1 and the Nth stage of pull-up node Q (N) under the control of the first clock signal provided by the first clock signal line CLKA, and control to connect the Nth stage of pull-up node Q (N) and the first voltage line V1 under the control of the potential of the first pull-down node QBA, and control to connect the Nth stage of pull-up node Q (N) and the first voltage line V1 under the control of the potential of the second pull-down node QBB;

the (N+1)th stage of pull-up control circuit 52 is respectively electrically connected to the (N+1)th stage of pull-up node Q (N+1), the first clock signal line CLKA, the first node N1, the first pull-down node QBA, the second pull-down node QBB and the first voltage line V1, is configured to control to connect the (N+1)th stage of pull-up node Q (N+1) and the first node N1 under the control of the first clock signal, and controls to connect the (N+1)th stage of pull-up node Q (N+1) and the first voltage line V1 under the control of the potential of the first pull-down node QBA, and control to connect the (N+1)th stage of pull-up node Q (N+1) and the first voltage line V1 under the control of the potential of the second pull-down node QBB.

In at least one embodiment of the present disclosure, the output circuit includes a driving output circuit and a cascading output circuit;

the channel length of the transistor whose gate electrode is electrically connected to the enabling terminal included in the Nth stage of pull-up control circuit, the channel length of the transistor whose gate electrode is electrically connected to the third control node included in the Nth stage of pull-up control circuit, the channel length of the transistor whose gate electrode is electrically connected to the first clock signal line included in the Nth stage of pull-up control circuit, the channel length of the transistor whose gate electrode is electrically connected to the first pull-down node included in the Nth stage of pull-up control circuit, and the channel length of the transistor whose gate electrode is electrically connected to the second pull-down node included in the Nth stage of pull-up control circuit is smaller than the channel length of at least one transistor whose gate electrode is electrically connected to the pull-up node included in the cascaded output circuit;

the channel length of the transistor whose gate electrode is electrically connected to the first clock signal line included in the (N+1)th stage of pull-up control circuit, the channel length of the transistor whose gate electrode is electrically connected to the first pull-down node included in the (N+1)th stage of pull-up control circuit, and the channel length of the transistor whose gate electrode is electrically connected to the second pull-down node included in the (N+1)th stage of pull-up control circuit is smaller than the channel length of at least one transistor whose gate electrode is electrically connected to the pull-up node included in the cascading output circuit.

In the specific embodiment, the channel length of the transistor whose gate electrode is electrically connected to the enabling terminal included in the Nth stage of pull-up control circuit, the channel length of the transistor whose gate electrode is electrically connected to the third control node included in the Nth stage of pull-up control circuit, the channel length of the transistor whose gate electrode is electrically connected to the first clock signal line included in the Nth stage of pull-up control circuit, the channel length of the transistor whose gate electrode is electrically connected to the first pull-down node included in the Nth stage of pull-up control circuit, the channel length of the transistor whose gate electrode is electrically connected to the second pull-down node included in the Nth stage of pull-up control circuit is set to be smaller than the channel length of at least one transistor whose gate electrode is electrically connected to the pull-up node included in the cascading output circuit, the channel length of the transistor whose gate electrode is electrically connected to the first clock signal line included in the (N+1)th stage of pull-up control circuit, the channel length of the transistor whose gate electrode is electrically connected to the first pull-down node included in the (N+1)th stage of pull-up control circuit, and, the channel length of the transistor whose gate electrode is electrically connected to the second pull-down node included in the (N+1)th stage of pull-up control circuit is set to be smaller than the channel length of at least one transistor whose gate electrode is electrically connected to the pull-up node included in the cascading output circuit, for example, the channel length of the at least one transistor whose gate electrode is electrically connected to the pull-up node included in the cascading output circuit may be 10 μm, the channel length of the transistor whose gate electrode is electrically connected to the enabling terminal included in the Nth stage of pull-up control circuit, the channel length of the transistor whose gate electrode is electrically connected to the third control node included in the Nth stage of pull-up control circuit, the channel length of the transistor whose gate electrode is electrically connected to the first clock signal line included in the Nth stage of pull-up control circuit, the channel length of the transistor whose gate electrode is electrically connected to the first pull-down node included in the Nth stage of pull-up control circuit, and the channel length of the transistor whose gate electrode is electrically connected to the second pull-down node included in the Nth stage of pull-up control circuit may all be 8 μm, and the channel length of the transistor whose gate electrode is electrically connected to the first clock signal line included in the first-stage pull-up control circuit, the channel length of the transistor whose gate electrode is electrically connected to the first pull-down node included in the (N+1)th stage of pull-up control circuit, and the channel length of the transistor whose gate electrode is electrically connected to the second pull-down node included in the (N+1)th stage of pull-up control circuit may all be 8 μm, but is not limited to this.

In at least one embodiment of the present disclosure, the active pattern of at least one transistor whose gate electrode is electrically connected to the enabling terminal included in the Nth stage of pull-up control circuit includes at least two active pattern portions arranged at intervals, and the spacing between adjacent active pattern portions of at least one transistor whose gate electrode is electrically connected to the enabling terminal is a seventh spacing;

the active pattern of at least one transistor whose gate electrode is electrically connected to the third control node included in the Nth stage of pull-up control circuit includes at least two active pattern portions arranged at intervals, and the spacing between the adjacent active pattern portions of at least one transistor whose gate electrode is electrically connected to the third control node is an eighth spacing; and/or the active pattern of the transistor whose gate electrode is electrically connected to the first clock signal line include in the Nth stage of pull-up control circuit includes at least two active pattern portions arranged at intervals, and the spacing between the adjacent active pattern portions of the transistor whose gate electrode is electrically connected to the first clock signal line included in the Nth stage of pull-up control circuit is a ninth spacing;

the active pattern of the transistor whose gate electrode is electrically connected to the first pull-down node included in the Nth stage of pull-up control circuit includes at least two active pattern portions arranged at intervals, and the spacing between the adjacent active pattern portions of the transistor whose gate electrode is electrically connected to the first pull-down node included in the Nth stage of pull-up control circuit is a tenth spacing; and/or, the active pattern of the transistor whose gate electrode is electrically connected to the second pull-down node included in the Nth stage of pull-up control circuit includes at least two active pattern portions arranged at intervals, and the spacing between the adjacent active pattern portions of the transistor whose gate electrode is electrically connected to the second pull-down node included in the Nth stage of pull-up control circuit is an eleventh spacing; and/or, the active pattern of the transistor whose gate electrode is electrically connected to the first clock signal line included in the (N+1)th stage of pull-up control circuit includes at least two active pattern portions arranged at intervals, and the spacing between the adjacent active pattern portions of the transistor whose gate electrode is electrically connected to the first clock signal terminal included in the (N+1)th stage of pull-up control circuit is a twelfth spacing; and/or, the active pattern of the transistor whose gate electrode is electrically connected to the first pull-down node included in the (N+1)th stage of pull-up control circuit includes at least two active pattern portions arranged at intervals, and the spacing between the adjacent active pattern portions of the transistor whose gate electrode is electrically connected to the first pull-down node included in the (N+1)th stage of pull-up control circuit is a thirteenth spacing; and/or, the active pattern of the transistor whose gate electrode is electrically connected to the second pull-down node included in the (N+1)th stage of pull-up control circuit includes at least two active pattern portions arranged at intervals, and the spacing between the adjacent active pattern portions of the transistor whose gate electrode is electrically connected to the second pull-down node included in the (N+1)th stage of pull-up control circuit is a fourteenth spacing;

the second spacing is greater than the seventh spacing, the second spacing is greater than the eighth spacing, the second spacing is greater than the ninth spacing, the second spacing is greater than the tenth spacing, the second spacing is greater than the eleventh spacing, the second spacing is greater than the twelfth spacing, the second spacing is greater than the thirteenth spacing, and the second spacing is greater than the fourteenth spacing;

the third spacing is greater than the seventh spacing, the third spacing is greater than the eighth spacing, the third spacing is greater than the ninth spacing, the third spacing is greater than the tenth spacing, the third spacing is greater than the eleventh spacing, the third spacing is greater than the twelfth spacing, the third spacing is greater than the thirteenth spacing, and the third spacing is greater than the fourteenth spacing;

the active pattern of at least one transistor whose gate electrode is electrically connected to the input terminal included in the pull-up node control circuit include at least two active pattern portions arranged at intervals; the active pattern of at least one transistor whose gate electrode is electrically connected to the reset terminal included in the pull-up node control circuit includes at least two active pattern portions arranged at intervals; the second spacing is the spacing between the adjacent two active pattern portions of at least one transistor whose gate electrode is electrically connected to the input terminal; the third spacing is the spacing between the adjacent two active pattern portions of at least one transistor whose gate electrode is electrically connected to the reset terminal.

In at least one embodiment of the present disclosure, the seventh spacing, the eighth spacing, the ninth spacing, the tenth spacing, the eleventh spacing, the twelfth spacing, the thirteenth spacing and the fourteenth spacing may be 8 µm, and the second spacing and the third spacing may be 10.5 µm, but not limited to this.

In at least one embodiment of the present disclosure, the seventh, eighth, ninth, tenth, eleventh, twelfth, thirteenth, and fourteenth spacings may be greater than or equal to 6 µm and less than 8.5 µm, but are not limited to this.

the driving circuit the in at least one embodiment of the present disclosure further includes a second node control circuit;

the second node control circuit is electrically connected to the second node, the input terminal, the reset terminal, the first scanning voltage line and the second scanning voltage line respectively, is configured to control to connect the second node and the first scanning voltage line under the control of the input signal provided by the input terminal, and control to connect the second node and the second scanning voltage line under the control of the reset signal;

the first pull-down node control circuit is also electrically connected to the second node, and is configured to control to connect the first pull-down node and the first voltage line under the control of the potential of the second node;

The second pull-down node control circuit is also electrically connected to the second node, and is configured to control to connect the second pull-down node and the first voltage line under the control of the potential of the second node.

In specific embodiment, the driving circuit may also include a second node control circuit; the second node control circuit controls the potential of the second node, the first pull-down node control circuit also controls the potential of the first pull-down node under the control of the potential of the second node, and the second pull-down node control circuit also controls the potential of the second pull-down node under the control of the potential of the second node.

Figure 6:
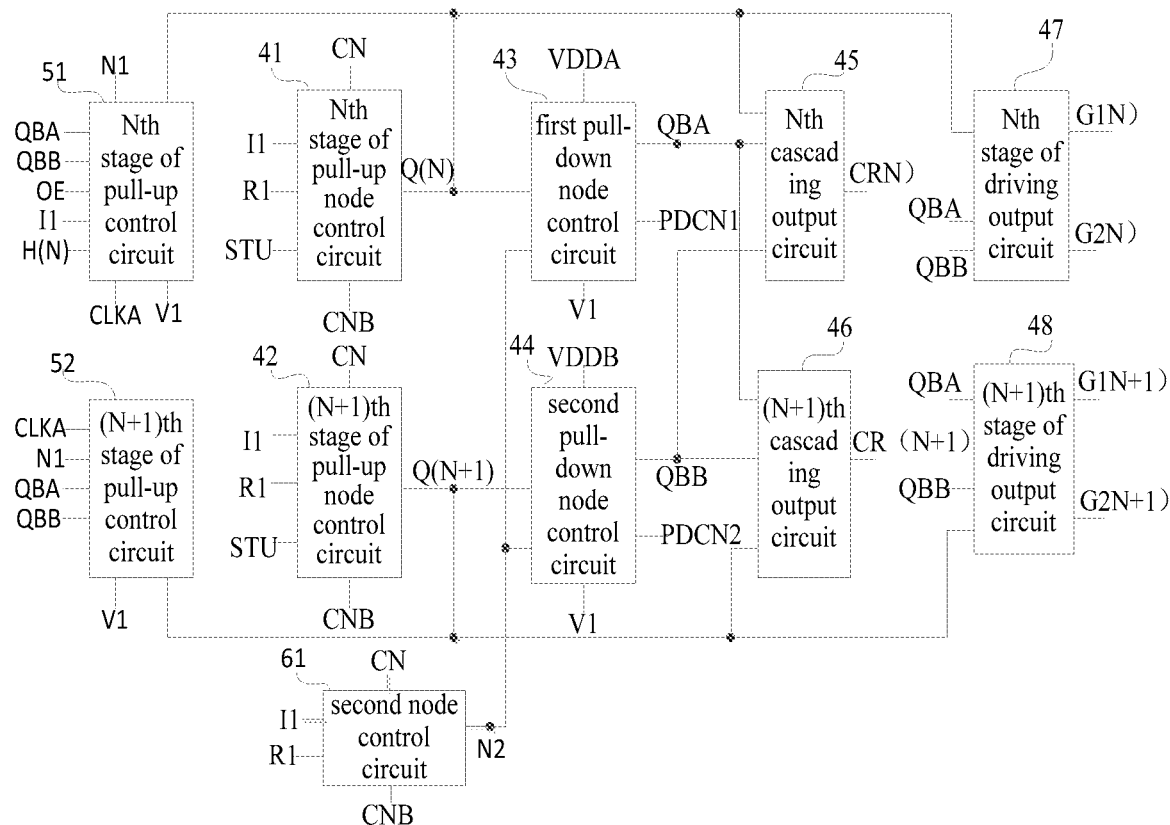
FIG. 6 is a structural diagram of a driving circuit according to at least one embodiment of the present disclosure.

As shown in FIG. 6, on the basis of at least one embodiment of the driving circuit shown in FIG. 5, the driving circuit the in at least one embodiment of the present disclosure further includes a second node control circuit 61;

the second node control circuit 61 is electrically connected to the second node N2, the input terminal I1, the reset terminal R1, the first scanning voltage line CN and the second scanning voltage line CNB respectively, and is configured to control to connect the second node N2 and the first scanning voltage line CN under the control of the input signal provided by the input terminal I1, and control to connect the second node N2 and the second scanning voltage line CNB under the control of the reset signal;

the first pull-down node control circuit 43 is also electrically connected to the second node N2 and is configured to control to connect the first pull-down node QBA and the first voltage line V1 under the control of the potential of the second node N2;

the second pull-down node control circuit 44 is also electrically connected to the second node N2 and is configured to control to connect the second pull-down node QBB and the first voltage line V1 under the control of the potential of the second node N2.

Optionally, the output circuit includes a driving output circuit and a cascading output circuit;

the channel length of the transistor whose gate electrode is electrically connected to the second node included in the first pull-down node control circuit is smaller than the channel length of at least one transistor whose gate electrode is electrically connected the pull-up node included in the cascading output circuit;

The channel length of the transistor whose gate electrode is electrically connected to the second node included in the second pull-down node control circuit is smaller than the channel length of at least one transistor whose gate electrode is electrically connected to the pull-up node included in the cascading output circuit.

In the specific embodiment, the channel length of the transistor whose gate electrode is electrically connected to the second node included in the first pull-down node control circuit may be set to be smaller than the channel length of at least one transistor whose gate electrode is electrically connected to the pull-up node included in the cascading output circuit, and the channel length of the transistor whose gate electrode is electrically connected to the second node included in the second pull-down node control circuit may be set to be smaller than the channel length of at least one transistor whose gate electrode is electrically connected to the pull-up node included in the cascading output circuit.

For example, the channel length of the transistor whose gate electrode is electrically connected to the second node included in the first pull-down node control circuit, and the channel length of the transistor whose gate electrode is electrically connected to the second node included in the second pull-down node control circuit may be 8 µm, but not limited to this.

In at least one embodiment of the present disclosure, the active pattern of the transistor whose gate electrode is electrically connected to the second node included in the first pull-down node control circuit include at least two active pattern portions arranged at intervals, and the spacing between the adjacent active pattern portions of the transistor whose gate electrode is electrically connected to the second node included in the first pull-down node control circuit is the fifteenth spacing; or, the active pattern of the transistor whose gate electrode is electrically connected to the second node included in the second pull-down node control circuit include at least two active pattern portions arranged at intervals, and the spacing between the adjacent active pattern portion of the transistor whose gate electrode is electrically connected to the second node included in the second pull-down node control circuit is the sixteenth spacing;

the second spacing is greater than the fifteenth spacing, the second spacing is greater than the sixteenth spacing, the third spacing is greater than the fifteenth spacing, and the third spacing is greater than the sixteenth spacing;

the active pattern of at least one transistor whose gate electrode is electrically connected to the input terminal included in the pull-up node control circuit include at least two active pattern portions arranged at intervals; the active pattern of at least one transistor whose gate electrode is electrically connected to the reset terminal included in the pull-up node control circuit includes at least two active pattern portions arranged at intervals; the second spacing is the spacing between the adjacent two active pattern portions of at least one transistor whose gate electrode is electrically connected to the input terminal; the third spacing is the spacing between the adjacent two active pattern portions of at least one transistor whose gate electrode is electrically connected to the reset terminal.

In the specific embodiment, the active pattern of the transistor whose gate electrode is electrically connected to the second node included in the first pull-down node control circuit includes at least two active pattern portions arranged at intervals; or, the active pattern of the transistor whose gate electrode is electrically connected to the second node included in the second pull-down node control circuit include at least two active pattern portions arranged at intervals; the spacing between the adjacent active pattern portions of the transistor whose gate electrode is electrically connected to the second node included in the first pull-down node control circuit may be the fifteenth spacing, and the spacing between the adjacent active pattern portions of the transistor whose gate electrode is electrically connected to the second node included in the second pull-down node control circuit may be the sixteenth spacing; for example, the fifteenth spacing and the sixteenth spacing may both be 8 μm, but not limited to this.

Optionally, the fifteenth spacing and the sixteenth spacing may be greater than or equal to 6 μm and less than 8.5 μm, but are not limited thereto.

In at least one embodiment of the present disclosure, the driving output portion includes an Nth stage of first driving output terminal, an Nth stage of second driving output terminal, an (N+1)th stage of first driving output terminal and an (N+1)th stage of second driving output terminal; the pull-up node includes an Nth stage of pull-up node and an (N+1)th stage of pull-up node; the pull-down node includes a first pull-down node and a second pull-down node; and N is a positive integer;

the driving output circuit includes a first transistor, a second transistor, a third transistor, a fourth transistor, a fifth transistor, a sixth transistor, a seventh transistor, an eighth transistor, a ninth transistor, a tenth transistor, an eleventh transistor and a twelfth transistor;

a gate electrode of the first transistor is electrically connected to the Nth stage of pull-up node, a first electrode of the first transistor is electrically connected to the first output clock signal line, and a second electrode of the first transistor is electrically connected to the Nth stage of first driving output terminal;

a gate electrode of the second transistor is electrically connected to the first pull-down node, a first electrode of the second transistor is electrically connected to the Nth stage of first driving output terminal, and a second electrode of the second transistor is electrically connected to the second voltage line;

a gate electrode of the third transistor is electrically connected to the second pull-down node, a first electrode of the third transistor is electrically connected to the Nth stage of first driving output terminal, and a second electrode of the third transistor is electrically connected to the second voltage line;

a gate electrode of the fourth transistor is electrically connected to the Nth stage of pull-up node, a first electrode of the fourth transistor is electrically connected to the second output clock signal line, and a second electrode of the fourth transistor is electrically connected to the Nth stage of second driving output terminal;

a gate electrode of the fifth transistor is electrically connected to the first pull-down node, a first electrode of the fifth transistor is electrically connected to the Nth stage of second driving output terminal, and a second electrode of the fifth transistor is electrically connected to the second voltage line;

a gate electrode of the sixth transistor is electrically connected to the second pull-down node, a first electrode of the sixth transistor is electrically connected to the Nth stage of second driving output terminal, and a second electrode of the sixth transistor is electrically connected to the second voltage line;

a gate electrode of the seventh transistor is electrically connected to the (N+1)th stage of pull-up node, a first electrode of the seventh transistor is electrically connected to the third output clock signal line, and a second electrode of the seventh transistor is electrically connected to the (N+1)th stage of first driving output terminal;

a gate electrode of the eighth transistor is electrically connected to the first pull-down node, a first electrode of the eighth transistor is electrically connected to the (N+1)th stage of first driving output terminal, and a second electrode of the eighth transistor is electrically connected to the second voltage line;

a gate electrode of the ninth transistor is electrically connected to the second pull-down node, a first electrode of the ninth transistor is electrically connected to the (N+1)th stage of first driving output terminal, and a second electrode of the ninth transistor is electrically connected to the second voltage line;

a gate electrode of the tenth transistor is electrically connected to the (N+1)th stage of pull-up node, a first electrode of the tenth transistor is electrically connected to the fourth output clock signal line, and a second electrode of the tenth transistor is electrically connected to the (N+1)th stage of second driving output terminal;

a gate electrode of the eleventh transistor is electrically connected to the first pull-down node, a first electrode of the eleventh transistor is electrically connected to the (N+1)th stage of second driving output terminal, and a second electrode of the eleventh transistor is electrically connected to the second voltage line;

a gate electrode of the twelfth transistor is electrically connected to the first pull-down node, a first electrode of the twelfth transistor is electrically connected to the (N+1)th stage of second driving output terminal, and a second electrode of the twelfth transistor is electrically connected to the second voltage line;

the cascaded output circuit includes a thirteenth transistor, a fourteenth transistor, a fifteenth transistor, a sixteenth transistor, a seventeenth transistor and an eighteenth transistor;

a gate electrode of the thirteenth transistor is electrically connected to the Nth stage of pull-up node, a first electrode of the thirteenth transistor is electrically connected to a fifth output clock signal line, and a second electrode of the thirteenth transistor is electrically connected to the Nth cascading output terminal;

a gate electrode of the fourteenth transistor is electrically connected to the first pull-down node, a first electrode of the fourteenth transistor is electrically connected to the Nth cascading output terminal, and a second electrode of the fourteenth transistor is electrically connected to the first voltage line;

a gate electrode of the fifteenth transistor is electrically connected to the second pull-down node, a first electrode of the fifteenth transistor is electrically connected to the Nth cascading output terminal, and a second electrode of the fifteenth transistor is electrically connected to the first voltage line;

a gate electrode of the sixteenth transistor is electrically connected to the (N+1)th stage of pull-up node, a first electrode of the sixteenth transistor is electrically connected to a sixth output clock signal line, and a second electrode of the sixteenth transistor is electrically connected to the (N+1)th cascading output terminal;

a gate electrode of the seventeenth transistor is electrically connected to the first pull-down node, a first electrode of the seventeenth transistor is electrically connected to the (N+1)th cascading output terminal, and a second electrode of the seventeenth transistor is electrically connected to the first voltage line;

a gate electrode of the eighteenth transistor is electrically connected to the second pull-down node, and a first electrode of the eighteenth transistor is connected to the (N+1)th stage cascading output terminal and a second electrode of the eighth transistor is electrically connected to the first voltage line.

Optionally, the second voltage line may be a second low voltage line, but is not limited to this.

optionally, the pull-up node includes an Nth stage of pull-up node and an (N+1)th stage of pull-up node; the pull-up node control circuit includes a nineteenth transistor, a twentieth transistor, a twenty-first transistor, a twenty-second transistor, a twenty-third transistor, a twenty-fourth transistor, a twenty-fifth transistor and a twenty-sixth transistor; N is a positive integer;

a gate electrode of the nineteenth transistor is electrically connected to the input terminal, a first electrode of the nineteenth transistor is electrically connected to the first scanning voltage line, and a second electrode of the nineteenth transistor is electrically connected to a first electrode of the twentieth transistor;

a gate electrode of the twentieth transistor is electrically connected to the input terminal, and a second electrode of the twentieth transistor is electrically connected to the Nth stage of pull-up node;

a gate electrode of the twenty-first transistor is electrically connected to the reset terminal, a first electrode of the twenty-first transistor is electrically connected to the Nth stage of pull-up node, and a second electrode of the twenty-first transistor is electrically connected to a first electrode of the twenty-second transistor;

a gate electrode of the twenty-second transistor is electrically connected to the reset terminal, and a second electrode of the twenty-second transistor is electrically connected to the second scanning voltage line;

a gate electrode of the twenty-third transistor is electrically connected to the input terminal, a first electrode of the twenty-third transistor is electrically connected to the first scanning voltage line, and a second electrode of the twenty-third transistor is electrically connected to a first electrode of the twenty-fourth transistor;

a gate electrode of the twenty-fourth transistor is electrically connected to the input terminal, and a second electrode of the twenty-fourth transistor is electrically connected to the (N+1)th stage of pull-up node;

a gate electrode of the twenty-fifth transistor is electrically connected to the reset terminal, a first electrode of the twenty-fifth transistor is electrically connected to the (N+1)th stage of pull-up node, and a second electrode of the twenty-fifth transistor is electrically connected to a first electrode of the twenty-sixth transistor;

a gate electrode of the twenty-sixth transistor is electrically connected to the reset terminal, and a second electrode of the twenty-sixth transistor is electrically connected to the second scanning voltage line.

optionally, the pull-up node includes an Nth stage of pull-up node and an (N+1)th stage of pull-up node; the pull-down node includes a first pull-down node and a second pull-down node; the pull-up node control circuit further includes a twenty-seventh transistor, a twenty-eighth transistor, a twenty-ninth transistor and a thirtieth transistor; N is a positive integer;

a gate electrode of the twenty-seventh transistor is electrically connected to the frame reset terminal, a first electrode of the twenty-seventh transistor is electrically connected to the Nth stage of pull-up node, and a second electrode of the twenty-seventh transistor is electrically connected to a first electrode of the twenty-eighth transistor;

a gate electrode of the twenty-eighth transistor is electrically connected to the frame reset terminal, and a second electrode of the twenty-eighth transistor is electrically connected to the first voltage line;

a gate electrode of the twenty-ninth transistor is electrically connected to the frame reset terminal, a first electrode of the twenty-ninth transistor is electrically connected to the (N+1)th stage of pull-up node, and a second electrode of the twenty-ninth transistor is electrically connected to a first electrode of the thirtieth transistor;

a gate electrode of the thirtieth transistor is electrically connected to the frame reset terminal, and a second electrode of the thirtieth transistor is electrically connected to the first voltage line;

the pull-down node control circuit includes a thirty-first transistor and a thirty-second transistor;

a gate electrode of the thirty-first transistor is electrically connected to the Nth stage of pull-up node, a first electrode of the thirty-first transistor is electrically connected to the first pull-down node, and a second electrode of the thirty-first transistor is electrically connected to the first voltage line;

a gate electrode of the thirty-second transistor is electrically connected to the (N+1)th stage of pull-up node, a first electrode of the thirty-second transistor is electrically connected to the second pull-down node, and a second electrode of the thirty-second transistor is electrically connected to the first voltage line.

Optionally, the Nth stage of pull-up control circuit may include a thirty-third transistor, a thirty-fourth transistor, a thirty-fifth transistor, a thirty-sixth transistor, a thirty-seventh transistor, a thirty-eighth transistor, a thirty-ninth transistor, a fortieth transistor, a forty-first transistor, a forty-second transistor and a forty-third transistor;

a gate electrode of the thirty-third transistor is electrically connected to the enabling terminal, a first electrode of the thirty-third transistor is electrically connected to the input terminal, and a second electrode of the thirty-third transistor is electrically connected to a first electrode of the thirty-fourth transistor;

a gate electrode of the thirty-fourth transistor is electrically connected to the enabling terminal, and a second electrode of the thirty-fourth transistor is electrically connected to the third control node;

a gate electrode of the thirty-fifth transistor is electrically connected to the third control node, a first electrode of the thirty-fifth transistor is electrically connected to the power supply voltage line, and a second electrode of the thirty-fifth transistor is electrically connected to a second electrode of the thirty-third transistor;

a gate electrode of the thirty-sixth transistor is electrically connected to the third control node, a first electrode of the thirty-sixth transistor is electrically connected to the first clock signal line, and a second electrode of the thirty-sixth transistor is electrically connected to the first node N1;

a gate electrode of the thirty-seventh transistor is electrically connected to the first clock signal line, a first electrode of the thirty-seventh transistor is electrically connected to the first node, and a second electrode of the thirty-seventh transistor is electrically connected to a first intermediate node;

a gate electrode of the thirty-eighth transistor is electrically connected to the first clock signal line, a first electrode of the thirty-eighth transistor is electrically connected to the first intermediate node, and a second electrode of the thirty-eighth transistor is electrically connected to the Nth stage of pull-up node;

a gate electrode of the thirty-ninth transistor is electrically connected to the Nth stage of pull-up node, a first electrode of the thirty-ninth transistor is electrically connected to the power supply voltage line, and a second electrode of the thirty-ninth transistor is electrically connected to the first intermediate node;

a gate electrode of the fortieth transistor is electrically connected to the second pull-down node, a first electrode of the fortieth transistor is electrically connected to the Nth stage of pull-up node, and a second electrode of the fortieth transistor is electrically connected to the first intermediate node;

a gate electrode of the forty-first transistor is electrically connected to the second pull-down node, a first electrode of the forty-first transistor is electrically connected to the first intermediate node, and a second electrode of the forty-first transistor is electrically connected to the first voltage line;

a gate electrode of the forty-second transistor is electrically connected to the first pull-down node, a first electrode of the forty-second transistor is electrically connected to the Nth stage of pull-up node, and a second electrode of the forty-second transistor is electrically connected to the first intermediate node;

a gate electrode of the forty-third transistor is electrically connected to the second pull-down node, a first electrode of the forty-third transistor is electrically connected to the first intermediate node, and a second electrode of the forty-third transistor is electrically connected to the first voltage line;

the (N+1)th stage of pull-up control circuit includes a forty-fourth transistor, a forty-fifth transistor, a forty-sixth transistor, a forty-seventh transistor, a forty-eighth transistor and a forty-ninth transistor;

a gate electrode of the forty-fourth transistor is electrically connected to the first clock signal line, a first electrode of the forty-fourth transistor is electrically connected to the first node N1, and a second electrode of the forty-fourth transistor is electrically connected to a second intermediate node;

a gate electrode of the forty-fifth transistor is electrically connected to the first clock signal line, a first electrode of the forty-fifth transistor is electrically connected to the second intermediate node, and a second electrode of the forty-fifth transistor is electrically connected to the (N+1)th stage of pull-up node;

a gate electrode of the forty-sixth transistor is electrically connected to the first pull-down node, a first electrode of the forty-sixth transistor is electrically connected to the (N+1)th stage of pull-up node, and a second electrode of the forty-sixth transistor is electrically connected to the second intermediate node;

a gate electrode of the forty-seventh transistor is electrically connected to the first pull-down node, a first electrode of the forty-seventh transistor is electrically connected to the second intermediate node, and a second electrode of the forty-seventh transistor is electrically connected to the first voltage line;

a gate electrode of the forty-eighth transistor is electrically connected to the second pull-down node, a first electrode of the forty-eighth transistor is electrically connected to the (N+1)th stage of pull-up node, and a second electrode of the forty-eighth transistor is electrically connected to the second intermediate node;

a gate electrode of the forty-ninth transistor is electrically connected to the second pull-down node, a first electrode of the forty-ninth transistor is electrically connected to the second intermediate node, and a second electrode of the forty-ninth transistor is electrically connected to the first voltage line.

In at least one embodiment of the present disclosure, the second node control circuit may include a fiftieth transistor, a fifty-first transistor, a fifty-second transistor and a fifty-third transistor;

a gate electrode of the fiftieth transistor is electrically connected to the input terminal, a first electrode of the fiftieth transistor is electrically connected to the first scanning voltage line, and a second electrode of the fiftieth transistor is electrically connected to the second node;

a gate electrode of the fifty-first transistor is electrically connected to the reset terminal, a first electrode of the fifty-first transistor is electrically connected to the second node, and a second electrode of the fifty-first transistor is electrically connected to the second scanning voltage line;

a gate electrode of the fifty-second transistor is electrically connected to the first pull-down node, a first electrode of the fifty-second transistor is electrically connected to the second node, and a second electrode of the fifty-second transistor is electrically connected to the first voltage line;

a gate electrode of the fifty-third transistor is electrically connected to the second pull-down node, a first electrode of the fifty-third transistor is electrically connected to the second node, and a second electrode of the fifty-third transistor is electrically connected to the first voltage line;

the first pull-down node control circuit includes a fifty-fourth transistor, and the second pull-down node control circuit includes a fifty-fifth transistor;

a gate electrode of the fifty-fourth transistor is electrically connected to the second node, a first electrode of the fifty-fourth transistor is electrically connected to the first pull-down node, and a second electrode of the fifty-fourth transistor is electrically connected to the first voltage line;

a gate electrode of the fifty-fifth transistor is electrically connected to the second node, a first electrode of the fifty-fifth transistor is electrically connected to the second pull-down node, and a second electrode of the fifty-fifth transistor is electrically connected to the first voltage line.

optionally, the first pull-down node control circuit may also include a fifty-sixth transistor, a fifty-seventh transistor, a fifty-eighth transistor, a fifty-ninth transistor, a sixtieth transistor and a sixty-first transistor;

a gate electrode of the fifty-sixth transistor and a first electrode of the fifty-sixth transistor are electrically connected to the first control voltage line, and a second electrode of the fifty-sixth transistor is electrically connected to a first electrode of the fifty-seventh transistor;

a gate electrode of the fifty-seventh transistor is electrically connected to the first control voltage line, and a second electrode of the fifty-seventh transistor is electrically connected to a gate electrode of the fifty-eighth transistor;

a first electrode of the fifty-eighth transistor is electrically connected to the first control voltage line, and a second electrode of the fifty-eighth transistor is electrically connected to the first pull-down node;

a gate electrode of the fifty-ninth transistor is electrically connected to the Nth stage of pull-up node, a first electrode of the fifty-ninth transistor is electrically connected to a gate electrode of the fifty-eighth transistor, and a second electrode of the fifty-ninth transistor is electrically connected to the third voltage line;

a gate electrode of the sixtieth transistor is electrically connected to the first clock signal line, and a first electrode of the sixtieth transistor is electrically connected to the first pull-down node;

a gate electrode of the sixty-first transistor is electrically connected to the third control node, a first electrode of the sixty-first transistor is electrically connected to a second electrode of the sixtieth transistor, and a second electrode of the sixty-first transistor is electrically connected to the first voltage line.

Optionally, the third voltage line may be a third low voltage line, but is not limited to this.

Optionally, the (N+1)th stage of pull-up control circuit further includes a sixty-second transistor;

a gate electrode of the sixty-second transistor is electrically connected to the (N+1)th stage of pull-up node, a first electrode of the sixty-second transistor is electrically connected to the power supply voltage line, and a second electrode of the sixty-second transistor is electrically connected to the second intermediate node;

the second pull-down node control circuit may include a sixty-third transistor, a sixty-fourth transistor, a sixty-fifth transistor, a sixty-sixth transistor, a sixty-seventh transistor and a sixty-eighth transistor;

a gate electrode of the sixty-third transistor is electrically connected to a first electrode of the sixty-third transistor and the second control voltage line, and a second electrode of the sixty-third transistor is electrically connected to a first electrode of the sixty-fourth transistor;

a gate electrode of the sixty-fourth transistor is electrically connected to the second control voltage line, and a second electrode of the sixty-fourth transistor is electrically connected to a gate electrode of the sixty-fifth transistor;

a first electrode of the sixty-fifth transistor is electrically connected to the second control voltage line, and a second electrode of the sixty-fifth transistor is electrically connected to the second pull-down node;

a gate electrode of the sixty-sixth transistor is electrically connected to the (N+1)th stage of pull-up node, a first electrode of the sixty-sixth transistor is electrically connected to a gate electrode of the sixty-fifth transistor, and a second electrode of the sixty-sixth transistor is electrically connected to the third voltage line;

a gate electrode of the sixty-sixth transistor is electrically connected to the (N+1)th stage of pull-up node, a first electrode of the sixty-sixth transistor is electrically connected to the second pull-down node, and a second electrode of the sixty-sixth transistor is electrically connected to the first voltage line;

a gate electrode of the sixty-seventh transistor is electrically connected to the first clock signal line, and a first electrode of the sixty-seventh transistor is electrically connected to the second pull-down node;

a gate electrode of the sixty-eighth transistor is electrically connected to the third control node, a first electrode of the sixty-eighth transistor is electrically connected to a second electrode of the sixty-seventh transistor, and a second electrode of the sixty-eighth transistor is electrically connected to the first voltage line.

Figure 7:
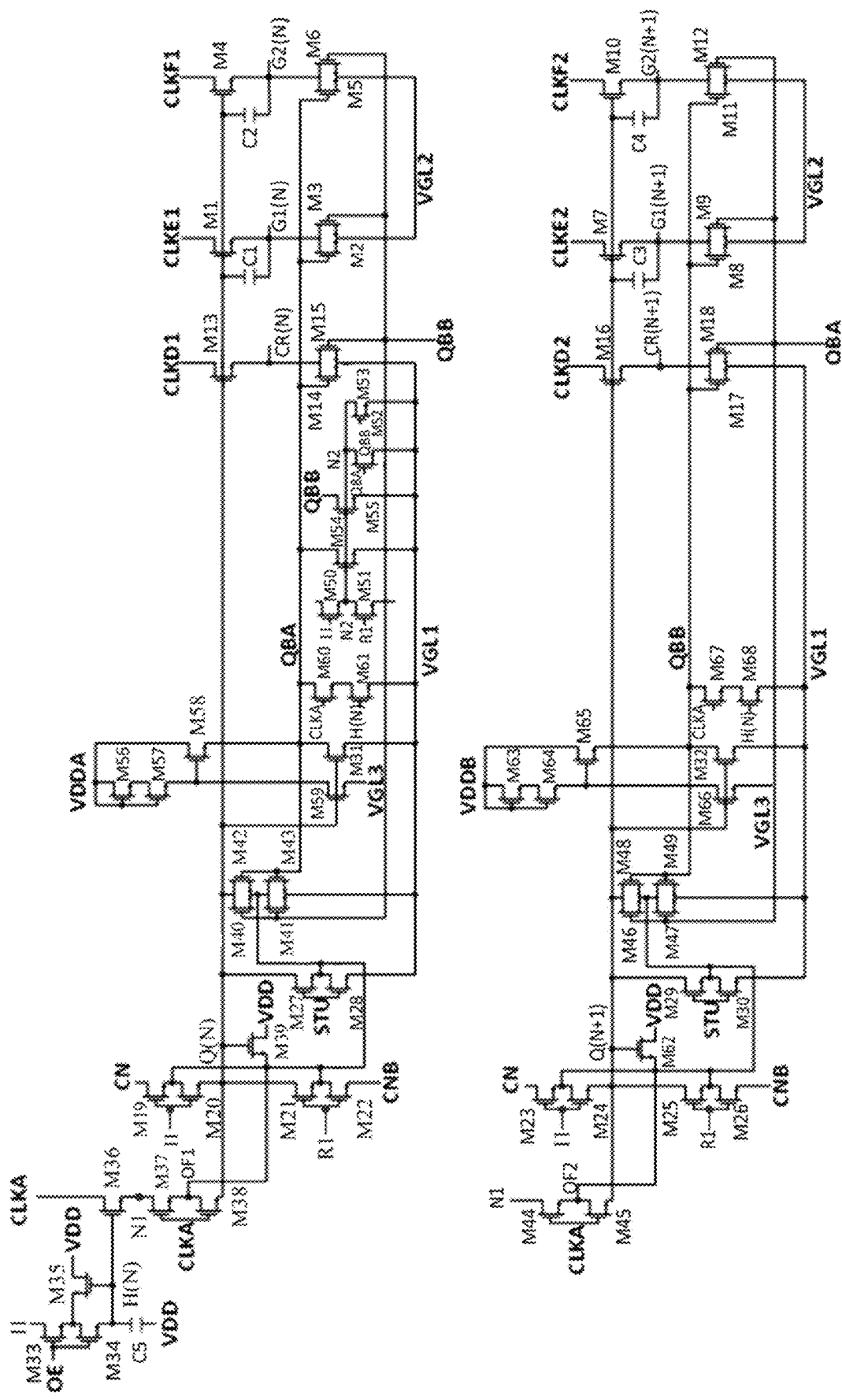
FIG. 7 is a structural diagram of a driving circuit according to at least one embodiment of the present disclosure.

As shown in FIG. 7, on the basis of at least one embodiment of the driving circuit shown in FIG. 6, the driving output terminal includes the Nth stage of first driving output terminal G1 (N), the Nth stage of second driving output terminal G2 (N), the (N+1)th stage of first driving output terminal G1 (N+1) and the (N+1)th stage of second driving output terminal G2 (N+1); the pull-down node includes the first pull-down node QBA and the second pull-down node QBB; N is a positive integer;

the driving output circuit includes a first transistor M1, a second transistor M2, a third transistor M3, a fourth transistor M4, a fifth transistor M5, a sixth transistor M6, a seventh transistor M7, an eighth transistor M8, a ninth transistor M9, a tenth transistor M10, an eleventh transistor M11 and a twelfth transistor M12;

the gate electrode of the first transistor M1 is electrically connected to the Nth stage of pull-up node Q (N), the source electrode of the first transistor M1 is electrically connected to the first output clock signal line CLKE1, and the drain electrode of the first transistor M1 is electrically connected to the Nth stage of first driving output terminal G1 (N);

the gate electrode of the second transistor M2 is electrically connected to the first pull-down node QBA, the source electrode of the second transistor M2 is electrically connected to the Nth stage of first driving output terminal G1 (N), and the drain electrode of the second transistor M2 is electrically connected to the second low voltage line VGL2;

the gate electrode of the third transistor M3 is electrically connected to the second pull-down node QBB, the source electrode of the third transistor M3 is electrically connected to the Nth stage first driving output terminal G1 (N), and the drain electrode of the third transistor M3 is electrically connected to the second low voltage line VGL2;

the gate electrode of the fourth transistor M4 is electrically connected to the Nth stage of pull-up node Q (N), the source electrode of the fourth transistor M4 is electrically connected to the second output clock signal line CLKF1, and the drain electrode of the fourth transistor M4 is electrically connected to the Nth stage of second driving output terminal G2 (N);

the gate electrode of the fifth transistor M5 is electrically connected to the first pull-down node QBA, the source electrode of the fifth transistor M5 is electrically connected to the Nth stage of second driving output terminal G2 (N), and the drain electrode of the fifth transistor M5 is electrically connected to the second low voltage line VGL2;

the gate electrode of the sixth transistor M6 is electrically connected to the second pull-down node QBB, the source electrode of the sixth transistor M6 is electrically connected to the Nth stage of second driving output terminal G2 (N), and the drain electrode of the sixth transistor M6 is electrically connected to the second low voltage line VGL2;

the gate electrode of the seventh transistor M7 is electrically connected to the (N+1)th stage of pull-up node Q (N+1), the source electrode of the seventh transistor M7 is electrically connected to the third output clock signal line CLKE2, and the drain electrode of the seventh transistor M7 is electrically connected to the (N+1)th stage of first driving output terminal G1 (N+1);

the gate electrode of the eighth transistor M8 is electrically connected to the first pull-down node QBA, the source electrode of the eighth transistor M8 is electrically connected to the (N+1)th stage of first driving output terminal G1 (N+1), and the second electrode of the eighth transistor is electrically connected to the second low voltage line VGL2;

the gate electrode of the ninth transistor M9 is electrically connected to the second pull-down node QBB, the source electrode of the ninth transistor M9 is electrically connected to the (N+1)th stage of first driving output terminal G1 (N+1), and the drain electrode of the ninth transistor M9 is electrically connected to the second low voltage line VGL2;

the gate electrode of the tenth transistor M10 is electrically connected to the (N+1)th stage of pull-up node Q (N+1), the source electrode of the tenth transistor M10 is electrically connected to the fourth output clock signal line CLKF2, and the drain electrode of the tenth transistor M10 is electrically connected to the (N+1)th stage of second driving output terminal G2 (N+1);

the gate electrode of the eleventh transistor M11 is electrically connected to the first pull-down node QBA, the source electrode of the eleventh transistor M11 is electrically connected to the (N+1)th stage of second driving output terminal G2 (N+1), and the drain electrode of the eleventh transistor M11 is electrically connected to the second low voltage line VGL2;

the gate electrode of the twelfth transistor M12 is electrically connected to the first pull-down node QBA, the source electrode of the twelfth transistor M12 is electrically connected to the (N+1)th stage of second driving output terminal G2 (N+1), and the drain electrode of the twelfth transistor M12 is electrically connected to the second low voltage line VGL2;

the cascading output circuit includes a thirteenth transistor M13, a fourteenth transistor M14, a fifteenth transistor M15, a sixteenth transistor M16, a seventeenth transistor M17 and an eighteenth transistor M18;

the gate electrode of the thirteenth transistor M13 is electrically connected to the Nth stage of pull-up node Q (N), the source electrode of the thirteenth transistor M13 is electrically connected to the fifth output clock signal line CLKD1, and the drain electrode of the thirteenth transistor M13 is electrically connected to the Nth cascading output terminal CR (N);

the gate electrode of the fourteenth transistor M14 is electrically connected to the first pull-down node QBA, the source electrode of the fourteenth transistor M14 is electrically connected to the Nth cascading output terminal CR (N), and the drain electrode of the fourteenth transistor M14 is electrically connected to the first low voltage line VGL1;

the gate electrode of the fifteenth transistor M15 is electrically connected to the second pull-down node QBB, the source electrode of the fifteenth transistor M15 is electrically connected to the Nth cascading output terminal CR (N), and the drain electrode of the fifteenth transistor M15 is electrically connected to the first low voltage line VGL1;

the gate electrode of the sixteenth transistor M16 is electrically connected to the (N+1)th stage of pull-up node Q (N+1), the source electrode of the sixteenth transistor M16 is electrically connected to the sixth output clock signal line CLKD2, and the drain electrode of the sixteenth transistor M16 is electrically connected to the (N+1)th cascading output terminal CR (N+1);

the gate electrode of the seventeenth transistor M17 is electrically connected to the first pull-down node QBA, the source electrode of the seventeenth transistor M17 is electrically connected to the (N+1)th cascading output terminal CR (N+1), and the drain electrode of the seventeenth transistor M17 is electrically connected to the first low voltage line VGL1;

the gate electrode of the eighteenth transistor M18 is electrically connected to the second pull-down node QBB, the source electrode of the eighteenth transistor M18 is electrically connected to the (N+1)th cascading output terminal CR (N+1), and the drain electrode of the eighteenth transistor M18 is electrically connected to the first low voltage line VGL1;

the pull-up node control circuit includes a nineteenth transistor M19, a twentieth transistor M20, a twenty-first transistor M21, a twenty-second transistor M22, a twenty-third transistor M23, a twenty-fourth transistor M24, a twenty-fifth transistor M25 and a twenty-sixth transistor M26;

the gate electrode of the nineteenth transistor M19 is electrically connected to the input terminal I1, the source electrode of the nineteenth transistor M19 is electrically connected to the first scanning voltage line CN, and the drain electrode of the nineteenth transistor M19 is electrically connected to the source electrode of the twentieth transistor M20;

the gate electrode of the twentieth transistor M20 is electrically connected to the input terminal I1, and the drain electrode of the twentieth transistor M20 is electrically connected to the Nth stage of pull-up node Q (N);

the gate electrode of the twenty-first transistor M21 is electrically connected to the reset terminal R1, the source electrode of the twenty-first transistor M21 is electrically connected to the Nth stage of pull-up node Q (N), and the drain electrode of the twenty-first transistor M21 is electrically connected to the source electrode of the twenty-second transistor M22;

the gate electrode of the twenty-second transistor M22 is electrically connected to the reset terminal R1, and the drain electrode of the twenty-second transistor M22 is electrically connected to the second scanning voltage line CNB;

the gate electrode of the twenty-third transistor M23 is electrically connected to the input terminal I1, the source electrode of the twenty-third transistor M23 is electrically connected to the first scanning voltage line CN, and the drain electrode of the twenty-third transistor M23 is electrically connected to the source electrode of the twenty-fourth transistor M24;

the gate electrode of the twenty-fourth transistor M24 is electrically connected to the input terminal I1, and the drain electrode of the twenty-fourth transistor M24 is electrically connected to the (N+1)th stage of pull-up node Q (N+1);

the gate electrode of the twenty-fifth transistor M25 is electrically connected to the reset terminal R1, the source electrode of the twenty-fifth transistor M25 is electrically connected to the (N+1)th stage of pull-up node Q (N+1), and the drain electrode of the twenty-fifth transistor M25 is electrically connected to the source electrode of the twenty-sixth transistor M26;

the gate electrode of the twenty-sixth transistor M26 is electrically connected to the reset terminal R1, and the drain electrode of the twenty-sixth transistor M26 is electrically connected to the second scanning voltage line CNB;

the pull-up node control circuit further includes the twenty-seventh transistor M27, the twenty-eighth transistor M28, the twenty-ninth transistor M29 and the thirtieth transistor M30;

the gate electrode of the twenty-seventh transistor M27 is electrically connected to the frame reset terminal SCU, the source electrode of the twenty-seventh transistor M27 is electrically connected to the Nth stage of pull-up node Q (N), and the drain electrode of the twenty-seventh transistor M27 is electrically connected to the source electrode of the twenty-eighth transistor M28;

the gate electrode of the twenty-eighth transistor M28 is electrically connected to the frame reset terminal SCU, and the drain electrode of the twenty-eighth transistor M28 is electrically connected to the first low voltage line VGL1;

the gate electrode of the twenty-ninth transistor M29 is electrically connected to the frame reset terminal SCU, the source electrode of the twenty-ninth transistor M29 is electrically connected to the (N+1)th stage of pull-up node Q (N+1), and the drain electrode of the twenty-ninth transistor M29 is electrically connected to the source electrode of the thirtieth transistor M30;

the gate electrode of the thirtieth transistor M30 is electrically connected to the frame reset terminal SCU, and the drain electrode of the thirtieth transistor M30 is electrically connected to the first low voltage line VGL1;

the pull-down node control circuit includes a thirty-first transistor M31 and a thirty-second transistor M32;

the gate electrode of the thirty-first transistor M31 is electrically connected to the Nth stage of pull-up node Q (N), the source electrode of the thirty-first transistor M31 is electrically connected to the first pull-down node QBA, and the drain electrode of the thirty-first transistor M31 is electrically connected to the first low voltage line VGL1;

the gate electrode of the thirty-second transistor M32 is electrically connected to the (N+1)th stage of pull-up node Q (N+1), the source electrode of the thirty-second transistor M32 is electrically connected to the second pull-down node QBB, and the drain electrode of the thirty-second transistor M32 is electrically connected to the first low voltage line VGL1;

the Nth stage of pull-up control circuit may include a thirty-third transistor M33, a thirty-fourth transistor M34, a thirty-fifth transistor M35, a thirty-sixth transistor M36, a thirty-seventh transistor M37, a thirty-eighth transistor M38, a thirty-ninth transistor M39, a fortieth transistor M40, a forty-first transistor M41, a forty-second transistor M42 and a forty-third transistor M43;

the gate electrode of the thirty-third transistor M33 is electrically connected to the enabling terminal OE, the source electrode of the thirty-third transistor M33 is electrically connected to the input terminal I1, and the drain electrode of the thirty-third transistor M33 is electrically connected to the source electrode of the thirty-fourth transistor M34;

the gate electrode of the thirty-fourth transistor M34 is electrically connected to the enabling terminal OE, and the drain electrode of the thirty-fourth transistor M34 is electrically connected to the third control node H (N);

the gate electrode of the thirty-fifth transistor M35 is electrically connected to the third control node H (N), the source electrode of the thirty-fifth transistor M35 is electrically connected to the power supply voltage line VDD, and the drain electrode of the thirty-fifth transistor M35 is electrically connected to the drain electrode of the thirty-third transistor M33;

the gate electrode of the thirty-sixth transistor M36 is electrically connected to the third control node H (N), the source electrode of the thirty-sixth transistor M36 is electrically connected to the first clock signal line CLKA, and the drain electrode of the thirty-sixth transistor M36 is electrically connected to the first node N1;

the gate electrode of the thirty-seventh transistor M37 is electrically connected to the first clock signal line CLKA, the source electrode of the thirty-seventh transistor M37 is electrically connected to the first node N1, and the drain electrode of the thirty-seventh transistor M37 is electrically connected to the first intermediate node OF1;

the gate electrode of the thirty-eighth transistor M38 is electrically connected to the first clock signal line CLKA, the source electrode of the thirty-eighth transistor M38 is electrically connected to the first intermediate node OF1, and the drain electrode of the thirty-eighth transistor M38 is electrically connected to the Nth stage of pull-up node Q (N);

the gate electrode of the thirty-ninth transistor M39 is electrically connected to the Nth stage of pull-up node Q (N), the source electrode of the thirty-ninth transistor M39 is electrically connected to the power supply voltage line VDD, and the drain electrode of the thirty-ninth transistor M39 is electrically connected to the first intermediate node OF1;

the gate electrode of the fortieth transistor M40 is electrically connected to the second pull-down node QBB, the source electrode of the fortieth transistor M40 is electrically connected to the Nth stage of pull-up node Q (N), and the drain electrode of the fortieth transistor M40 is electrically connected to the first intermediate node OF1;

the gate electrode of the forty-first transistor M41 is electrically connected to the second pull-down node QBB, the source electrode of the forty-first transistor M41 is electrically connected to the first intermediate node OF1, and the drain electrode of the forty-first transistor M41 is electrically connected to the first low voltage line VGL1;

the gate electrode of the forty-second transistor M42 is electrically connected to the first pull-down node QBA, the source electrode of the forty-second transistor M42 is electrically connected to the Nth stage of pull-up node Q (N), and the drain electrode of the forty-second transistor M42 is electrically connected to the first intermediate node OF1;

the gate electrode of the forty-third transistor M43 is electrically connected to the second pull-down node QBB, the source electrode of the forty-third transistor M43 is electrically connected to the first intermediate node OF1, and the drain electrode of the forty-third transistor M43 is electrically connected to the first low voltage line VGL1;

the (N+1)th stage of pull-up control circuit includes a forty-fourth transistor M44, a forty-fifth transistor M45, a forty-sixth transistor M46, a forty-seventh transistor M47, a forty-eighth transistor M48 and a forty-ninth transistor M49;

the gate electrode of the forty-fourth transistor M44 is electrically connected to the first clock signal line CLKA, the source electrode of the forty-fourth transistor M44 is electrically connected to the first node N1, and the drain electrode of the forty-fourth transistor M44 is electrically connected to the second intermediate node OF2;

the gate electrode of the forty-fifth transistor M45 is electrically connected to the first clock signal line CLKA, the source electrode of the forty-fifth transistor M45 is electrically connected to the second intermediate node OF2, and the drain electrode of the forty-fifth transistor M45 is electrically connected to the (N+1)th stage of pull-up node Q (N+1);

the gate electrode of the forty-sixth transistor M46 is electrically connected to the first pull-down node QBA, the source electrode of the forty-sixth transistor M46 is electrically connected to the (N+1)th stage of pull-up node Q (N+1), and the drain electrode of the forty-sixth transistor M46 is electrically connected to the second intermediate node OF2;

the gate electrode of the forty-seventh transistor M47 is electrically connected to the first pull-down node QBA, the source electrode of the forty-seventh transistor M47 is electrically connected to the second intermediate node OF2, and the drain electrode of the forty-seventh transistor M47 is electrically connected to the first low voltage line VGL1;

the gate electrode of the forty-eighth transistor M48 is electrically connected to the second pull-down node QBB, the source electrode of the forty-eighth transistor M48 is electrically connected to the (N+1)th stage of pull-up node Q (N+1), and the drain electrode of the forty-eighth transistor M48 is electrically connected to the second intermediate node OF2;

the gate electrode of the forty-ninth transistor M49 is electrically connected to the second pull-down node QBB, the source electrode of the forty-ninth transistor M49 is electrically connected to the second intermediate node OF2, and the drain electrode of the forty-ninth transistor M49 is electrically connected to the first low voltage line VGL1;

the second node control circuit may include a fiftieth transistor M50, a fifty-first transistor M51, a fifty-second transistor M52 and a fifty-third transistor M53;

the gate electrode of the fiftieth transistor M50 is electrically connected to the input terminal I1, the source electrode of the fiftieth transistor M50 is electrically connected to the first scanning voltage line CN, and the drain electrode of the fiftieth transistor M50 is electrically connected to the second node N2;

the gate electrode of the fifty-first transistor M51 is electrically connected to the reset terminal R1, the source electrode of the fifty-first transistor M51 is electrically connected to the second node N2, and the drain electrode of the fifty-first transistor M51 is electrically connected to the second scanning voltage line CNB;

the gate electrode of the fifty-second transistor M52 is electrically connected to the first pull-down node QBA, the source electrode of the fifty-second transistor M52 is electrically connected to the second node N2, and the drain electrode of the fifty-second transistor M52 is electrically connected to the first low voltage line VGL1;

the gate electrode of the fifty-third transistor M53 is electrically connected to the second pull-down node QBB, the source electrode of the fifty-third transistor M53 is electrically connected to the second node N2, and the drain electrode of the fifty-third transistor M53 is electrically connected to the first low voltage line VGL1;

the first pull-down node control circuit includes a fifty-fourth transistor M54, and the second pull-down node control circuit includes a fifty-fifth transistor M55;

the gate electrode of the fifty-fourth transistor M54 is electrically connected to the second node N2, the source electrode of the fifty-fourth transistor M54 is electrically connected to the first pull-down node QBA, and the drain electrode of the fifty-fourth transistor M54 is electrically connected to the first low voltage line VGL1;

the gate electrode of the fifty-fifth transistor M55 is electrically connected to the second node N2, the source electrode of the fifty-fifth transistor M55 is electrically connected to the second pull-down node QBB, and the drain electrode of the fifty-fifth transistor M55 is electrically connected to the first low voltage line VGL1;

the first pull-down node control circuit may also include a fifty-sixth transistor M56, a fifty-seventh transistor M57, a fifty-eighth transistor M58, a fifty-ninth transistor M59, a sixtieth transistor M60 and a sixty-first transistor M61;

the gate electrode of the fifty-sixth transistor M56 and the source electrode of the fifty-sixth transistor M56 are electrically connected to the first control voltage line VDDA, and the drain electrode of the fifty-sixth transistor M56 is electrically connected to the source electrode of the fifty-seventh transistor M57;

the gate electrode of the fifty-seventh transistor M57 is electrically connected to the first control voltage line VDDA, and the drain electrode of the fifty-seventh transistor M57 is electrically connected to the gate electrode of the fifty-eighth transistor M58;

the source electrode of the fifty-eighth transistor M58 is electrically connected to the first control voltage line VDDA, and the drain electrode of the fifty-eighth transistor M58 is electrically connected to the first pull-down node QBA;

the gate electrode of the fifty-ninth transistor M59 is electrically connected to the Nth stage of pull-up node Q (N), the source electrode of the fifty-ninth transistor M59 is electrically connected to the gate electrode of the fifty-eighth transistor M58, and the drain electrode of the fifty-ninth transistor M59 is electrically connected to the third low voltage line VGL3;

the gate electrode of the sixtieth transistor M60 is electrically connected to the first clock signal line CLKA, and the source electrode of the sixtieth transistor M60 is electrically connected to the first pull-down node QBA;

the gate electrode of the sixty-first transistor M61 is electrically connected to the third control node H (N), the source electrode of the sixty-first transistor M61 is electrically connected to the drain electrode of the sixtieth transistor M60, and the drain electrode of the sixty-first transistor M61 is electrically connected to the first low voltage line VGL1;

the (N+1)th stage of pull-up control circuit further includes a sixty-second transistor M62;

the gate electrode of the sixty-second transistor M62 is electrically connected to the (N+1)th stage of pull-up node Q (N+1), the source electrode of the sixty-second transistor M62 is electrically connected to the power supply voltage line VDD, and the drain electrode of the sixty-second transistor M62 is electrically connected to the second intermediate node OF2;

the second pull-down node control circuit may include a sixty-third transistor M63, a sixty-fourth transistor M64, a sixty-fifth transistor M65, a sixty-sixth transistor M66, a sixty-seventh transistor M67 and a sixty-eighth transistor M68;

the gate electrode of the sixty-third transistor M63 is electrically connected to the source electrode of the sixty-third transistor M63 and the second control voltage line VDDB, and the drain electrode of the sixty-third transistor M63 is electrically connected to the source electrode of the sixty-fourth transistor M64;

the gate electrode of the sixty-fourth transistor M64 is electrically connected to the second control voltage line VDDB, and the drain electrode of the sixty-fourth transistor M64 is electrically connected to the gate electrode of the sixty-fifth transistor M65;

the source electrode of the sixty-fifth transistor M65 is electrically connected to the second control voltage line VDDB, and the drain electrode of the sixty-fifth transistor M65 is electrically connected to the second pull-down node QBB;

the gate electrode of the sixty-sixth transistor M66 is electrically connected to the (N+1)th stage of pull-up node Q (N+1), the source electrode of the sixty-sixth transistor M66 is electrically connected to the gate electrode of the sixty-fifth transistor M65, and the drain electrode of the sixty-sixth transistor M66 is electrically connected to the third low voltage line VGL3;

the gate electrode of the sixty-sixth transistor M66 is electrically connected to the (N+1)th stage of pull-up node Q (N+1), the source electrode of the sixty-sixth transistor M66 is electrically connected to the second pull-down node QBB, and the drain electrode of the sixty-sixth transistor M66 is electrically connected to the first low voltage line VGL1;

the gate electrode of the sixty-seventh transistor M67 is electrically connected to the first clock signal line CLKA, and the source electrode of the sixty-seventh transistor M67 is electrically connected to the second pull-down node QBB;

the gate electrode of the sixty-eighth transistor M68 is electrically connected to the third control node H (N), the source electrode of the sixty-eighth transistor M68 is electrically connected to the drain electrode of the sixty-seventh transistor M67, and the drain electrode of the sixty-eighth transistor M68 is electrically connected to the first low voltage line VGL1.

In FIG. 7, the first capacitor is labeled C1, the second capacitor is labeled C2, the third capacitor is labeled C3, the fourth capacitor is labeled C4, and the fifth capacitor is labeled C5.

FIGS. 8A, 8B, 8C, 8D, and 8E are layout diagrams of the driving circuit shown in FIG. 7.

Figure 8A:
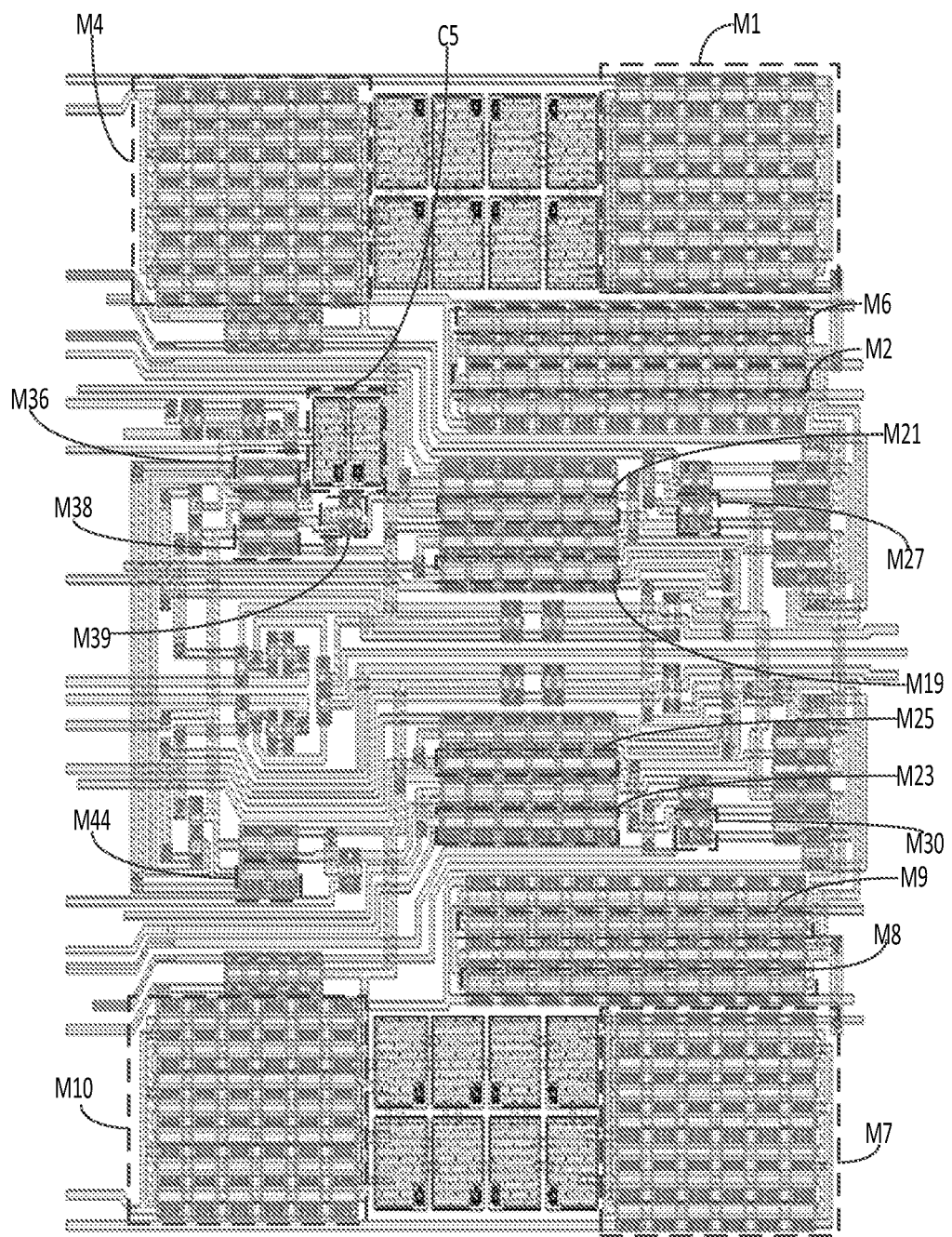
FIG. 8A, FIG. 8B, FIG. 8C, FIG. 8D and FIG. 8E are layout diagrams of the driving circuit shown in FIG. 7.
Figure 8B:
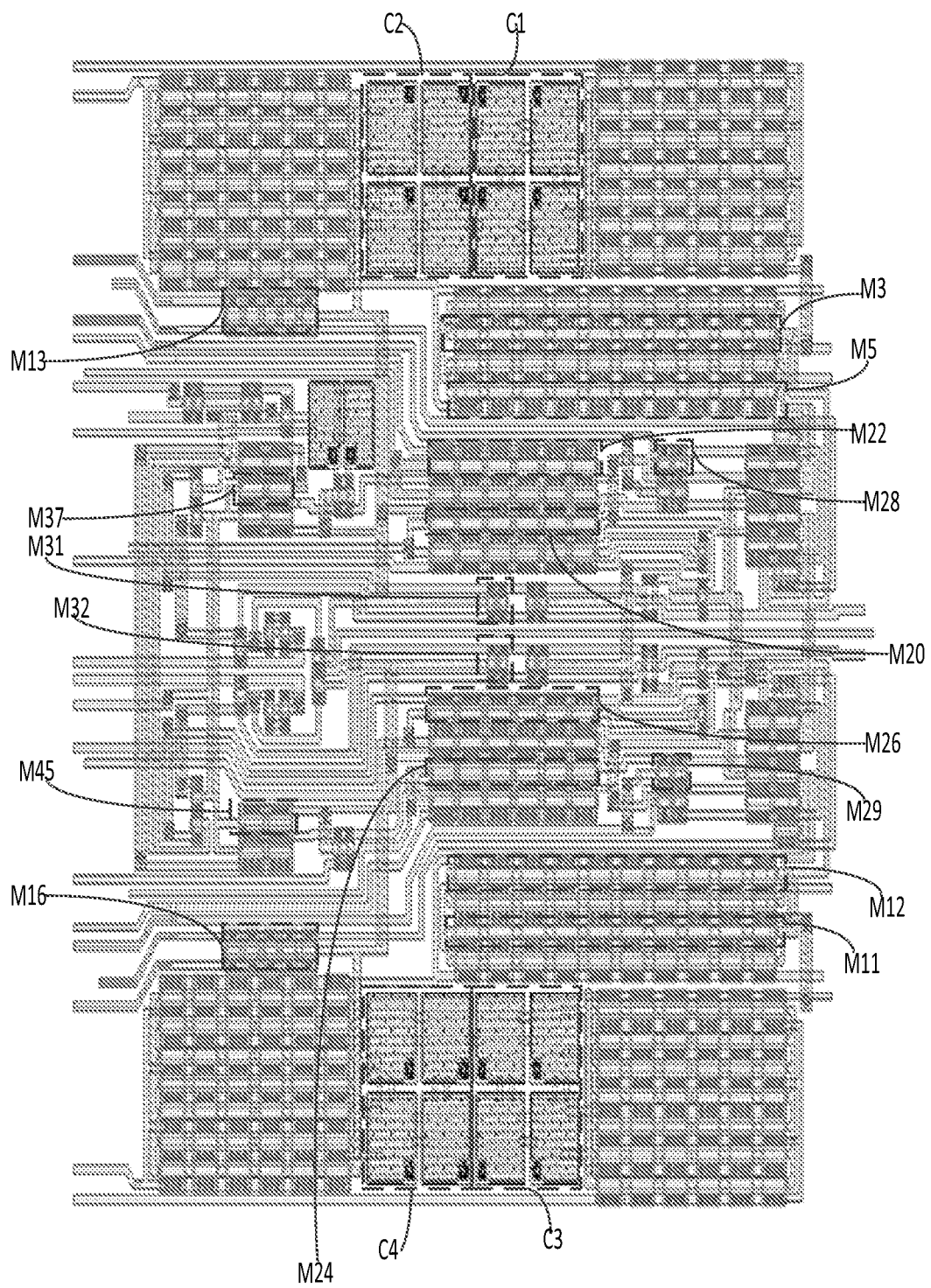
Figure 8C:
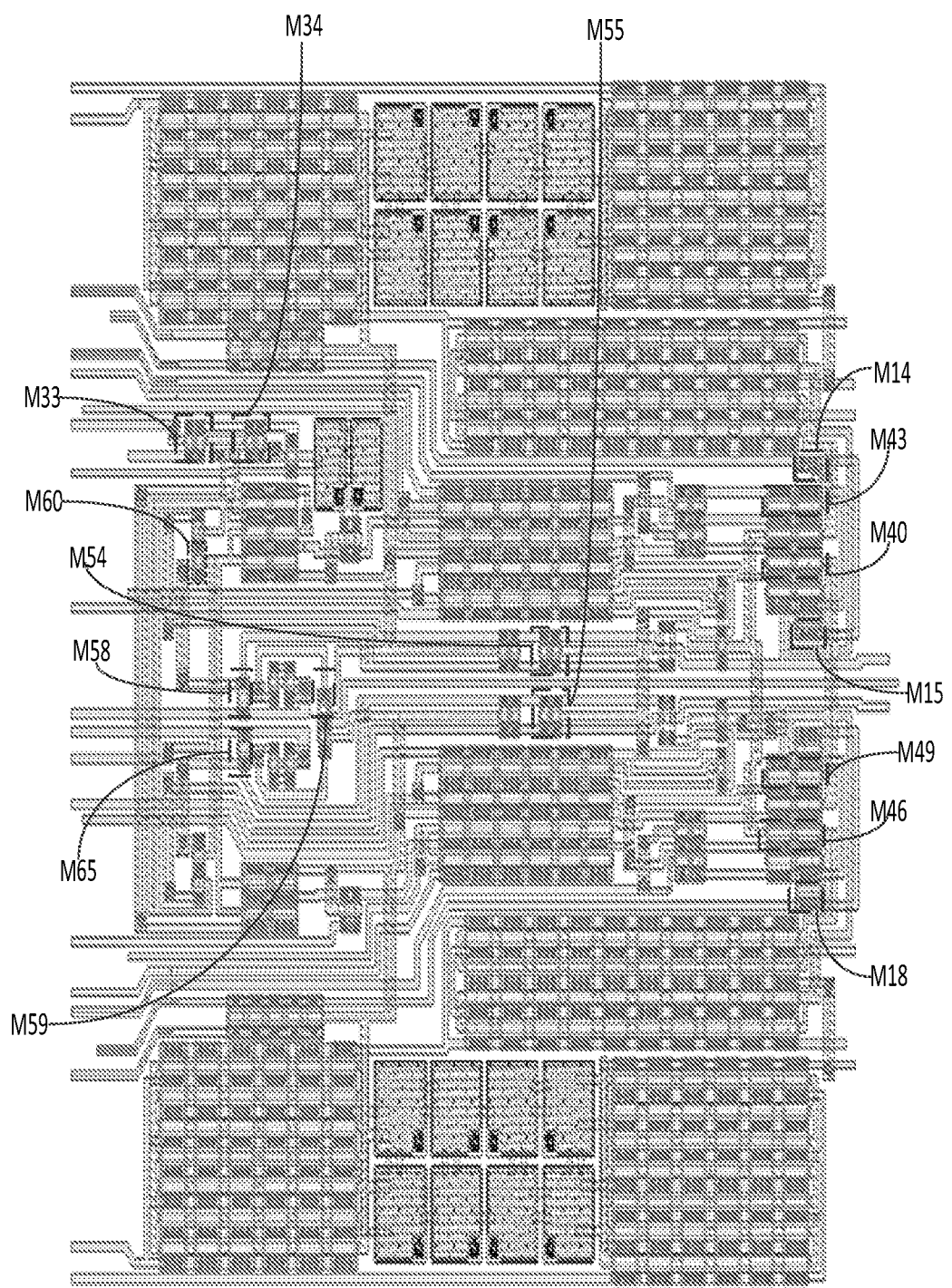
Figure 8D:
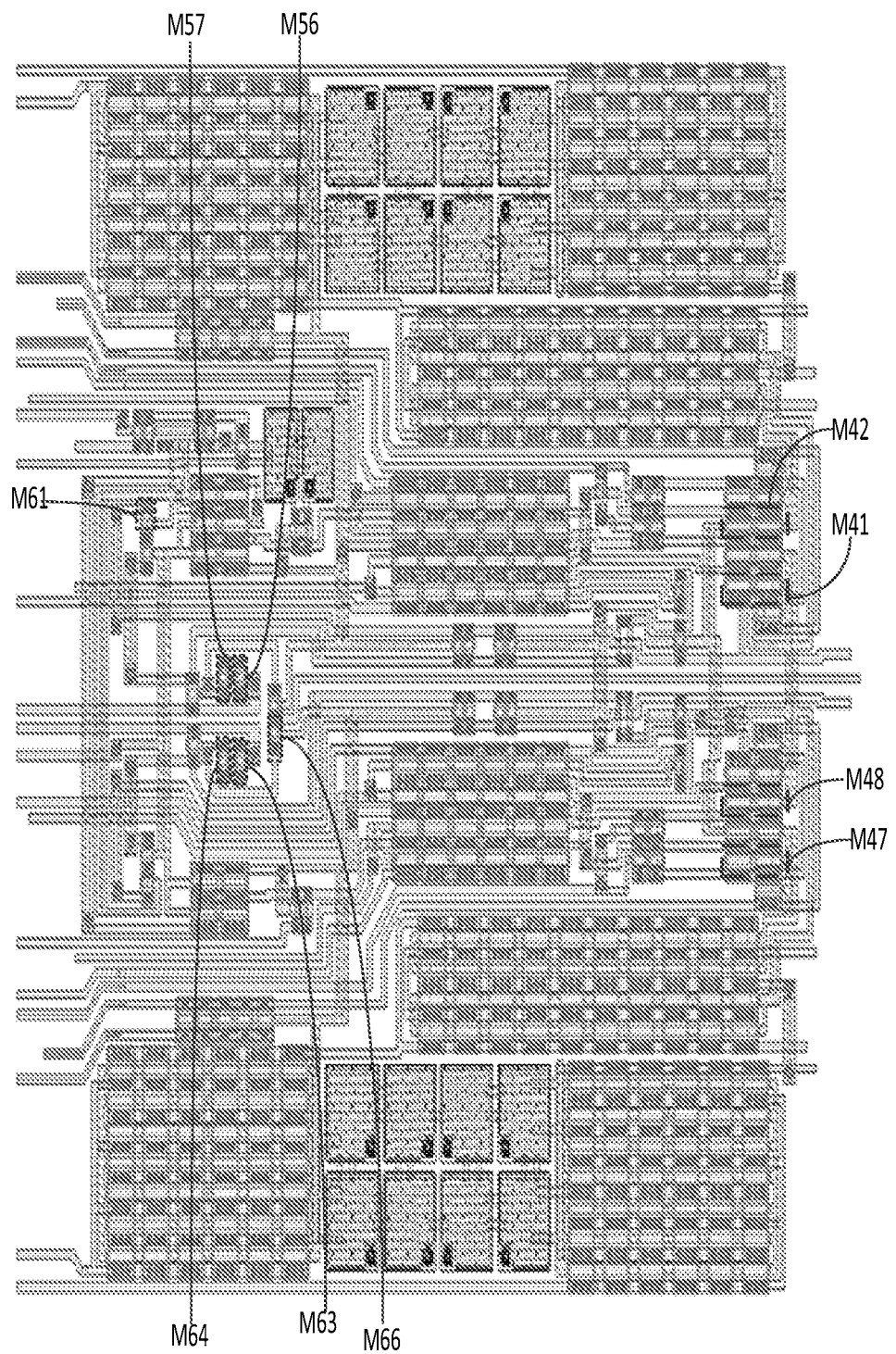
Figure 8E:
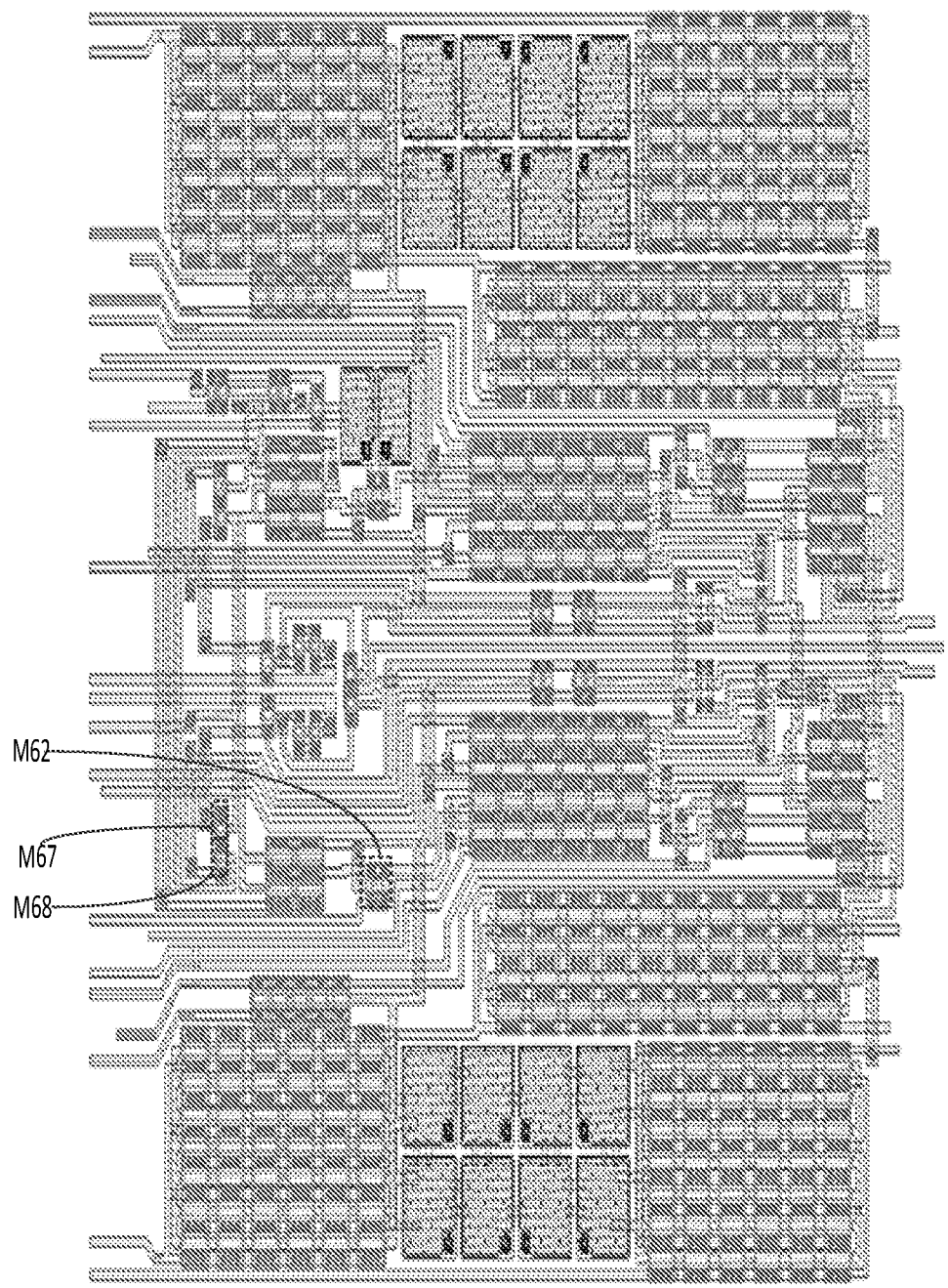

FIG. 9A, FIG. 9B, FIG. 9C, FIG. 9D, FIG. 9E, FIG. 9F, FIG. 9G, FIG. 9H, FIG. 9I, FIG. 9J, FIG. 9K, FIG. 9L, FIG. 9M, FIG. 9N, FIG. 9O, FIG. 9P, FIG. 9Q, and FIG. 9R are the layout diagrams of the semiconductor layers in FIG. 8A.

Figure 9A:
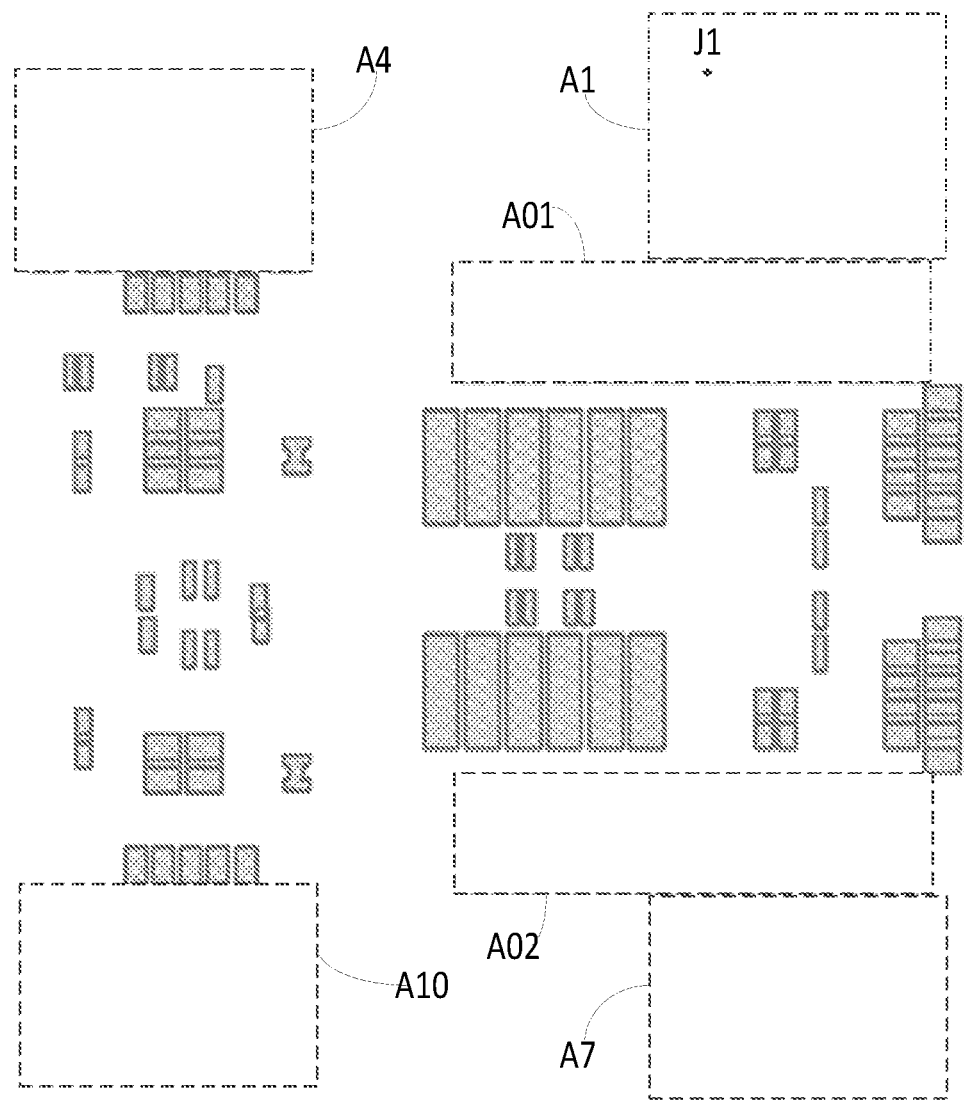
FIG. 9A, FIG. 9B, FIG. 9C, FIG. 9D, FIG. 9E, FIG. 9F, FIG. 9G, FIG. 9H, FIG. 9I, FIG. 9J, FIG. 9K, FIG. 9L, FIG. 9M, FIG. 9N, FIG. 9O, FIG. 9P, FIG. 9Q, and FIG. 9R are layout diagrams of the semiconductor layer circuit shown in FIG. 8A.

In FIG. 9A, the active pattern of M1 is labeled A1, the active pattern of M4 is labeled A4, the active pattern of M7 is labeled A7, and the active pattern of M10 is labeled A10; the first active pattern is labeled A01, the second active pattern is labeled A02.

As shown in FIG. 9A, the first active pattern A01 is used as the active pattern of M2, the active pattern of M3, the active pattern of M5 and the active pattern of M6;

The second active pattern A02 is used as the active pattern of M8, the active pattern of M9, the active pattern of M11, and the active pattern of M12.

As shown in FIG. 9A, A1 includes six active pattern portions arranged horizontally, A4 includes six active pattern portions arranged horizontally, A7 includes six active pattern portions arranged horizontally, and A10 includes six active pattern portions arranged horizontally.

The distance between the adjacent active pattern portions included in A1 is the first spacing J1;

For example, the first spacing J1 may be 20.5 μm, but not limited to this.

Figure 9B:
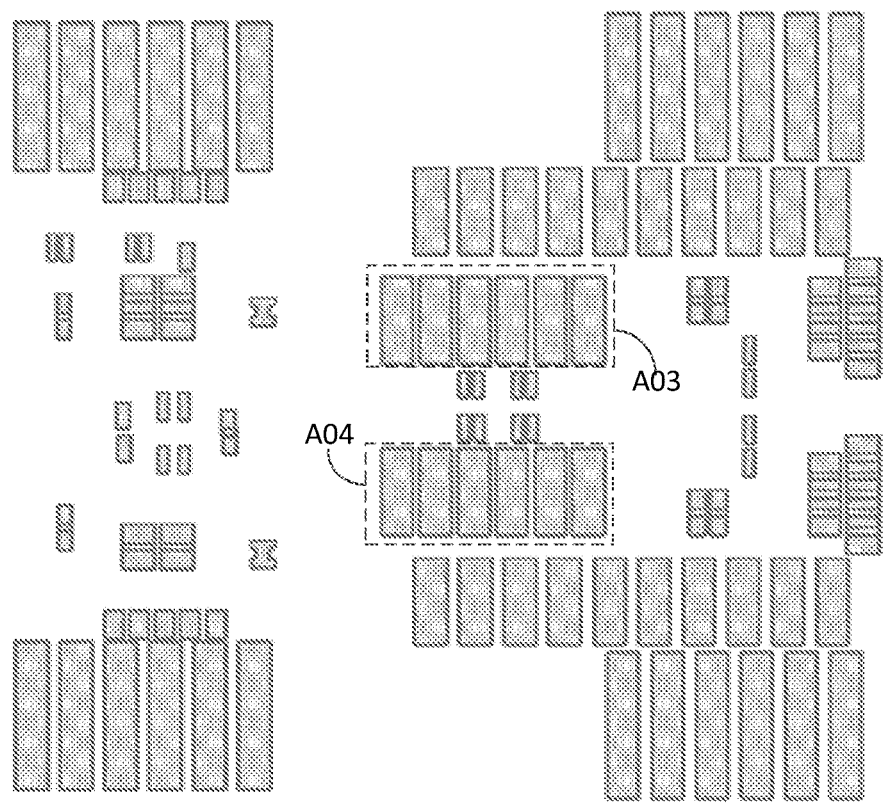

In FIG. 9B, the third active pattern is labeled A03, and the fourth active pattern is labeled A04.

As shown in FIG. 9B, the third active pattern A03 is used as the active pattern of M19, the active pattern of M20, the active pattern of M21 and the active pattern of M22;

The fourth active pattern A04 is used as the active pattern of M23, the active pattern of M24, the active pattern of M25, and the active pattern of M26.

As shown in FIG. 9B, the third active pattern A03 includes six active pattern portions arranged horizontally, and the fourth active pattern A04 includes six active pattern portions arranged horizontally.

Figure 9C:
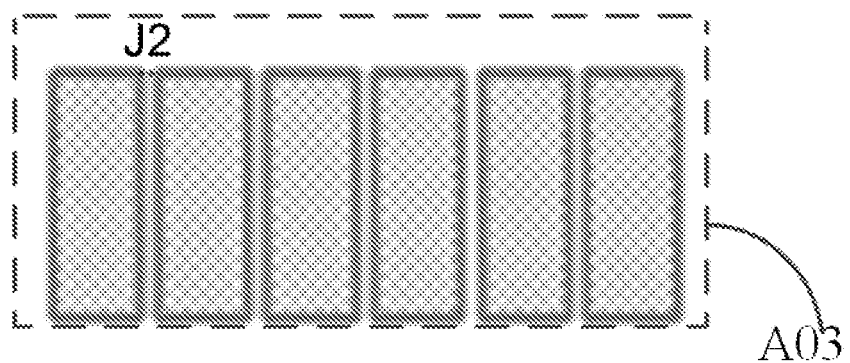
Figure 9D:
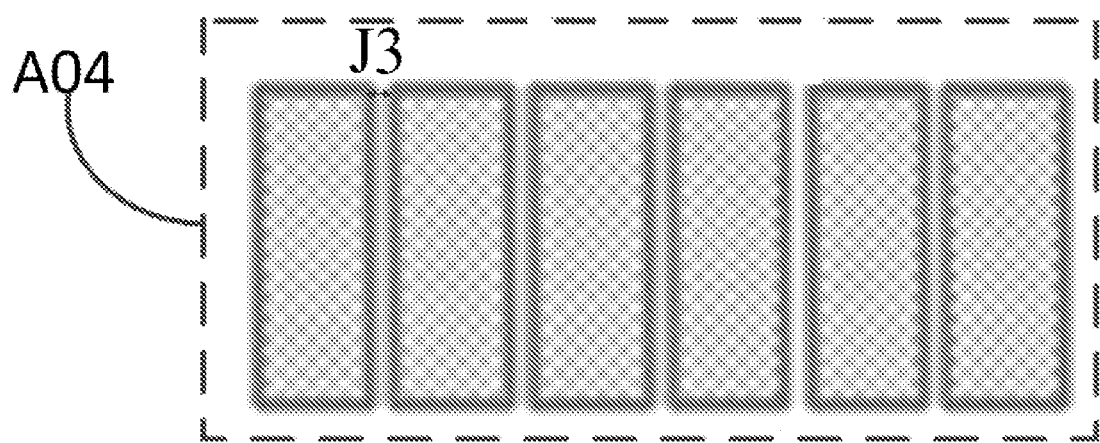

As shown in FIG. 9C, the spacing between the adjacent active pattern portions included in A03 can be the second spacing J2, and as shown in FIG. 9D, the spacing between the adjacent active pattern portions included in A04 can be the third spacing J3.

For example, J2 and J3 can be 10.5 μm, but not limited to this.

Figure 9E:
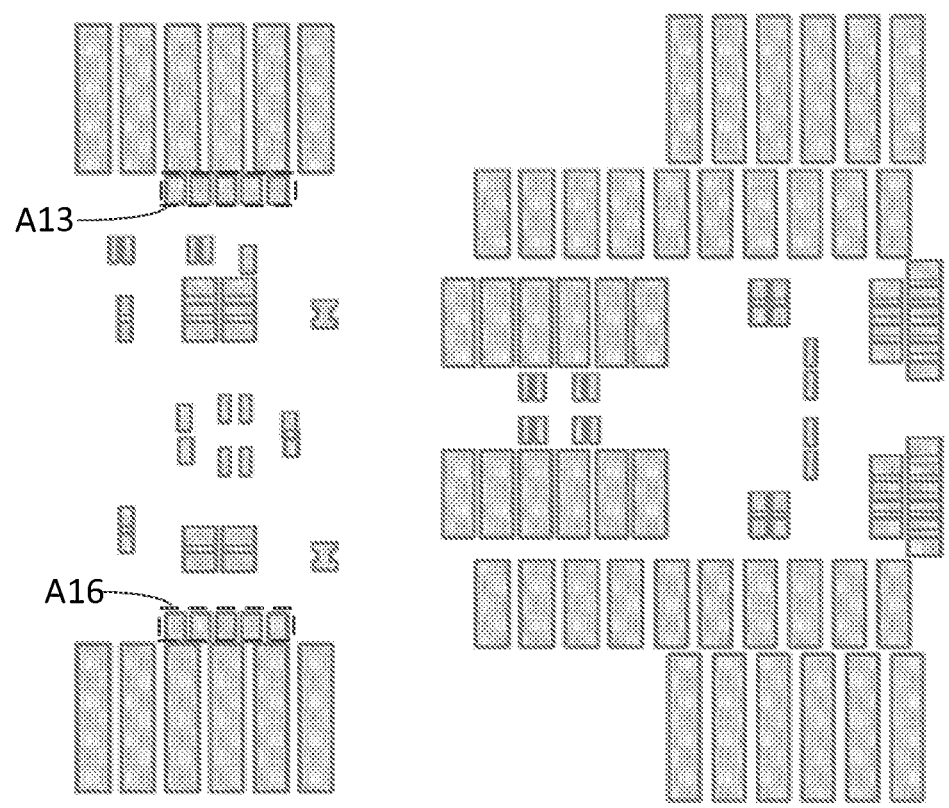

In FIG. 9E, the active pattern of M13 is labeled A13 and the active pattern of M16 is labeled A16.

Figure 9F:
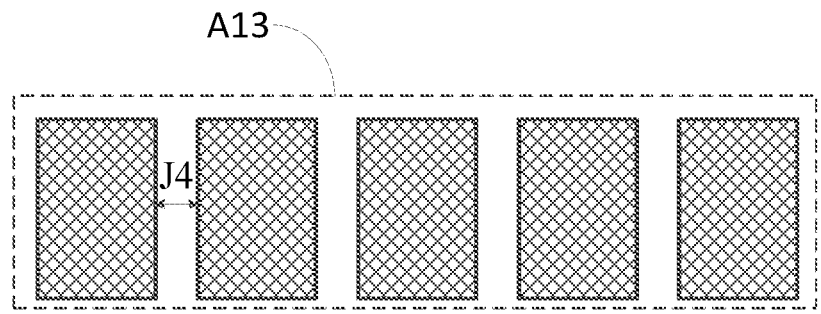

In FIG. 9F, the spacing between the adjacent active pattern portions included in A13 can be the fourth spacing J4.

For example, the fourth spacing J4 may be 10.5 μm, but is not limited to this.

Figure 9G:
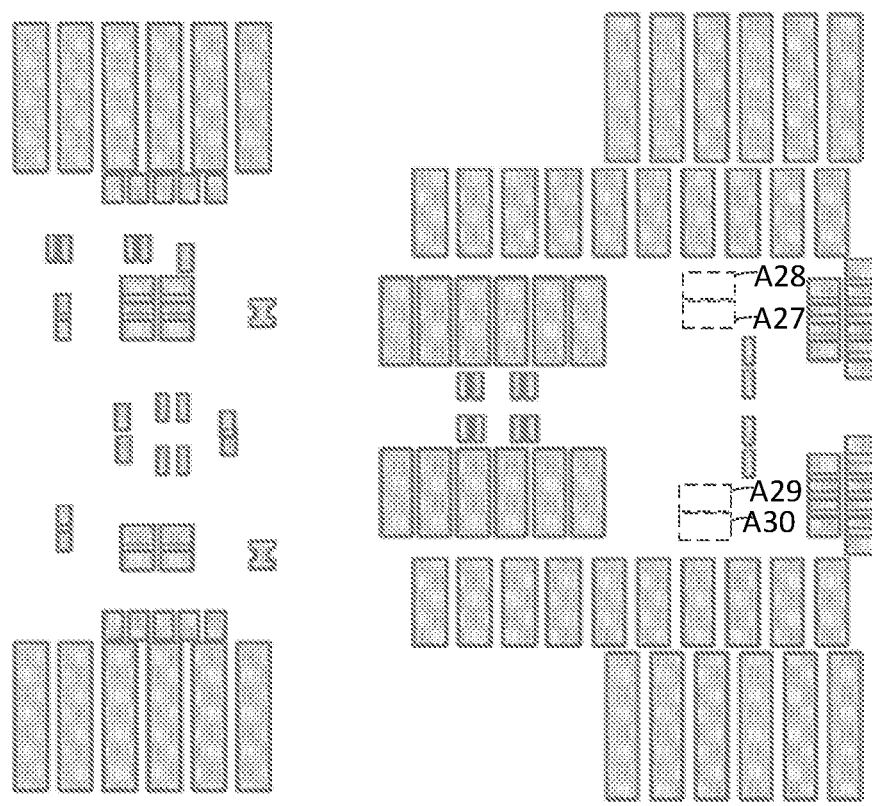

In FIG. 9G, the active pattern of M27 is labeled A27, the active pattern of M28 is labeled A28, the active pattern of M29 is labeled A29, and the active pattern of M30 is labeled A30.

Figure 9H:
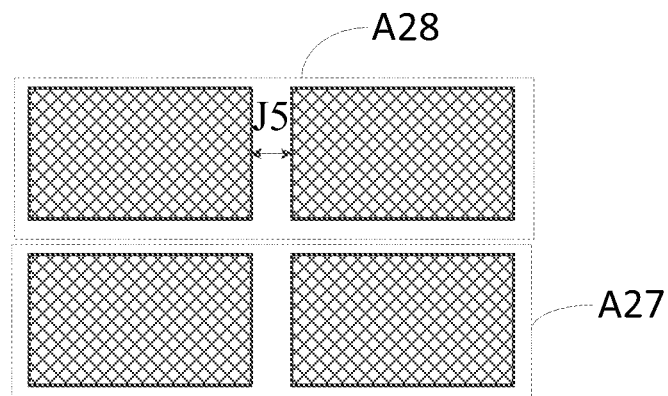

As shown in FIG. 9H, the fifth spacing is labeled J5, and the fifth spacing J5 can be 8 μm, but is not limited to this.

Figure 9I:
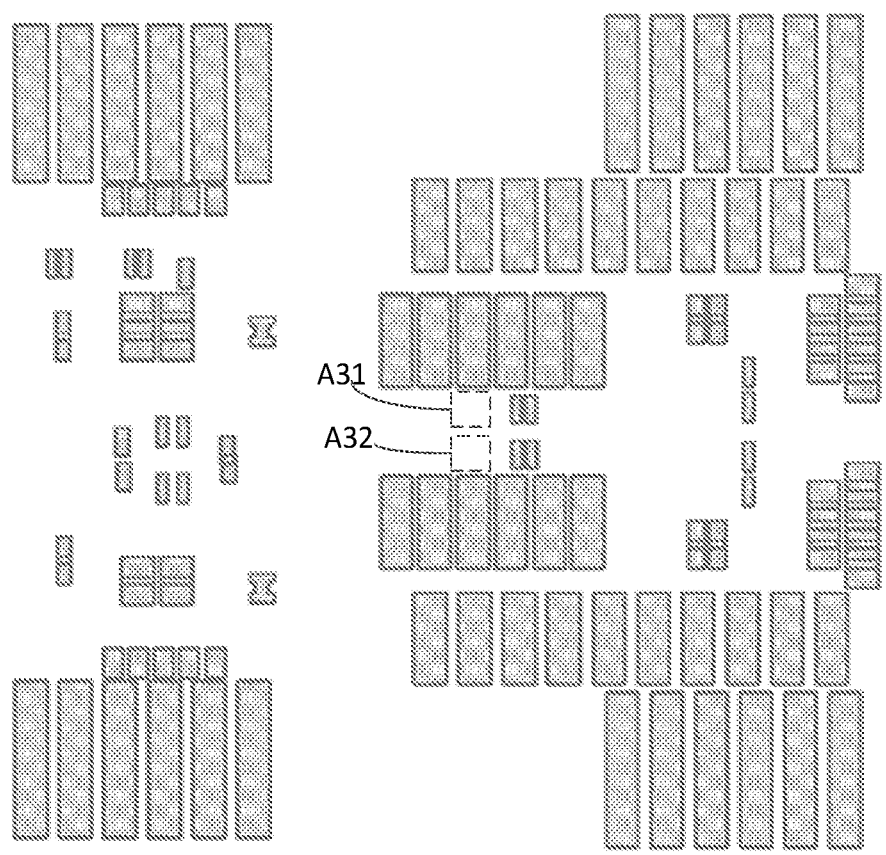

In FIG. 9I, the active pattern of M31 is labeled A31 and the active pattern of M32 is labeled A32.

Figure 9J:
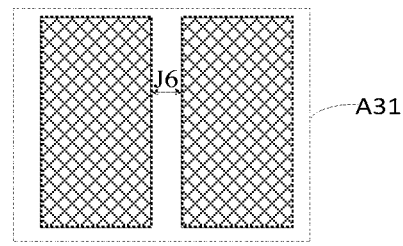
Figure 9J:
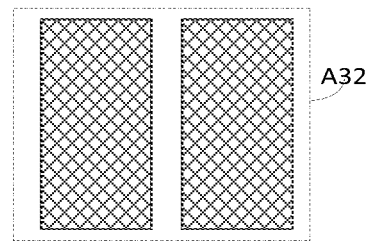

In FIG. 9J, the sixth spacing is labeled J6, and the sixth spacing J6 can be 8 μm, but is not limited to this.

Figure 9K:
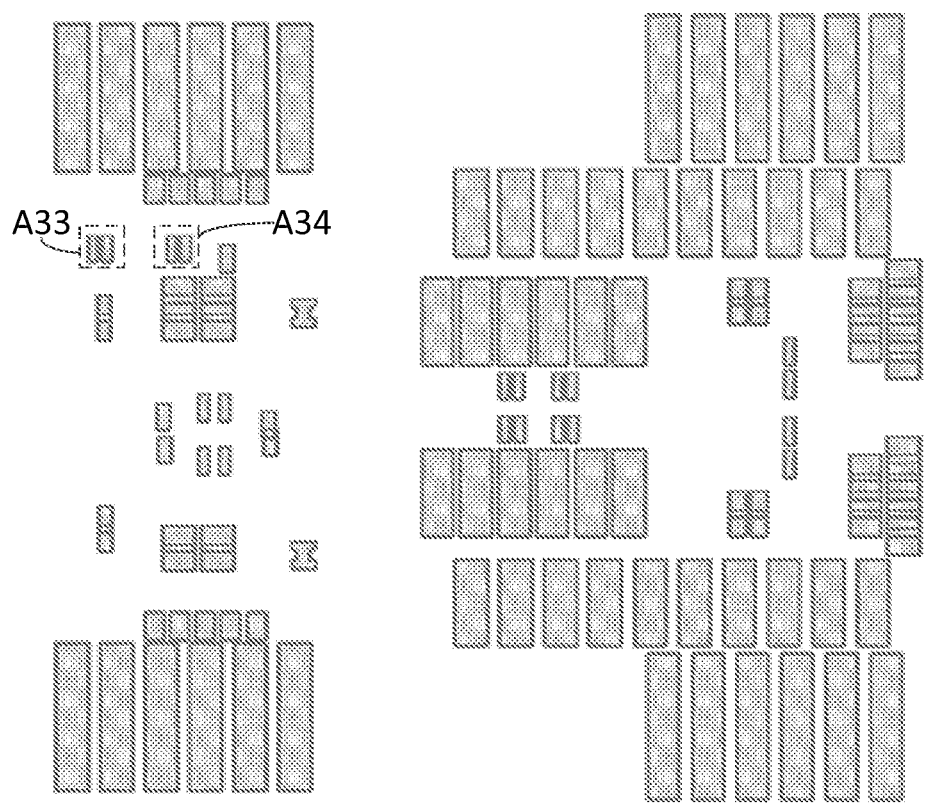

In FIG. 9K, the active pattern of M33 is labeled A33, the active pattern of M34 is labeled A34.

Figure 9L:
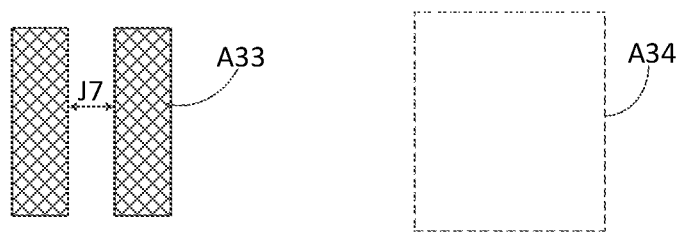

In FIG. 9L, the seventh spacing is labeled J7, and the seventh spacing J7 can be 8 μm, but is not limited to this.

Figure 9M:
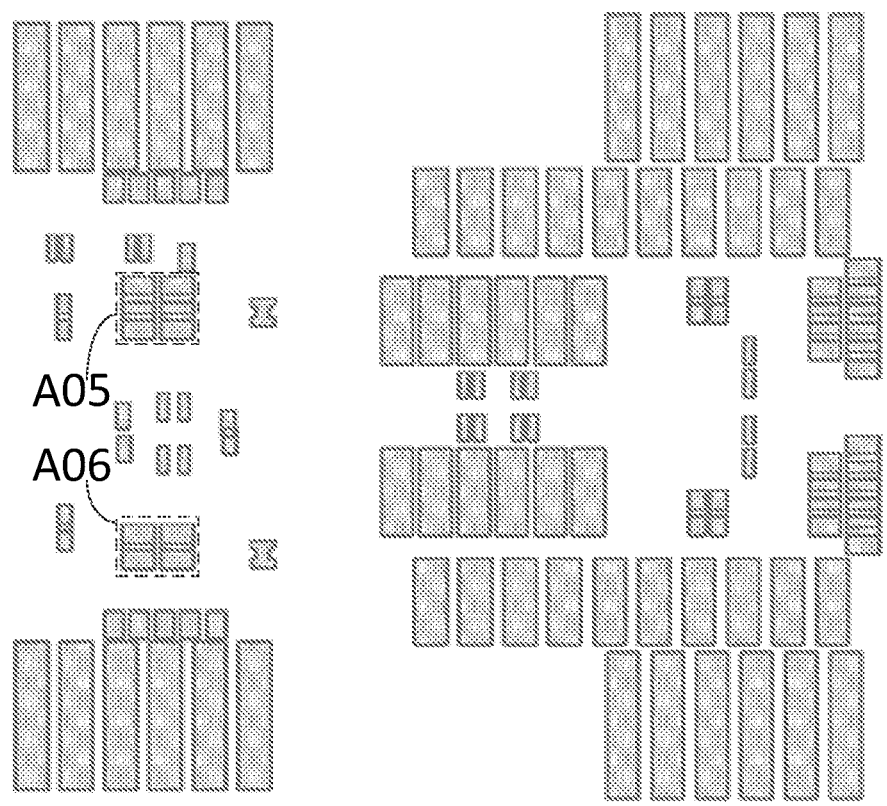

In FIG. 9M, the fifth active pattern is labeled A05, and the sixth active pattern is labeled A06.

As shown in FIG. 9M, A05 is used as the active pattern of M36, the active pattern of M37 and the active pattern of M38, and A06 is used as the active pattern of M44 and the active pattern of M45.

Figure 9N:
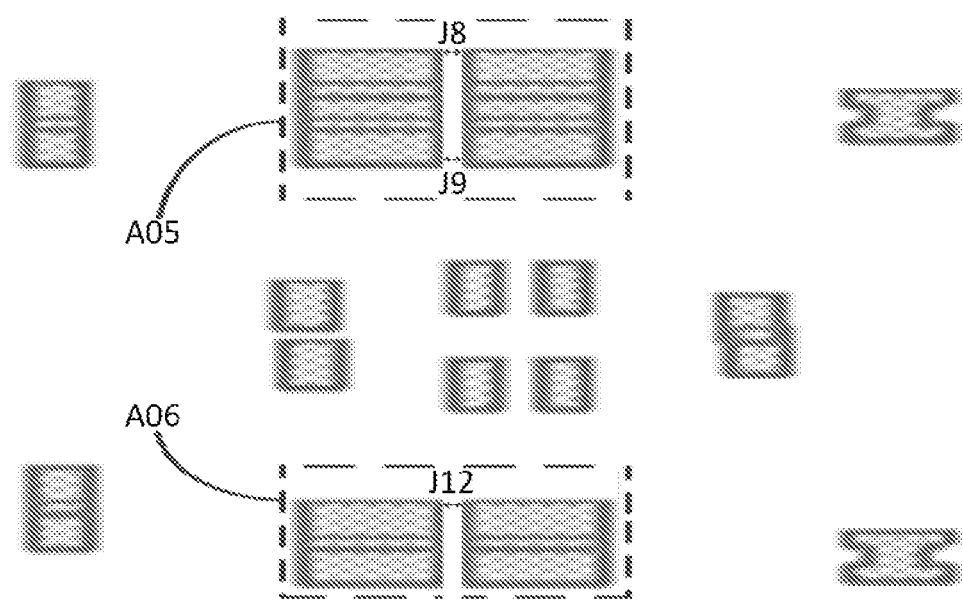

In FIG. 9N, the eighth spacing is labeled J8, and the eighth spacing J8 can be 8 μm, but is not limited to this.

In FIG. 9N, the ninth spacing is labeled J9, and the ninth spacing J9 can be 8 μm, but is not limited to this.

In at least one embodiment shown in FIGS. 9N, J8 and J9 may be equal, but not limited to this.

In FIG. 9N, the twelfth spacing is labeled J12, and the ninth spacing J12 can be 8 μm, but is not limited to this.

Figure 9O:
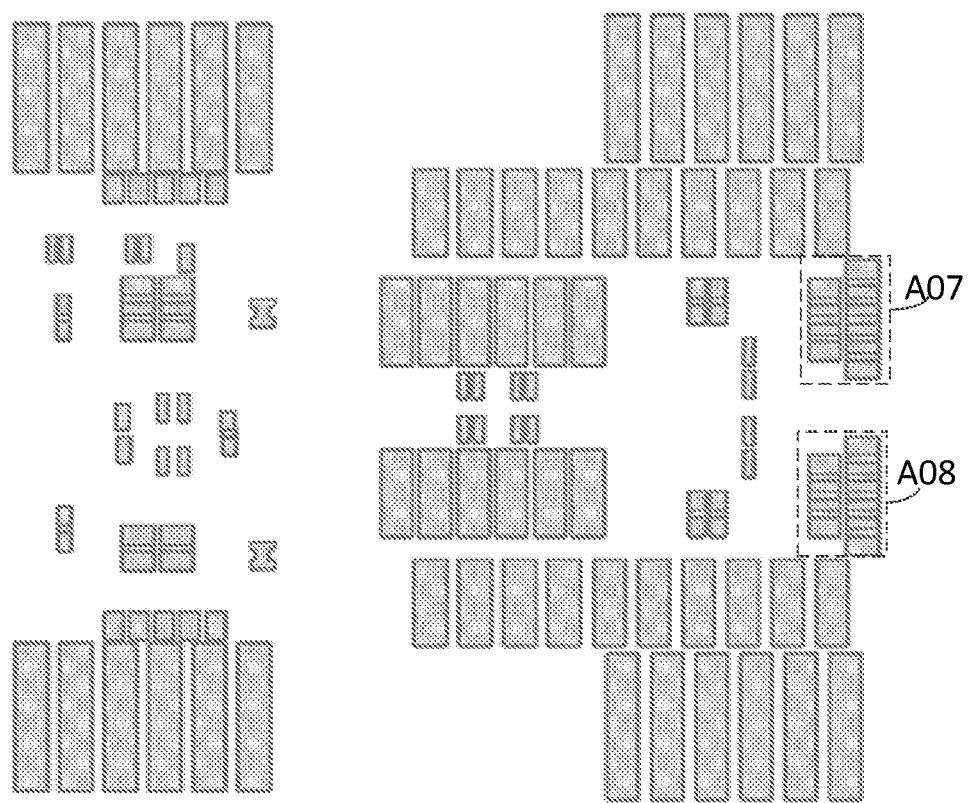

In FIG. 9O, the seventh active pattern is labeled A07, and the eighth active pattern is labeled A08.

As shown in FIG. 9O, the seventh active pattern A07 is used as the active pattern of M40, the active pattern of M41, the active pattern of M42, the active pattern of M43, the active pattern of M14 and the active pattern of M15;

The eighth active pattern A08 is used as active pattern of M46, active pattern of M47, active pattern of M48, active pattern of M49, active pattern of M17, and active pattern of M18.

Figure 9P:
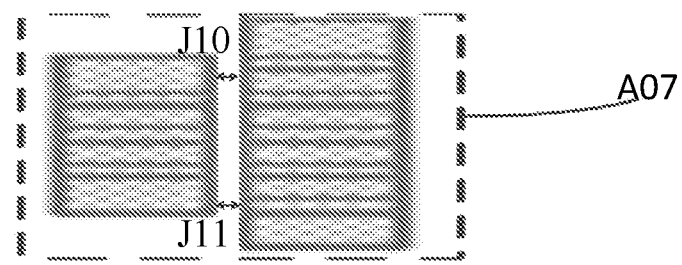
Figure 9P:
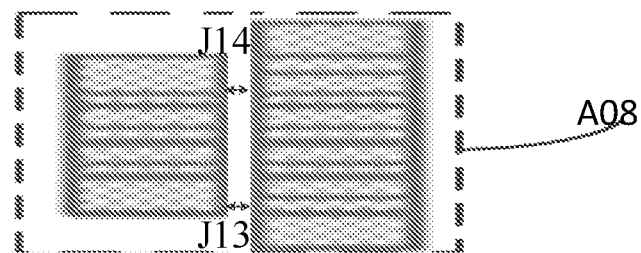

As shown in FIG. 9P, the tenth spacing is labeled J10, the eleventh spacing is labeled J11, the thirteenth spacing is labeled J13, the fourteenth spacing is labeled J14, for example, the tenth spacing J10 can be 8 μm, the eleventh spacing J11 can be 8 μm, the thirteenth spacing J13 can be 8 μm, and the fourteenth spacing J14 can be 8 μm, but this is not limited.

In at least one embodiment shown in FIG. 9P, J10 may be equal to J11 and J13 may be equal to J14, but not limited to this.

Figure 9Q:
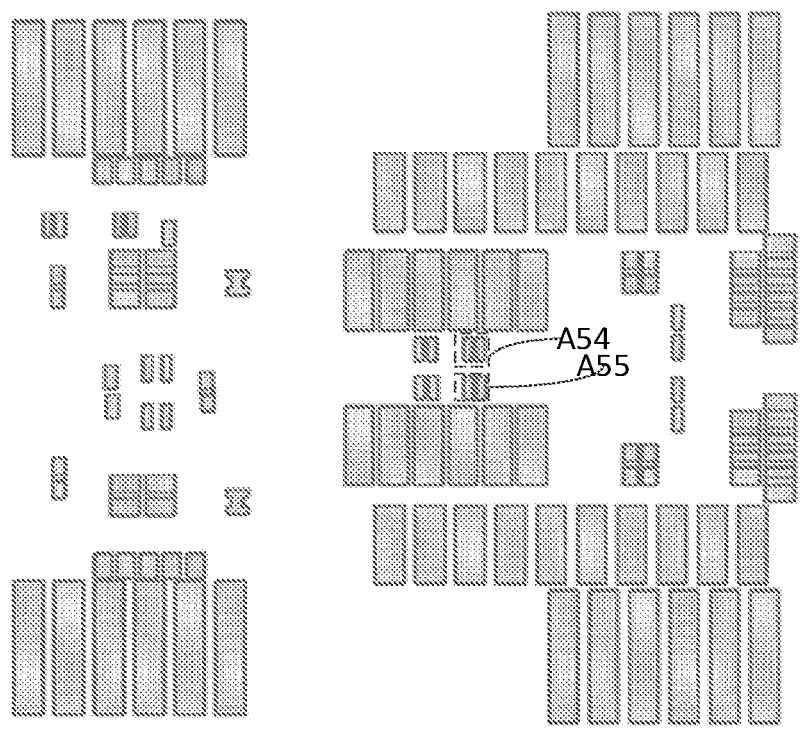

In FIG. 9Q, the active pattern of M54 is labeled A54, the active pattern of M55 is labeled A55.

Figure 9R:
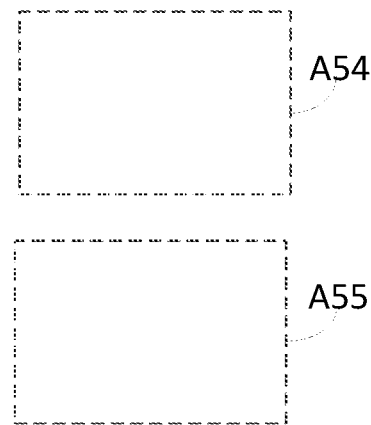

In FIG. 9R, the fifteenth spacing is labeled J15 and the sixteenth spacing is labeled J16. For example, the fifteenth spacing J15 can be 8 μm, and the sixteenth spacing J16 can be 8 μm, but not limited to this.

Figure 10:
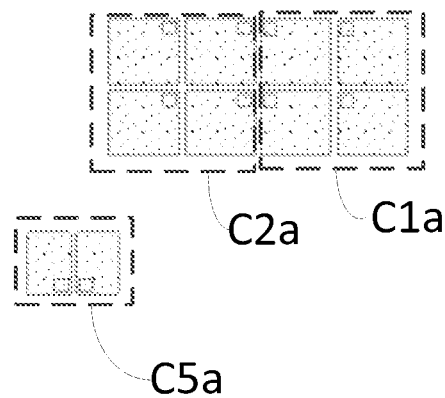
FIG. 10 is a layout diagram of the light shielding metal layer in FIG. 8A.
Figure 10:
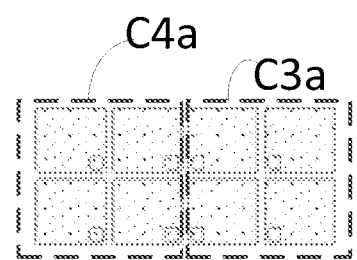

FIG. 10 is a layout diagram of the light shielding metal layer in FIG. 8A.

As shown in FIG. 10, the first electrode plate of the first capacitor is labeled C1a, the first electrode plate of the second capacitor is labeled C2a, the first electrode plate of the third capacitor is labeled C3a, the first electrode plate of the fourth capacitor is labeled C4a, and the first electrode plate of the fifth capacitor is labeled C5a.

Figure 11A:
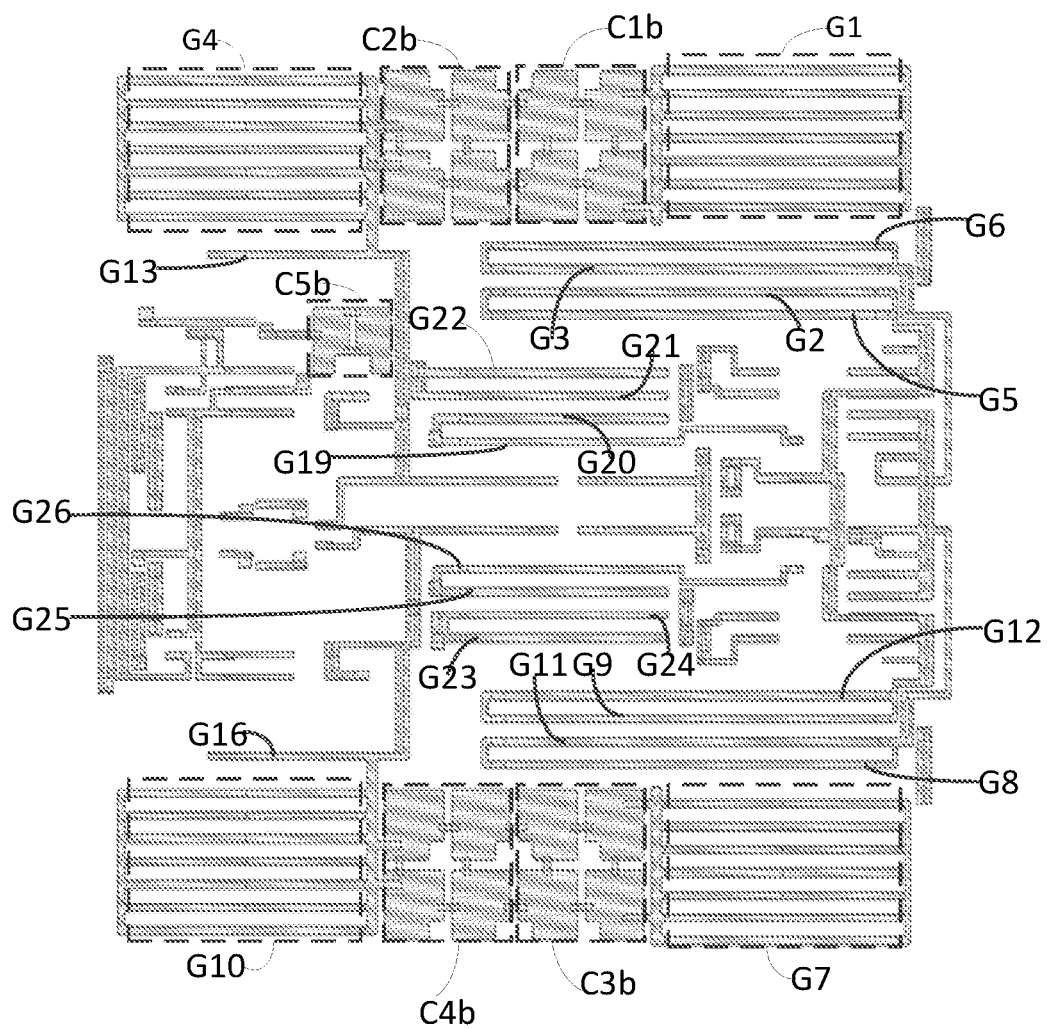
FIG. 11A and FIG. 11B are layout diagrams of the gate metal layer in FIG. 8A.
Figure 11B:
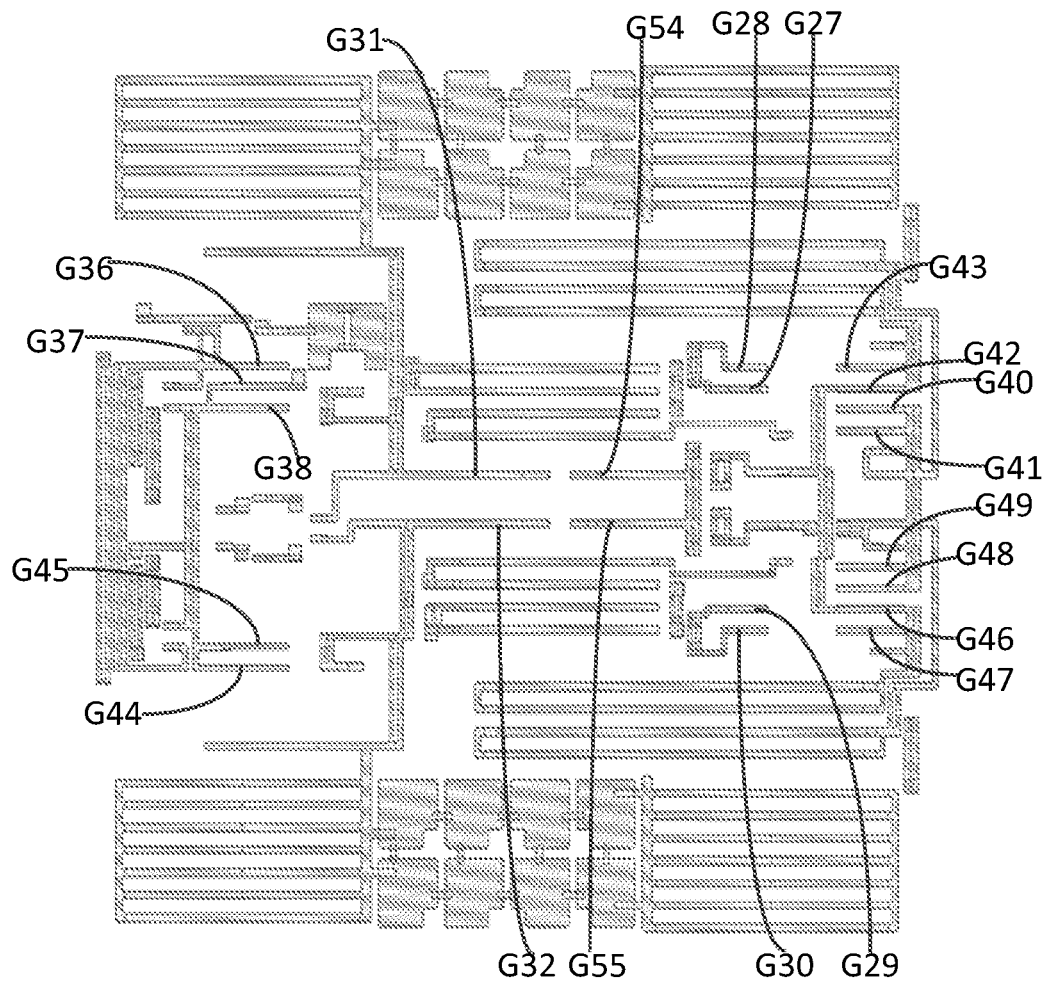

FIGS. 11A and 11B are the layout diagrams of the gate metal layer in FIG. 8A.

As shown in FIG. 11A, the second electrode plate of the first capacitor is labeled C1b, the second electrode plate of the second capacitor is labeled C2b, the second electrode plate of the third capacitor is labeled C3b, the second electrode plate of the fourth capacitor is labeled C4b, and the second electrode plate of the fifth capacitor is labeled C5b;

G1 is the gate electrode of M1, G2 is the gate electrode of M2, G3 is the gate electrode of M3, G4 is the gate electrode of M4, G5 is the gate electrode of M5, G6 is the gate electrode of M6, G7 is the gate electrode of M7, G8 is the gate electrode of M8, G9 is the gate electrode of M9, G10 is the gate electrode of M10, G11 is the gate electrode of M11, G12 is the gate electrode of M12, G13 is the gate electrode of M13, G16 is the gate electrode of M16, G19 is the gate electrode of M19, G20 is the gate electrode of M20, G21 is the gate electrode of M21, G22 is the gate electrode of M22, G23 is the gate electrode of M23, G24 is the gate electrode of M24, G25 is the gate electrode of M25, G26 is the gate electrode of M26.

As shown in FIG. 11B, the G27 is the gate electrode of M27, the G28 is the gate electrode of M28, the G29 is the gate electrode of M29, the G30 is the gate electrode of M30, the G31 is the gate electrode of M31, the G32 is the gate electrode of M32, the G36 is the gate electrode of M36, the G37 is the gate electrode of M37, the G38 is the gate electrode of M38, the G40 is the gate electrode of M40, the G41 is the gate electrode of M41, the G42 is the gate electrode of M42, and the G44 is the gate electrode of M44, G45 is the gate electrode of M45, G46 is the gate electrode of M46, G47 is the gate electrode of M47, G48 is the gate electrode of M48, G49 is the gate electrode of M49, G54 is the gate electrode of M54, G55 is the gate electrode of M55.

Figure 12:
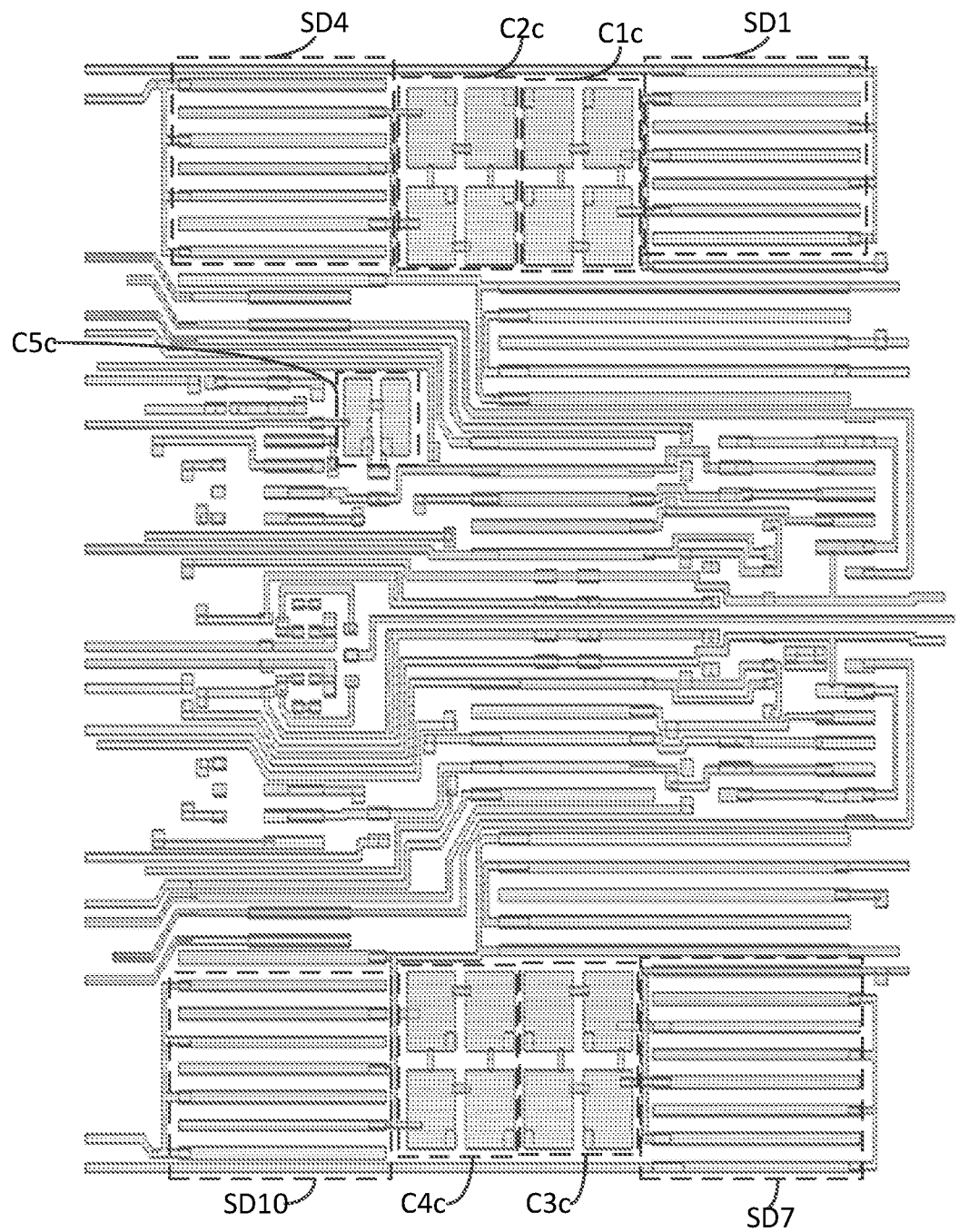
FIG. 12 is a layout diagram of the source-drain metal layer in FIG. 8A.

FIG. 12 is a layout diagram of the source-drain metal layer in FIG. 8A.

As shown in FIG. 12, the third electrode plate of the first capacitor is labeled C1c, the third electrode plate of the second capacitor is labeled C2c, the third electrode plate of the third capacitor is labeled C3c, the third electrode plate of the fourth capacitor is labeled C4c, and the third electrode plate of the fifth capacitor is labeled C5c;

the source-drain metal pattern of M1 is labeled SD1, the source-drain metal pattern of M4 is labeled SD4, the source-drain metal pattern of M7 is labeled SD7, the source-drain metal pattern of M10 is labeled SD10;

The source-drain metal pattern SD1 of M1 includes the source electrode of M1 and the drain electrode of M1, the source-drain metal pattern SD4 of M4 includes the source electrode of M4 and the drain electrode of M4, the source-drain metal pattern SD7 of M7 includes the source electrode of M7 and the drain electrode of M7, and the source-drain metal pattern SD10 of M10 includes the source electrode of M10 and the drain electrode of M10.

In at least one embodiment of the present disclosure, the first electrode plate of each capacitor and the third electrode plate of the capacitor may be electrically connected to each other.

Figure 13:
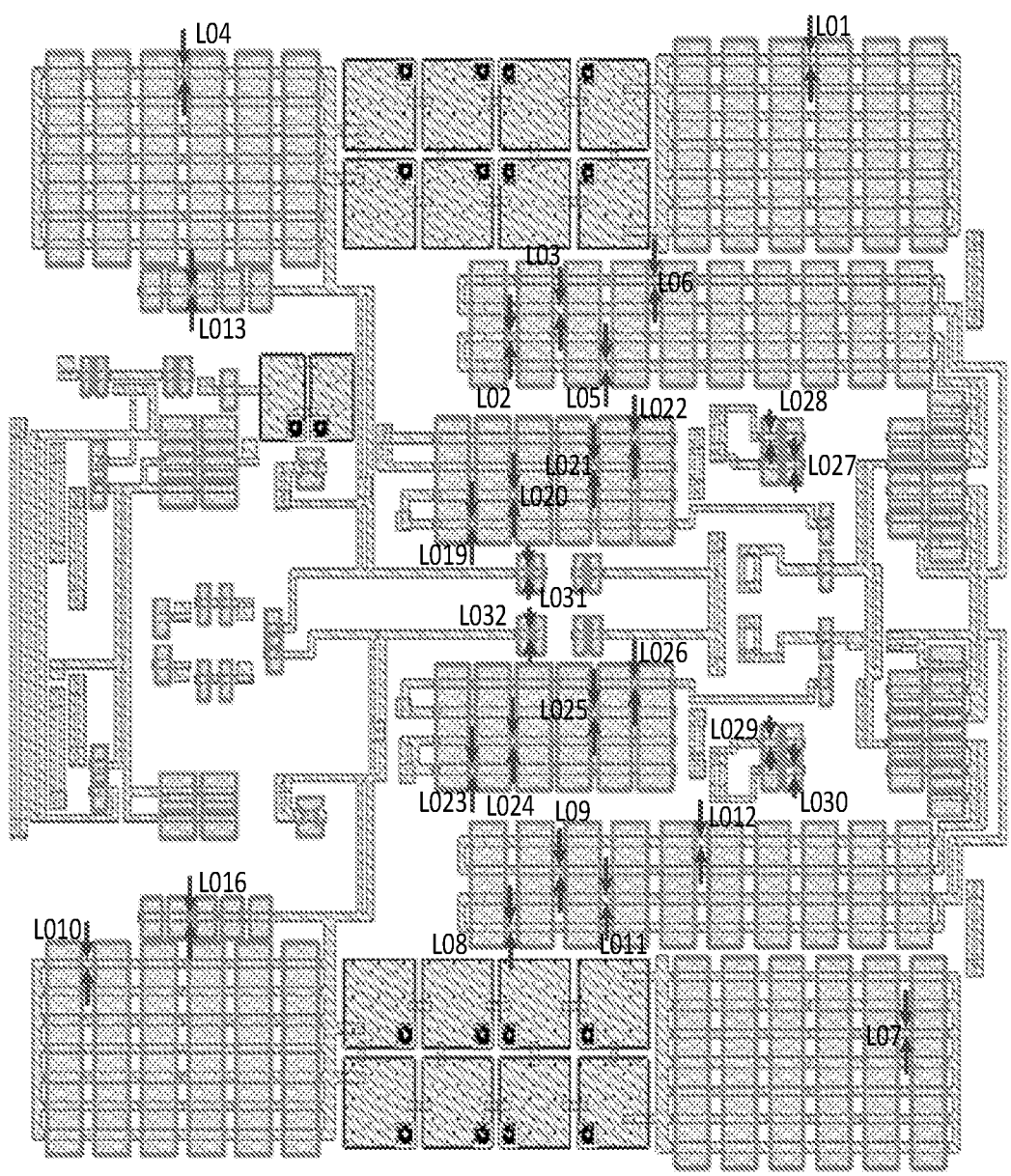
FIG. 13 is a stacking diagram of the light shielding metal layer, the gate metal layer and the semiconductor layer in FIG. 8A.

FIG. 13 is a stacked diagram of the light shielding metal layer, the gate metal layer, and the semiconductor layer in FIG. 8A.

As shown in FIG. 13, the channel length of M1 is labeled L01, the channel length of M2 is labeled L02, the channel length of M3 is labeled L03, the channel length of M4 is labeled L04, the channel length of M5 is labeled L05, the channel length of M6 is labeled L06, the channel length of M7 is labeled L07, the channel length of M8 is labeled L08, the channel length of M9 is labeled L09, the channel length of M10 is labeled L010, the channel length of M11 is labeled L011, and the channel length of M12 is labeled L012, the channel length of M13 is labeled L013, the channel length of M19 is labeled L019, the channel length of M20 is labeled L020, the channel length of M21 is labeled L021, the channel length of M22 is labeled L022, the channel length of M23 is labeled L023, the channel length of M24 is labeled L024, the channel length of M25 is labeled L025, the channel length of M26 is labeled L026, the channel length of M27 is labeled L027, the channel length of M28 is labeled L028, the channel length of M29 is labeled L029, the channel length of M30 is labeled L030, the channel length of M31 is labeled L031, and the channel length of M32 is labeled L032.

In at least one embodiment shown in FIGS. 13, L01, L2, L03, L04, L05, L06, L07, L08, L09, L10, L11 and L12 may be 10 μm;

L013 can be 10 µm;

L019, L020, L021 and L022 can be 10 µm;

L023, L024, L025, L026, L027, L028, L029, L030, L031 and L032 can be 8 µm; but not limited to that.

Optionally, L013, L019, L020, L021, and L022 can also be set to 9 µm, i.e., L013, L019, L020, L021, and L022 can be set to be less than L01 and greater than L031.

In at least one embodiment of the present disclosure, L01, L02, L03, L04, L05, L06, L07, L08, L09, L10, L11 and L12 may be greater than or equal to 9 µm and less than or equal to 16 µm;

L013, L019, L020, L021 and L022 can be greater than or equal to 9 µm and less than or equal to 15 µm;

L023, L024, L025, L026, L027, L028, L029, L030, L031 and L032 can be greater than or equal to 6 µm and less than 9 µm; but not limited to that.

In at least one embodiment of the present disclosure, the range of channel length of the transistor whose active pattern includes only one active pattern portion may be greater than or equal to 6 µm and less than 9 µm, but not limited to this.

The display substrate in the embodiment of the present disclosure includes a base substrate and a driving circuit arranged on the base substrate.

The display device the in the embodiment of the disclosure includes the display substrate.

The above descriptions are implementations of the present disclosure. It should be pointed out that those skilled in the art can make some improvements and modifications without departing from the principle of the present disclosure. These improvements and modifications shall also fall within the scope of the present disclosure.

What is claimed is:

1. A driving circuit, comprising:
a pull-up node control circuit;
a pull-down node control circuit; and
an output circuit,
wherein the pull-up node control circuit is electrically connected to an input terminal, a reset terminal and a pull-up node, and is configured to control a potential of the pull-up node under the control of an input signal provided by the input terminal and a reset signal provided by the reset terminal,
wherein the pull-down node control circuit is electrically connected to a pull-down node and is configured to control a potential of the pull-down node,
wherein the output circuit is electrically connected to the pull-up node, the pull-down node and an output terminal respectively, and is configured to control the output terminal to output a signal under the control of the potential of the pull-up node and the potential of the pull-down node,
wherein a channel length of at least one transistor among at least some transistors comprised in the output circuit, at least some transistors whose gate electrodes are electrically connected to the input terminal comprised in the pull-up node control circuit, and at least some transistors whose gate electrodes are electrically connected to the reset terminal comprised in the pull-up node control circuit is greater than a channel length of another transistor comprised in the driving circuit,
wherein the another transistor is a transistor other than the at least one transistor comprised in the driving circuit,
wherein the output circuit comprises a driving output circuit and a cascading output circuit,
wherein the driving output circuit is electrically connected to the pull-up node, the pull-down node and a driving output terminal respectively, and is configured to control the driving output terminal to output a driving signal under the control of the potential of the pull-up node and the potential of the pull-down node,
wherein the cascading output circuit is electrically connected to the pull-up node, the pull-down node and a cascading output terminal respectively, and is configured to control the cascading output terminal to output a carry signal under the control of the potential of the pull-up node and the potential of the pull-down node,
wherein the at least some transistors comprised in the output circuit comprises:
at least some transistors comprised in the driving output circuit; and/or
at least some transistors whose gate electrodes are electrically connected to the pull-up node comprised in the cascading output circuit,
wherein an active pattern of the at least one transistor comprised in the driving output circuit comprise at least two active pattern portions arranged at intervals; a spacing between adjacent two active pattern portions in at least one transistor comprised in the driving output circuit is a first spacing,
wherein an active pattern of at least one transistor whose gate electrode is electrically connected to the input terminal comprised in the pull-up node control circuit comprise at least two active pattern portions arranged at intervals; an active pattern of at least one transistor whose gate electrode is electrically connected to the reset terminal comprised in the pull-up node control circuit comprise at least two active pattern portions arranged at intervals,
wherein a spacing between adjacent two active pattern portions in at least one transistor whose gate electrode is electrically connected to the input terminal is a second spacing,
wherein a spacing between the adjacent two active pattern portions in at least one transistor whose gate electrode is electrically connected to the reset terminal is a third spacing, and
wherein the first spacing is greater than the second spacing, and the first spacing is greater than the third spacing.

2. The driving circuit according to claim 1, wherein the output circuit is a driving output circuit;
the driving output circuit is electrically connected to the pull-up node, the pull-down node and a driving output terminal respectively, and is configured to control the driving output terminal to output a driving signal under the control of the potential of the pull-up node and the potential of the pull-down node.

3. The driving circuit according to claim 1, wherein a channel length of at least one transistor comprised in the driving output circuit is greater than or equal to a channel length of a transistor whose gate electrode is electrically connected to the input terminal comprised in the pull-up node control circuit;
the channel length of at least one transistor comprised in the driving output circuit is greater than or equal to a channel length of a transistor whose gate electrode is electrically connected to the reset terminal comprised in the pull-up node control circuit;
the channel length of at least one transistor comprised in the driving output circuit is greater than or equal to the channel length of the transistor whose gate electrode is electrically connected to the pull-up node comprised in the cascading output circuit.

4. The driving circuit according to claim 3, wherein the pull-up node control circuit is also electrically connected to a frame reset terminal, is configured to control the potential of the pull-up node under the control of a frame reset signal provided by the frame reset terminal;

the pull-down node control circuit is also electrically connected to the pull-up node and is configured to control the potential of the pull-down node under the control of the potential of the pull-up node;

the channel length of the transistor whose gate electrode is electrically connected to the frame reset terminal comprised in the pull-up node control circuit is less than the channel length of at least one transistor whose gate electrode is electrically connected to the reset terminal comprised in the pull-up node control circuit, and the channel length of the transistor whose gate electrode is electrically connected to the frame reset terminal comprised in the pull-up node control circuit is less than the channel length of at least one transistor whose gate electrode is electrically connected to the pull-up node comprised in the cascading output circuit;

the channel length of the transistor whose gate electrode is electrically connected to the pull-up node comprised in the pull-down node control circuit is less than the channel length of at least one transistor whose gate electrode is electrically connected to the reset terminal comprised in the pull-up node control circuit, and the channel length of the transistor whose gate electrode is electrically connected to the pull-up node comprised in the pull-down node control circuit is less than the channel length of at least one transistor whose gate electrode is electrically connected to the pull-up node comprised in the cascading output circuit.

5. The driving circuit according to claim 4, wherein the pull-up node comprises an Nth stage of pull-up node and an (N+1)th stage of pull-up node; the pull-down node comprises a first pull-down node and a second pull-down node; the pull-up node control circuit further comprises a twenty-seventh transistor, a twenty-eighth transistor, a twenty-ninth transistor and a thirtieth transistor; N is a positive integer;

a gate electrode of the twenty-seventh transistor is electrically connected to the frame reset terminal, a first electrode of the twenty-seventh transistor is electrically connected to the Nth stage of pull-up node, and a second electrode of the twenty-seventh transistor is electrically connected to a first electrode of the twenty-eighth transistor;

a gate electrode of the twenty-eighth transistor is electrically connected to the frame reset terminal, and a second electrode of the twenty-eighth transistor is electrically connected to the first voltage line;

a gate electrode of the twenty-ninth transistor is electrically connected to the frame reset terminal, a first electrode of the twenty-ninth transistor is electrically connected to the (N+1)th stage of pull-up node, and a second electrode of the twenty-ninth transistor is electrically connected to a first electrode of the thirtieth transistor;

a gate electrode of the thirtieth transistor is electrically connected to the frame reset terminal, and a second electrode of the thirtieth transistor is electrically connected to the first voltage line;

the pull-down node control circuit comprises a thirty-first transistor and a thirty-second transistor;

a gate electrode of the thirty-first transistor is electrically connected to the Nth stage of pull-up node, a first electrode of the thirty-first transistor is electrically connected to the first pull-down node, and a second electrode of the thirty-first transistor is electrically connected to the first voltage line;

a gate electrode of the thirty-second transistor is electrically connected to the (N+1)th stage of pull-up node, a first electrode of the thirty-second transistor is electrically connected to the second pull-down node, and a second electrode of the thirty-second transistor is electrically connected to the first voltage line.

6. The driving circuit according to claim 1, wherein the pull-up node control circuit is also electrically connected to a frame reset terminal, is configured to control the potential of the pull-up node under the control of the frame reset signal provided by the frame reset terminal;

the pull-down node control circuit is also electrically connected to the pull-up node and is configured to control the potential of the pull-down node under the control of the potential of the pull-up node;

the active pattern of at least one transistor whose gate electrode is electrically connected to the frame reset terminal comprised in the pull-up node control circuit comprise at least two active pattern portions arranged at intervals, and a spacing between the adjacent active pattern portions of at least one transistor whose gate electrode is electrically connected to the frame reset terminal is a fifth spacing;

the active pattern of at least one transistor whose gate electrode is electrically connected to the pull-up node comprised in the pull-down node control circuit comprise at least two active pattern portions arranged at intervals, and a spacing between the adjacent active pattern portions of at least one transistor whose gate electrode is electrically connected to the pull-up node comprised in the pull-down node control circuit is a sixth spacing;

the second spacing is greater than the fifth spacing, the second spacing is greater than the sixth spacing, and/or the third spacing is greater than the fifth spacing, and the third spacing is greater than the sixth spacing.

7. The driving circuit according to claim 1, wherein a width-to-length ratio of at least one transistor comprised in the driving output circuit is greater than a width-to-length ratio of a transistor whose gate electrode is electrically connected to the input terminal comprised in the pull-up node control circuit;

the width-to-length ratio of at least one transistor comprised in the driving output circuit is greater than the width-to-length ratio of a transistor whose gate electrode is electrically connected to the reset terminal comprised in the pull-up node control circuit;

the width-to-length ratio of at least one transistor comprised in the driving output circuit is greater than the width-to-length ratio of a transistor whose gate electrode is electrically connected to the pull-up node comprised in the cascading output circuit.

8. The driving circuit according to claim 7, wherein the pull-up node control circuit is also electrically connected to a frame reset terminal, is configured to control the potential of the pull-up node under the control of the frame reset signal provided by the frame reset terminal; the pull-down node control circuit is also electrically connected to the pull-up node, is configured to control the potential of the pull-down node under the control of the potential of the pull-up node;

the width-to-length ratio of at least one transistor whose gate electrode is electrically connected to the input terminal comprised in the pull-up node control circuit is greater than the width-to-length ratio of a transistor whose gate electrode is electrically connected to the frame reset terminal comprised in the pull-up node control circuit;

the width-to-length ratio of at least one transistor whose gate electrode is electrically connected to the reset terminal comprised in the pull-up node control circuit is greater than the width-to-length ratio of the transistor whose gate electrode is electrically connected to the pull-up node comprised in the pull-down node control circuit;

the width-to-length ratio of at least one transistor whose gate electrode is electrically connected to the pull-up node comprised in the cascading output circuit is greater than the width-to-length ratio of the transistor whose gate electrode is electrically connected to the frame reset terminal comprised in the pull-up node control circuit;

the width-to-length ratio of the at least one transistor whose gate electrode is electrically connected to the pull-up node comprised in the cascading output circuit is greater than the width-to-length ratio of the transistor whose gate electrode is electrically connected to the pull-up node comprised in the pull-down node control circuit.

9. The driving circuit according to claim 1, wherein the pull-up node control circuit comprises an Nth stage of pull-up node control circuit and an (N+1)th stage of pull-up node control circuit, and the pull-down node control circuit comprises a first pull-down node control circuit and a second pull-down node control circuit; N is a positive integer;

the Nth stage of pull-up node control circuit is electrically connected to the input terminal, the reset terminal, a first scanning voltage line, a second scanning voltage line and an Nth stage of pull-up node respectively, is configured to control to connect the Nth stage of pull-up node and the first scanning voltage line under the control of the input signal, and control to connect the Nth stage of pull-up node and the second scanning voltage line under the control of the reset signal;

the (N+1)th stage of pull-up node control circuit is electrically connected to the input terminal, the reset terminal, the first scanning voltage line, the second scanning voltage line and an (N+1)th stage of pull-up node respectively, is configured to control to connect the (N+1)th stage of pull-up node and the first scanning voltage line under the control of the input signal, and control to connect the (N+1)th stage of pull-up node and the second scanning voltage line under the control of the reset signal;

the first pull-down node control circuit is respectively electrically connected to a first control voltage line, the Nth stage of pull-up node, the first pull-down node, a first pull-down control node and a first voltage line, is configured to control a potential of the first pull-down control node under the control of a first control voltage provided by the first control voltage line and a potential of the Nth stage of pull-up node, control to connect the first pull-down node and the first control voltage line under the control of a potential of the first pull-down control node, and control to connect the first pull-down node and the first voltage line under the control of the potential of the Nth stage of pull-up node;

the second pull-down node control circuit is electrically connected to a second control voltage line, the (N+1)th stage of pull-up node, a second pull-down node, a second pull-down control node and the first voltage line respectively, and is configured to control a potential of the second pull-down control node under the control of a second control voltage provided by the second control voltage line and a potential of the (N+1)th stage of pull-up node, and control to connect the second pull-down node and the second control voltage line under the control of a potential of the second pull-down control node, and control to connect the second pull-down node and the first voltage line under the control of the potential of the (N+1)th stage of pull-up node.

10. The driving circuit according to claim 9, wherein the pull-up node control circuit further comprises an Nth stage of pull-up control circuit and an (N+1)th stage of pull-up control circuit;

the Nth stage of pull-up control circuit is respectively electrically connected to the Nth stage of pull-up node, the first pull-down node, the second pull-down node, an enabling terminal, the input terminal, a third control node, the first node, a first clock signal line, and the first voltage line, is configured to control to connect the third control node and the input terminal under the control of an enabling signal provided by the enabling terminal, control to connect the first node and the first clock signal line under the control of a potential of the third control node, control to connect the first node and the Nth stage of pull-up node under the control of a first clock signal provided by the first clock signal line, control to connect the Nth stage of pull-up node and the first voltage line under the control of the potential of the first pull-down node, and control to connect the Nth stage of pull-up node and the first voltage line under the control of the potential of the second pull-down node;

the (N+1)th stage of pull-up control circuit is electrically connected to the (N+1)th stage of pull-up node, the first clock signal line, the first node, the first pull-down node, the second pull-down node and the first voltage line respectively, is configured to control to connect the (N+1)th stage of pull-up node and first node under the control of the first clock signal, control to connect the (N+1)th stage of pull-up node and first voltage line under the control of the potential of the first pull-down node, and control to connect the (N+1)th stage of pull-up node and the first voltage line under the control of the potential of the second pull-down node, a channel length of a transistor whose gate electrode is electrically connected to the enabling terminal comprised in the Nth stage of pull-up control circuit, a channel length of a transistor whose gate electrode is electrically connected to the third pull-up node comprised in the Nth stage of pull-up control circuit, a channel length of a transistor whose gate electrode is electrically connected to the first clock signal line comprised in the Nth stage of pull-up control circuit, a channel length of a transistor whose gate electrode is electrically connected to the first pull-down node comprised in the Nth stage of pull-up control circuit, and a channel length of a transistor whose gate electrode is electrically connected to the second pull-down node comprised in the Nth stage of pull-up control circuit is smaller than a channel length of at least one transistor whose gate electrode is electrically connected to the pull-up node comprised in the cascaded output circuit;

a channel length of a transistor whose gate electrode is electrically connected to the first clock signal line comprised in the (N+1)th stage of pull-up control circuit, a channel length of a transistor whose gate electrode is electrically connected to the first pull-down node comprised in the (N+1)th stage of pull-up control circuit, and a channel length of a transistor whose gate electrode is electrically connected to the second pull-down node comprised in the (N+1)th stage of pull-up control circuit is smaller than the channel length of at least one transistor whose gate electrode is electrically connected to the pull-up node comprised in the cascading output circuit; or wherein the active pattern of at least one transistor whose gate electrode is electrically connected to the enabling terminal comprised in the Nth stage of pull-up control circuit comprises at least two active pattern portions arranged at intervals, and a spacing between adjacent active pattern portions of at least one transistor whose gate electrode is electrically connected to the enabling terminal is a seventh spacing; and/or the active pattern of at least one transistor whose gate electrode is electrically connected to the third control node comprised in the Nth stage of pull-up control circuit comprises at least two active pattern portions arranged at intervals, and a spacing between adjacent active pattern portions of at least one transistor whose gate electrode is electrically connected to the third control node is an eighth spacing; and/or the active pattern of a transistor whose gate electrode is electrically connected to the first clock signal line comprised in the Nth stage of pull-up control circuit comprises at least two active pattern portions arranged at intervals, and a spacing between adjacent active pattern portions of the transistor whose gate electrode is electrically connected to the first clock signal line comprised in the Nth stage of pull-up control circuit is a ninth spacing; and/or the active pattern of a transistor whose gate electrode is electrically connected to the first pull-down node comprised in the Nth stage of pull-up control circuit comprises at least two active pattern portions arranged at intervals, and a spacing between adjacent active pattern portions of the transistor whose gate electrode is electrically connected to the first pull-down node comprised in the Nth stage of pull-up control circuit is a tenth spacing; and/or, the active pattern of a transistor whose gate electrode is electrically connected to the second pull-down node comprised in the Nth stage of pull-up control circuit comprises at least two active pattern portions arranged at intervals, and a spacing between the adjacent active pattern portions of the transistor whose gate electrode is electrically connected to the second pull-down node comprised in the Nth stage of pull-up control circuit is an eleventh spacing; and/or, the active pattern of a transistor whose gate electrode is electrically connected to the first clock signal line comprised in the (N+1)th stage of pull-up control circuit comprises at least two active pattern portions arranged at intervals, and a spacing between adjacent active pattern portions of a transistor whose gate electrode is electrically connected to the first clock signal terminal comprised in the (N+1)th stage of pull-up control circuit is a twelfth spacing; and/or, the active pattern of a transistor whose gate electrode is electrically connected to the first pull-down node comprised in the (N+1)th stage of pull-up control circuit comprises at least two active pattern portions arranged at intervals, and a spacing between adjacent active pattern portions of the transistor whose gate electrode is electrically connected to the first pull-down node comprised in the (N+1)th stage of pull-up control circuit is a thirteenth spacing; and/or, the active pattern of a transistor whose gate electrode is electrically connected to the second pull-down node comprised in the (N+1)th stage of pull-up control circuit comprises at least two active pattern portions arranged at intervals, and a spacing between adjacent active pattern portions of the transistor whose gate electrode is electrically connected to the second pull-down node comprised in the (N+1)th stage of pull-up control circuit is a fourteenth spacing; and/or the second spacing is greater than the seventh spacing, the second spacing is greater than the eighth spacing, the second spacing is greater than the ninth spacing, the second spacing is greater than the tenth spacing, the second spacing is greater than the eleventh spacing, the second spacing is greater than the twelfth spacing, the second spacing is greater than the thirteenth spacing, and the second spacing is greater than the fourteenth spacing; and/or the third spacing is greater than the seventh spacing, the third spacing is greater than the eighth spacing, the third spacing is greater than the ninth spacing, the third spacing is greater than the tenth spacing, the third spacing is greater than the eleventh spacing, the third spacing is greater than the twelfth spacing, the third spacing is greater than the thirteenth spacing, and the third spacing is greater than the fourteenth spacing; and/or the active pattern of at least one transistor whose gate electrode is electrically connected to the input terminal comprised in the pull-up node control circuit comprise at least two active pattern portions arranged at intervals; the active pattern of at least one transistor whose gate electrode is electrically connected to the reset terminal comprised in the pull-up node control circuit comprises at least two active pattern portions arranged at intervals; the second spacing is the spacing between the adjacent two active pattern portions of at least one transistor whose gate electrode is electrically connected to the input terminal; the third spacing is the spacing between the adjacent two active pattern portions of at least one transistor whose gate electrode is electrically connected to the reset terminal.

11. The driving circuit according to claim 9, further comprising a second node control circuit; wherein the second node control circuit is electrically connected to the second node, the input terminal, the reset terminal, the first scanning voltage line and the second scanning voltage line respectively, is configured to control to connect the second node and the first scanning voltage line under the control of the input signal provided by the input terminal, and control to connect the second node and the second scanning voltage line under the control of the reset signal;

the first pull-down node control circuit is also electrically connected to the second node, and is configured to control to connect the first pull-down node and the first voltage line under the control of the potential of the second node;

the second pull-down node control circuit is also electrically connected to the second node, and is configured to control to connect the second pull-down node and the first voltage line under the control of the potential of the second node, a channel length of a transistor whose gate electrode is electrically connected to the second node comprised in the first pull-down node control circuit is smaller than a channel length of at least one transistor whose gate electrode is electrically connected the pull-up node comprised in the cascading output circuit;

a channel length of a transistor whose gate electrode is electrically connected to the second node comprised in the second pull-down node control circuit is smaller than the channel length of at least one transistor whose gate electrode is electrically connected to the pull-up node comprised in the cascading output circuit;

or wherein the active pattern of a transistor whose gate electrode is electrically connected to the second node comprised in the first pull-down node control circuit comprise at least two active pattern portions arranged at intervals, and a spacing between the adjacent active pattern portions of the transistor whose gate electrode is electrically connected to the second node comprised in the first pull-down node control circuit is a fifteenth spacing; or, the active pattern of a transistor whose gate electrode is electrically connected to the second node comprised in the second pull-down node control circuit comprise at least two active pattern portions arranged at intervals, and a spacing between the adjacent active pattern portion of the transistor whose gate electrode is electrically connected to the second node comprised in the second pull-down node control circuit is a sixteenth spacing;

the second spacing is greater than the fifteenth spacing, the second spacing is greater than the sixteenth spacing, the third spacing is greater than the fifteenth spacing, and the third spacing is greater than the sixteenth spacing;

the active pattern of at least one transistor whose gate electrode is electrically connected to the input terminal comprised in the pull-up node control circuit comprise at least two active pattern portions arranged at intervals; the active pattern of at least one transistor whose gate electrode is electrically connected to the reset terminal comprised in the pull-up node control circuit comprises at least two active pattern portions arranged at intervals; the second spacing is the spacing between the adjacent two active pattern portions of at least one transistor whose gate electrode is electrically connected to the input terminal; the third spacing is the spacing between the adjacent two active pattern portions of at least one transistor whose gate electrode is electrically connected to the reset terminal.

12. The driving circuit according to claim 1, wherein the driving output portion comprises an Nth stage of first driving output terminal, an Nth stage of second driving output terminal, an (N+1)th stage of first driving output terminal and an (N+1)th stage of second driving output terminal; the pull-up node comprises an Nth stage of pull-up node and an (N+1)th stage of pull-up node; the pull-down node comprises a first pull-down node and a second pull-down node; and N is a positive integer;

the driving output circuit comprises a first transistor, a second transistor, a third transistor, a fourth transistor, a fifth transistor, a sixth transistor, a seventh transistor, an eighth transistor, a ninth transistor, a tenth transistor, an eleventh transistor and a twelfth transistor;

a gate electrode of the first transistor is electrically connected to the Nth stage of pull-up node, a first electrode of the first transistor is electrically connected to a first output clock signal line, and a second electrode of the first transistor is electrically connected to the Nth stage of first driving output terminal;

a gate electrode of the second transistor is electrically connected to the first pull-down node, a first electrode of the second transistor is electrically connected to the Nth stage of first driving output terminal, and a second electrode of the second transistor is electrically connected to the second voltage line;

a gate electrode of the third transistor is electrically connected to the second pull-down node, a first electrode of the third transistor is electrically connected to the Nth stage of first driving output terminal, and a second electrode of the third transistor is electrically connected to the second voltage line;

a gate electrode of the fourth transistor is electrically connected to the Nth stage of pull-up node, a first electrode of the fourth transistor is electrically connected to a second output clock signal line, and a second electrode of the fourth transistor is electrically connected to the Nth stage of second driving output terminal;

a gate electrode of the fifth transistor is electrically connected to the first pull-down node, a first electrode of the fifth transistor is electrically connected to the Nth stage of second driving output terminal, and a second electrode of the fifth transistor is electrically connected to the second voltage line;

a gate electrode of the sixth transistor is electrically connected to the second pull-down node, a first electrode of the sixth transistor is electrically connected to the Nth stage of second driving output terminal, and a second electrode of the sixth transistor is electrically connected to the second voltage line;

a gate electrode of the seventh transistor is electrically connected to the (N+1)th stage of pull-up node, a first electrode of the seventh transistor is electrically connected to a third output clock signal line, and a second electrode of the seventh transistor is electrically connected to the (N+1)th stage of first driving output terminal;

a gate electrode of the eighth transistor is electrically connected to the first pull-down node, a first electrode of the eighth transistor is electrically connected to the (N+1)th stage of first driving output terminal, and a second electrode of the eighth transistor is electrically connected to the second voltage line;

a gate electrode of the ninth transistor is electrically connected to the second pull-down node, a first electrode of the ninth transistor is electrically connected to the (N+1)th stage of first driving output terminal, and a second electrode of the ninth transistor is electrically connected to the second voltage line;

a gate electrode of the tenth transistor is electrically connected to the (N+1)th stage of pull-up node, a first electrode of the tenth transistor is electrically connected to a fourth output clock signal line, and a second electrode of the tenth transistor is electrically connected to the (N+1)th stage of second driving output terminal;

a gate electrode of the eleventh transistor is electrically connected to the first pull-down node, a first electrode of the eleventh transistor is electrically connected to the (N+1)th stage of second driving output terminal, and a second electrode of the eleventh transistor is electrically connected to the second voltage line;

a gate electrode of the twelfth transistor is electrically connected to the first pull-down node, a first electrode of the twelfth transistor is electrically connected to the (N+1)th stage of second driving output terminal, and a second electrode of the twelfth transistor is electrically connected to the second voltage line;

the cascaded output circuit comprises a thirteenth transistor, a fourteenth transistor, a fifteenth transistor, a sixteenth transistor, a seventeenth transistor and an eighteenth transistor;

a gate electrode of the thirteenth transistor is electrically connected to the Nth stage of pull-up node, a first electrode of the thirteenth transistor is electrically connected to a fifth output clock signal line, and a second electrode of the thirteenth transistor is electrically connected to an Nth cascading output terminal;

a gate electrode of the fourteenth transistor is electrically connected to the first pull-down node, a first electrode of the fourteenth transistor is electrically connected to the Nth cascading output terminal, and a second electrode of the fourteenth transistor is electrically connected to the first voltage line;

a gate electrode of the fifteenth transistor is electrically connected to the second pull-down node, a first electrode of the fifteenth transistor is electrically connected to the Nth cascading output terminal, and a second electrode of the fifteenth transistor is electrically connected to the first voltage line;

a gate electrode of the sixteenth transistor is electrically connected to the (N+1)th stage of pull-up node, a first electrode of the sixteenth transistor is electrically connected to a sixth output clock signal line, and a second electrode of the sixteenth transistor is electrically connected to an (N+1)th cascading output terminal;

a gate electrode of the seventeenth transistor is electrically connected to the first pull-down node, a first electrode of the seventeenth transistor is electrically connected to the (N+1)th cascading output terminal, and a second electrode of the seventeenth transistor is electrically connected to the first voltage line;

a gate electrode of the eighteenth transistor is electrically connected to the second pull-down node, and a first electrode of the eighteenth transistor is connected to the (N+1)th stage cascading output terminal and a second electrode of the eighth transistor is electrically connected to the first voltage line.

13. The driving circuit according to claim 1, wherein the pull-up node comprises an Nth stage of pull-up node and an (N+1)th stage of pull-up node; the pull-up node control circuit comprises a nineteenth transistor, a twentieth transistor, a twenty-first transistor, a twenty-second transistor, a twenty-third transistor, a twenty-fourth transistor, a twenty-fifth transistor and a twenty-sixth transistor; N is a positive integer;

a gate electrode of the nineteenth transistor is electrically connected to the input terminal, a first electrode of the nineteenth transistor is electrically connected to the first scanning voltage line, and a second electrode of the nineteenth transistor is electrically connected to a first electrode of the twentieth transistor;

a gate electrode of the twentieth transistor is electrically connected to the input terminal, and a second electrode of the twentieth transistor is electrically connected to the Nth stage of pull-up node;

a gate electrode of the twenty-first transistor is electrically connected to the reset terminal, a first electrode of the twenty-first transistor is electrically connected to the Nth stage of pull-up node, and a second electrode of the twenty-first transistor is electrically connected to a first electrode of the twenty-second transistor;

a gate electrode of the twenty-second transistor is electrically connected to the reset terminal, and a second electrode of the twenty-second transistor is electrically connected to the second scanning voltage line;

a gate electrode of the twenty-third transistor is electrically connected to the input terminal, a first electrode of the twenty-third transistor is electrically connected to the first scanning voltage line, and a second electrode of the twenty-third transistor is electrically connected to a first electrode of the twenty-fourth transistor;

a gate electrode of the twenty-fourth transistor is electrically connected to the input terminal, and a second electrode of the twenty-fourth transistor is electrically connected to the (N+1)th stage of pull-up node;

a gate electrode of the twenty-fifth transistor is electrically connected to the reset terminal, a first electrode of the twenty-fifth transistor is electrically connected to the (N+1)th stage of pull-up node, and a second electrode of the twenty-fifth transistor is electrically connected to a first electrode of the twenty-sixth transistor;

a gate electrode of the twenty-sixth transistor is electrically connected to the reset terminal, and a second electrode of the twenty-sixth transistor is electrically connected to the second scanning voltage line.

14. A display substrate, comprising a base substrate and the driving circuit arranged on the base substrate according to claim 1.

15. A display device, comprising a display substrate according to claim 14.

16. A driving circuit, comprising:

a pull-up node control circuit;

a pull-down node control circuit; and an output circuit, wherein the pull-up node control circuit is electrically connected to an input terminal, a reset terminal and a pull-up node, and is configured to control a potential of the pull-up node under the control of an input signal provided by the input terminal and a reset signal provided by the reset terminal, wherein the pull-down node control circuit is electrically connected to a pull-down node and is configured to control a potential of the pull-down node, wherein the output circuit is electrically connected to the pull-up node, the pull-down node and an output terminal respectively, and is configured to control the output terminal to output a signal under the control of the potential of the pull-up node and the potential of the pull-down node, wherein a channel length of at least one transistor among at least some transistors comprised in the output circuit, at least some transistors whose gate electrodes are electrically connected to the input terminal comprised in the pull-up node control circuit, and at least some transistors whose gate electrodes are electrically connected to the reset terminal comprised in the pull-up node control circuit is greater than a channel length of another transistor comprised in the driving circuit, wherein the another transistor is a transistor other than the at least one transistor comprised in the driving circuit, wherein the output circuit comprises a driving output circuit and a cascading output circuit, wherein the driving output circuit is electrically connected to the pull-up node, the pull-down node and a driving output terminal respectively, and is configured to control the driving output terminal to output a driving signal under the control of the potential of the pull-up node and the potential of the pull-down node, wherein the cascading output circuit is electrically connected to the pull-up node, the pull-down node and a cascading output terminal respectively, and is configured to control the cascading output terminal to output a carry signal under the control of the potential of the pull-up node and the potential of the pull-down node, wherein the at least some transistors comprised in the output circuit comprises:

at least some transistors comprised in the driving output circuit; and/or at least some transistors whose gate electrodes are electrically connected to the pull-up node comprised in the cascading output circuit, wherein an active pattern of the at least one transistor comprised in the driving output circuit comprise at least two active pattern portions arranged at intervals; a spacing between adjacent two active pattern portions in at least one transistor comprised in the driving output circuit is a first spacing, wherein an active pattern of at least one transistor whose gate electrode is electrically connected to the pull-up node comprised in the cascading output circuit comprises at least two active pattern portions arranged at intervals, wherein a spacing between the two adjacent active pattern portions in at least one transistor whose gate electrode is electrically connected to the pull-up node is a fourth spacing, and wherein the first spacing is greater than the fourth spacing.

17. The driving circuit according to claim 16, wherein the pull-up node control circuit is also electrically connected to a frame reset terminal, is configured to control the potential of the pull-up node under the control of the frame reset signal provided by the frame reset terminal, wherein the pull-down node control circuit is also electrically connected to the pull-up node and is configured to control the potential of the pull-down node under the control of the potential of the pull-up node, wherein the active pattern of at least one transistor whose gate electrode is electrically connected to the frame reset terminal comprised in the pull-up node control circuit comprise at least two active pattern portions arranged at intervals, and a spacing between the adjacent active pattern portions of at least one transistor whose gate electrode is electrically connected to the frame reset terminal is a fifth spacing, wherein the active pattern of at least one transistor whose gate electrode is electrically connected to the pull-up node comprised in the pull-down node control circuit comprise at least two active pattern portions arranged at intervals, and a spacing between the adjacent active pattern portions of at least one transistor whose gate electrode is electrically connected to the pull-up node comprised in the pull-down node control circuit is the sixth spacing, and wherein the fourth spacing is greater than the fifth spacing, and the fourth spacing is greater than a sixth spacing.

18. A driving circuit, comprising:
a pull-up node control circuit;
a pull-down node control circuit; and
an output circuit, wherein the pull-up node control circuit is electrically connected to an input terminal, a reset terminal and a pull-up node, and is configured to control a potential of the pull-up node under the control of an input signal provided by the input terminal and a reset signal provided by the reset terminal, wherein the pull-down node control circuit is electrically connected to a pull-down node and is configured to control a potential of the pull-down node, wherein the output circuit is electrically connected to the pull-up node, the pull-down node and an output terminal respectively, and is configured to control the output terminal to output a signal under the control of the potential of the pull-up node and the potential of the pull-down node, wherein a channel length of at least one transistor among at least some transistors comprised in the output circuit, at least some transistors whose gate electrodes are electrically connected to the input terminal comprised in the pull-up node control circuit, and at least some transistors whose gate electrodes are electrically connected to the reset terminal comprised in the pull-up node control circuit is greater than a channel length of another transistor comprised in the driving circuit, wherein the another transistor is a transistor other than the at least one transistor comprised in the driving circuit, wherein the output circuit comprises a driving output circuit and a cascading output circuit, wherein the driving output circuit is electrically connected to the pull-up node, the pull-down node and a driving output terminal respectively, and is configured to control the driving output terminal to output a driving signal under the control of the potential of the pull-up node and the potential of the pull-down node, wherein the cascading output circuit is electrically connected to the pull-up node, the pull-down node and a cascading output terminal respectively, and is configured to control the cascading output terminal to output a carry signal under the control of the potential of the pull-up node and the potential of the pull-down node, wherein the at least some transistors comprised in the output circuit comprises:

at least some transistors comprised in the driving output circuit; and/or at least some transistors whose gate electrodes are electrically connected to the pull-up node comprised in the cascading output circuit, wherein an active pattern of the at least one transistor comprised in the driving output circuit comprise at least two active pattern portions arranged at intervals; a spacing between adjacent two active pattern portions in at least one transistor comprised in the driving output circuit is a first spacing, wherein a channel length of at least one transistor comprised in the driving output circuit is greater than or equal to a channel length of a transistor whose gate electrode is electrically connected to the input terminal comprised in the pull-up node control circuit, wherein the channel length of at least one transistor comprised in the driving output circuit is greater than or equal to a channel length of a transistor whose gate electrode is electrically connected to the reset terminal comprised in the pull-up node control circuit, wherein the channel length of at least one transistor comprised in the driving output circuit is greater than or equal to the channel length of the transistor whose gate electrode is electrically connected to the pull-up node comprised in the cascading output circuit, wherein the pull-up node control circuit is also electrically connected to a frame reset terminal, is configured to control the potential of the pull-up node under the control of a frame reset signal provided by the frame reset terminal, wherein the pull-down node control circuit is also electrically connected to the pull-up node and is configured to control the potential of the pull-down node under the control of the potential of the pull-up node, wherein the channel length of the transistor whose gate electrode is electrically connected to the frame reset terminal comprised in the pull-up node control circuit is less than the channel length of at least one transistor whose gate electrode is electrically connected to the reset terminal comprised in the pull-up node control circuit, and the channel length of the transistor whose gate electrode is electrically connected to the frame reset terminal comprised in the pull-up node control circuit is less than the channel length of at least one transistor whose gate electrode is electrically connected to the pull-up node comprised in the cascading output circuit, and wherein the channel length of the transistor whose gate electrode is electrically connected to the pull-up node comprised in the pull-down node control circuit is less than the channel length of at least one transistor whose gate electrode is electrically connected to the reset terminal comprised in the pull-up node control circuit, and the channel length of the transistor whose gate electrode is electrically connected to the pull-up node comprised in the pull-down node control circuit is less than the channel length of at least one transistor whose gate electrode is electrically connected to the pull-up node comprised in the cascading output circuit.

* * * * *